(12) United States Patent
Iida et al.

(10) Patent No.: US 9,331,792 B2
(45) Date of Patent: May 3, 2016

(54) ACOUSTIC WAVE COMMUNICATION SYSTEM AND RECEIVER

(71) Applicants: ADC Technology Inc., Nagoya-shi, Aichi (JP); SYSTEM DESIGN CORP., Fukui-shi, Fukui (JP)

(72) Inventors: Mitsuhiro Iida, Fukui (JP); Tsutomu Adachi, Nagoya (JP); Tomoyoshi Yokoi, Nagoya (JP); Shigeru Hayashi, Nagoya (JP); Takezumi Kondo, Nagoya (JP); Tatsumi Kuroda, Nagoya (JP); Takeo Nozawa, Nagoya (JP); Hiroshi Maekawa, Nagoya (JP); Kenshi Takenaka, Nagoya (JP); Tsuyoshi Kawanishi, Nagoya (JP); Kenji Mizuno, Nagoya (JP); Hideya Fujimaki, Nagoya (JP)

(73) Assignees: ADC TECHNOLOGY INC., Nagoya-Shi, Aichi (JP); SYSTEM DESIGN CORP., Fukui-Shi, Fukui (JP)

( * ) Notice: Subject to any disclaimer, the term of this patent is extended or adjusted under 35 U.S.C. 154(b) by 0 days.

(21) Appl. No.: 14/376,110

(22) PCT Filed: Jan. 31, 2013

(86) PCT No.: PCT/JP2013/052214
§ 371 (c)(1),
(2) Date: Jul. 31, 2014

(87) PCT Pub. No.: WO2013/115317
PCT Pub. Date: Aug. 8, 2013

(65) Prior Publication Data
US 2014/0369169 A1    Dec. 18, 2014

(30) Foreign Application Priority Data

Jan. 31, 2012  (JP) ................................ 2012-018543
Jul. 6, 2012  (JP) ................................ 2012-152524
Aug. 10, 2012  (JP) ................................ 2012-178430

(51) Int. Cl.
H04B 11/00    (2006.01)

(52) U.S. Cl.
CPC ...................................... *H04B 11/00* (2013.01)

(58) Field of Classification Search
CPC ........................................................ H04B 11/00
See application file for complete search history.

(56) References Cited

U.S. PATENT DOCUMENTS

| 6,011,819 A | 1/2000 | Shiro |
| 2004/0078343 A1 | 4/2004 | Morita |

(Continued)

FOREIGN PATENT DOCUMENTS

| JP | H02162999 | 6/1990 |
| JP | H09224005 A | 8/1997 |

(Continued)

OTHER PUBLICATIONS

Translation JP2002-368633.*

(Continued)

*Primary Examiner* — Daniel Pihulic
(74) *Attorney, Agent, or Firm* — Koppel, Patrick, Heybl & Philpott

(57) ABSTRACT

A receiver of the present invention includes a microphone, an unnecessary signal remover, and an FM detector. The microphone receives a transmission signal generated by frequency modulating a signal in a frequency band that is receivable by the microphone, on the basis of transmission data. The unnecessary signal remover removes unnecessary signal components by processing the received signal from the microphone. The FM detector restores transmission data by performing FM detection of the received signal from which unnecessary signal components were removed by the unnecessary signal remover.

3 Claims, 37 Drawing Sheets

(56) References Cited

U.S. PATENT DOCUMENTS

2008/0233915 A1 9/2008 Saito et al.
2014/0369169 A1* 12/2014 Iida et al. .................. 367/135

FOREIGN PATENT DOCUMENTS

| JP | 2002368633 A | 12/2002 |
| JP | 2003067275 A | 3/2003 |
| JP | 2004139525 A | 5/2004 |
| JP | 2005277565 | 10/2005 |
| JP | 2006339913 A | 12/2006 |
| WO | WO2007069445 A1 | 6/2007 |
| WO | WO 2013115317 A1 * | 8/2013 |

OTHER PUBLICATIONS

Translation JPH09224005.*
Translation WO2007-069445.*
International Preliminary Report on Patentability from PCT/JP2013/052214, dated Aug. 14, 2014.
Form PCT/ISA/210 (International Search Report) for PCT/JP2013/052214 mailed Apr. 9, 2013.
Notice of Reasons for Rejection from Japanese Patent Appl. No. 2013-556495, dated Aug. 25, 2015.
Notice of Reasons for Rejection from corresponding Japanese Patent Appl No. 2013-556495. dated Jun. 2, 2015.

* cited by examiner

FIG.17
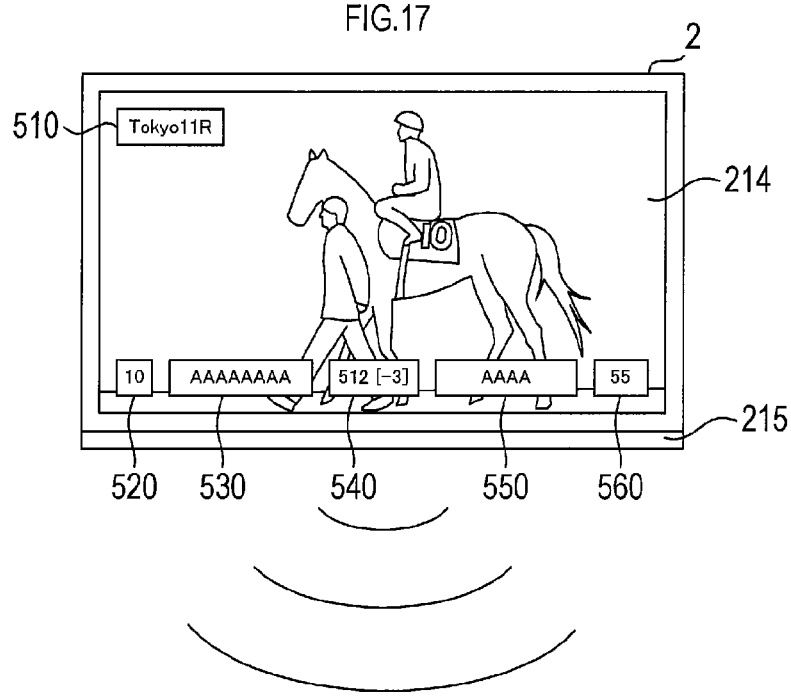
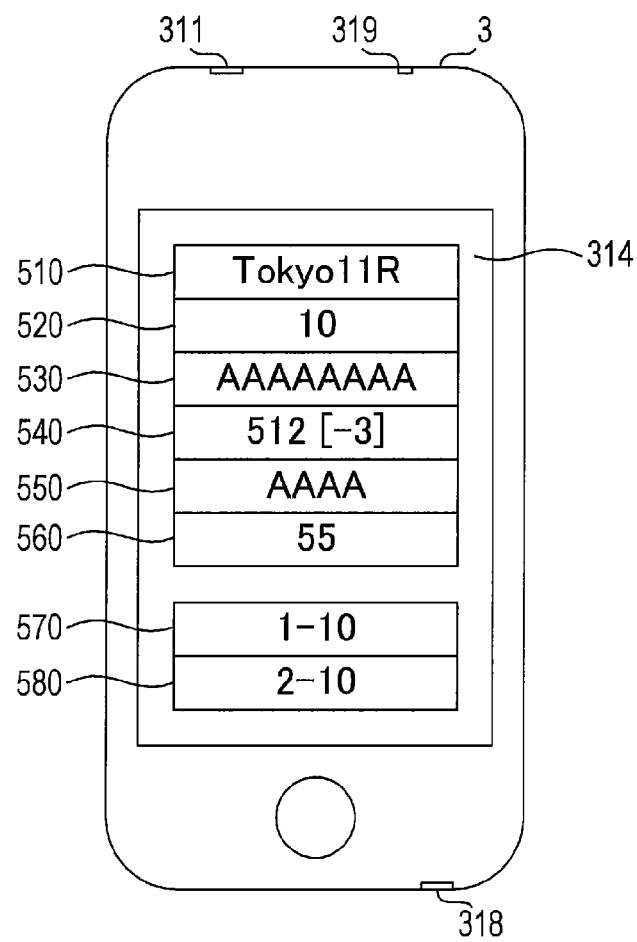

ACOUSTIC WAVE COMMUNICATION SYSTEM AND RECEIVER

CROSS-REFERENCE TO RELATED APPLICATIONS

This international application claims the benefit of Japanese Patent Application No. 2012-018543 filed Jan. 31, 2012, No. 2012-152524 filed Jul. 6, 2012, and No. 2012-178430 filed Aug. 10, 2012 in the Japan Patent Office, the entire disclosures of which applications are incorporated herein by reference.

TECHNICAL FIELD

The present invention relates to an acoustic wave communication system that modulates signal in a frequency band receivable by a microphone based on transmission data thereby to transmit and receive data. The present invention also relates to a receiver suitable for use in such acoustic wave communication system.

BACKGROUND ART

In acoustic wave communication for data communication using a speaker and a microphone, acoustic wave output from the transmitter speaker may sometimes reflect on surrounding objects, and the reflected wave may be input to the receiver microphone as a delay wave.

When the delay wave is input to the microphone, the receiver is no longer able to successfully restore the acoustic wave transmitted from the transmitter (that is, transmission data) from the received signal.

Therefore, in acoustic wave communication, the transmitter speaker and the receiver microphone are brought into proximity so that the reflected wave is not to be input to the receiver microphone.

However, it is troublesome to arrange the transmitter and the receiver to be close to each other at the time of establishing acoustic wave communication. Also, there are cases in which close arrangement is not physically possible.

Therefore, in acoustic wave communication, it has been desired to increase a communicable distance between the transmitter and the receiver.

On the other hand, in order to acquire desired communication quality even with a longer communication distance, it has been proposed that the receiver removes unnecessary signal components, such as the reflected wave and the like, from the received signal (see Patent Document 1, for example).

According to the proposed technique, upon converting transmission data to an acoustic wave to be transmitted at the transmitter side, a pseudo-noise code is added to the transmission data, and the receiver, using an adaptive filter compatible with the pseudo-noise code, separates the received signal into a data area and a pseudo-noise area.

Then, the receiver acquires a multipath delay characteristic value of the signal in the pseudo-noise area (pseudo noise code) that is separated from the received signal, and, based on the multipath delay characteristic value, removes unnecessary signal components from the signal in the data area.

PRIOR ART DOCUMENT

Patent Document

Patent Document 1: Japanese Unexamined Patent Application Publication No. H09-224005

SUMMARY OF THE INVENTION

Problems to be Solved by the Invention

According to the technique proposed above, since unnecessary signal components produced by a delay wave (so-called echo) and by changes in the transmission path can be removed from the received data, it is possible to extend the communicable distance in acoustic wave communication.

However, the technique proposed above requires the pseudo-noise code to be added to the transmission data at the transmitter side, and also requires the received signal to be separated into a pseudo-noise area and a data area to acquire a delay characteristic value of the multipath, where the delay wave is generated, from the signal in the pseudo-noise area at the receiver side. Therefore, there is a problem in that the device configuration becomes complicated.

Further, at the time of acoustic wave communication, it is necessary to transmit and receive a pseudo-noise code that does not need to be transmitted at the origin and received and, moreover, to acquire the delay characteristic value of the multipath from the signal at the receiver side. Thus, there is also a problem in that the time necessary for communication and the receiving process becomes long.

In particular, in acoustic wave communication, the frequency of acoustic waves used for communication are very low, as compared with radio wave communication. Thus, an amount of transmittable data per unit time is reduced. If a pseudo-noise code is used to remove unnecessary signal components, such as the delay wave and the like, from the received signal, the amount of transmittable data per unit time is further reduced. It is likely that a desired transmission rate is not able to be achieved.

In one aspect of the present invention, it is desirable that unnecessary signal components can be removed from the received signal at the receiver side in the acoustic wave communication system, without having to transmit and receive a pseudo-noise code.

Means to Solve the Problems

According to the acoustic wave communication system in a first aspect of the present invention, at a transmitter side, a frequency modulator modulates the frequency of a signal in a frequency band receivable by a microphone based on transmission data, thereby to generate a transmission signal, and an acoustic wave generator generates an acoustic wave in response to the generated transmission signal.

Meanwhile, at a receiver side, the acoustic wave output from the acoustic wave generator of the transmitter is received by a microphone.

Then, an unnecessary signal remover processes the signal received by the microphone, to remove thereby unnecessary signal components from the received signal. A FM detector performs FM-detection of the received signal from which unnecessary signal components have been removed by the unnecessary signal remover, to restore thereby the transmission data.

Further, in the unnecessary signal remover, a first filter section firstly extracts a signal component corresponding to the transmission signal generated in the frequency modulator, from the received signal input to the microphone.

Then, a frequency converter converts the frequency of the received signal, which has passed through the first filter section, to a signal in a predetermined intermediate frequency band, and a second filter section extracts a signal component corresponding to the transmission signal generated in the frequency modulator, from the signal of which frequency has been converted by the frequency converter.

Also, the received signal that has passed through the first filter section of the unnecessary signal remover is input to an envelope detector for envelope detection.

Then, a third filter section extracts unnecessary signal components, having a frequency lower than the received signal that has passed through the second filter section, from the signal of which envelope has been detected, and the remover removes an unnecessary signal that has passed through the third filter section from the received signal that has passed through the second filter section.

That is, in the acoustic wave communication system of the first aspect, the acoustic wave, of which frequency has been modulated according to the transmission data, is transmitted from the transmitter to the receiver.

Since the amplitude characteristics of the frequency-modulated acoustic wave are constant, the received signal acquired at the receiver side has stable amplitude characteristics if unnecessary signal components, such as a delay wave and the like, are not included therein.

However, if a delay wave reflected on surrounding objects (a wave having a different transmission path) is superimposed on the transmission signal (acoustic wave) from the transmitter, the amplitude of the received signal acquired at the receiver side varies depending on the delay wave.

Therefore, in the acoustic wave communication system of the first aspect, the envelope of the received signal that has passed through the first filter section is detected to extract fluctuation components in the amplitude of the received signal as unnecessary signal components caused by the delay wave and change of the transmission path. The unnecessary signal components are removed from the received signal of which frequency has been converted to the intermediate frequency band to generate thereby the transmission signal transmitted from the transmitter (in other words, signal before influence by the delay wave).

As a result, according to the acoustic wave communication system of the first aspect, it is possible to restore the transmission data from the transmitter in the receiver accurately.

Further, as above, the unnecessary signal components can be eliminated from the received signal at the receiver side. Therefore, data communication by acoustic wave communication can be favorably performed even if the communication distance between the transmitter and the receiver is longer.

Further, according to the acoustic wave communication system in the first aspect, in order to increase the communicable range, there is no need to transmit a pseudo-noise code from the transmitter, or to acquire the delay characteristic value of the multipath at the receiver side, using the pseudo-noise code.

Therefore, the amount of data that can be transmitted per unit time (in other words, communication speed) is not decreased due to an increase in the communicable range. Acoustic wave communication can be performed at a desired communication speed.

Next, a receiver of a second aspect of the present invention is a receiver for acoustic wave communication. Similar to the receiver of the acoustic wave communication system in the first aspect, the receiver of the second aspect is provided with a microphone, an unnecessary signal remover, and a FM detector. Also, the unnecessary signal remover is provided with a first filter section, a frequency converter, and a second filter section, an envelope detector, a third filter section, and a remover.

Therefore, according to the receiver of the second aspect, it is possible to establish the acoustic wave communication system of the first aspect and acquire the same effect as described above.

Note that, in the receiver, respective functions as the first filter section, the frequency converter, the second filter section, the envelope detector, the third filter section, and the remover forming the unnecessary signal remover, and a function as the FM detector, can be implemented by an analog circuit. The functions can be also implemented by a digital circuit or by arithmetic processing by a computer.

Therefore, upon construction of the acoustic wave communication system of the first aspect of the present invention, the receiver may be incorporated into various devices with a built-in microphone.

For example, if the receiver is incorporated into an information processor having a built-in computer having a microphone, such as a mobile information processing terminal or the like, the functions as the unnecessary signal remover and the FM detector can be implemented by software processing by the computer.

Further, the information processor including a computer is provided with an oscillator that generates an operation clock of the computer. Acoustic waves generated from the acoustic wave generator, such as a speaker, can be generated by dividing the operation clock output from the oscillator.

Therefore, also the transmitter can be incorporated in various devices including an information processor.

Upon incorporating the transmitter into the information processor including the acoustic wave generator, such as a speaker, the modulator may include a dividing circuit that divides the output from the oscillator that generates an operation clock of the computer, and, when the transmission data is transmitted in acoustic waves, a frequency division ratio of the dividing circuit may be switched in accordance with the transmission data by arithmetic processing of the computer.

That is, in this manner, the transmitter for acoustic wave communication can be configured very simply.

Note that, in the receiver, since the envelope detector generates unnecessary signal components by envelope detection of the received signal that has passed through the first filter section, the received signal passing through the first filter section may be a signal sufficiently containing unnecessary signal components.

On the other hand, since the second filter section is intended to extract the received signal for restoration of the transmission data by the FM detector, from among the received signals after frequency conversion, there is a need to remove signal components unnecessary for FM detection as much as possible.

Therefore, the first filter section and the second filter section of the receiver may be constituted by a band pass filter having a predetermined pass frequency band, and the selectivity of the first filter section may be lower than the selectivity of the second filter section.

(Example of a Device Suitable for Applying the Present Invention)

Next, a description is given of a mobile device suitable for taking advantage of such acoustic wave communication, an access information providing system suitable for providing access information to network equipment to a mobile terminal device using acoustic wave communication, an information providing device, and a mobile terminal device.

(1) Mobile Device

In the acoustic wave communication technique described in Patent Document 1 above and the acoustic wave communication according to the present invention, a speaker for outputting normal sound (e.g., voice, music, notification sound, etc.) can function as a transmitter for wireless communication, and a microphone for inputting normal sound can function as a receiver for wireless communication.

That is, there is an advantage, in the acoustic wave communication, of being able to transmit and receive data using the configuration for outputting normal sound, and a configuration for inputting normal sound.

Therefore, by configuring a mobile device as below, it is possible to take advantage of such acoustic wave communication, and put the acoustic wave communication to practical use.

[Mobile Device A1]

A mobile device including: a sound input unit that can input an acoustic wave signal included in sound to be reproduced by a receiver that receives and reproduces broadcast information; and a control unit that performs a reproduction-related process associated with content reproduced by the receiver based on information indicated by the acoustic wave signal input by the sound input unit.

According to the mobile device A1 configured in this way, the process associated with the content reproduced by the receiver can be performed by inputting the acoustic wave signal included in the sound reproduced by the receiver.

[Mobile Device A2]

The mobile device A1, further including an operation unit that accepts operation by a user, wherein the control unit performs a process associated with the reproduced content, which is a process based on the operation accepted by the operation unit, as the reproduction-related process.

According to the mobile device A2 configured in this manner, the process associated with the reproduced content, which is the process based on the operation by the user, can be executed.

[Mobile Device A3]

The mobile device A1 or A2, further including a presentation unit that presents information to the user, wherein the control unit urges the presentation unit to present information related to the reproduced content as the reproduction-related process.

According to the mobile device A3 having the configuration as described above, the user of the mobile device can acquire the information related to the reproduced content from the mobile device.

(2) Access Information Providing System

The access information providing system includes a mobile terminal device that communicates with network equipment via a wireless communication network, and an information providing device that provides the mobile terminal device with access information needed to access the network equipment.

In other words, it is known that the mobile terminal device, such as a mobile phone, a smart phone, a tablet terminal, etc., is configured accessible to network equipment on a wide area network (WAN) or a local area network (LAN) via a wireless communication network such as a wireless telephone line, wireless LAN, etc.

In order to allow the mobile terminal device of this type, to access desired network equipment on the network, it is necessary to input given access information, such as an IP address of the network equipment on the network, a URL of a Web server provided by the network equipment, or the like.

Then, if the user has to perform the input of such access information by manual operation, the input operation is very troublesome for the user unfamiliar with the operation of the mobile terminal device. In some cases, accurate access information may not be entered.

On the other hand, the following devices a) and b) are known as mobile terminal devices that allow easy input of such access information:

a) a device configured to read a two-dimensional code representing access information to a target network equipment to be connected, using a camera for imaging, and to decode the access information from the read two-dimensional code to enable access to the desired network equipment on the network (for example, see Japanese Unexamined Patent Application Publication No. 2003-67275); and b) a device configured to acquire access information to a target network equipment to be connected from other terminal devices, using a near field wireless communication function by Bluetooth or infrared rays, and to be able to access the desired network equipment on the network, using the acquired access information (for example, Japanese Patent Unexamined Application Publication No. 2004-139525).

However, the mobile terminal devices described in the above a) and b) are intended to acquire access information to the target network equipment to be connected, using a camera for two-dimensional code imaging provided in the mobile terminal device or using a near field communication device using radio waves or infrared rays.

For this reason, in a mobile terminal device that does not have the capability to extract and decode the two-dimensional code from the image captured by the camera, or, in a mobile terminal device having no near field communication function by radio waves or infrared rays, it is not possible to provide the techniques described in the above a) and b). That is, in this type of device, the user himself has to manually enter access information.

In contrast, use of the acoustic wave communication technique described in Patent Document 1 above and the acoustic wave communication according to the present invention allows implementation of an access information providing system described below, which can provide the mobile terminal device with access information to network equipment, without using a function for imaging and decoding a two-dimensional code or without using a near field communication function by radio or infrared rays.

[Access Information Providing System B1]

An access information providing system includes: a mobile terminal device that has a wireless communication section for communication with network equipment on a network via a wireless communication network; and an information providing device that provides the mobile terminal device with access information necessary to access the network equipment, wherein the information providing device includes a speaker for acoustic wave transmission, and a transmission section that converts the access information to audio signal transmittable from the speaker and outputs the audio signal to the speaker so that the access information is transmitted from the speaker in acoustic waves, and wherein the mobile terminal device includes a microphone that can receive the acoustic wave transmitted from the speaker, a restoration section that receives the acoustic wave transmitted from the speaker through the microphone and restores the access information from the received signal, and a communication control section that accesses the network equipment through the wireless communication section based on the access information restored by the restoration section to communicate with the network equipment.

As above, the access information providing system B1 includes the mobile terminal device provided with the wireless communication section for communication with the network equipment on the network over a wireless communication network, and the information providing device that provides the mobile terminal device with the access information necessary to access the network equipment.

The information providing device is provided with the speaker for acoustic wave transmission and the transmission section. The transmission section converts the access information to the network equipment to an audio signal that can be transmitted from the speaker and outputs the audio signal to the speaker, thereby causing the speaker to transmit the access information in acoustic waves.

On the other hand, the mobile terminal device is provided with a microphone that can receive the acoustic wave transmitted from the speaker of the information providing device.

When the acoustic wave transmitted from the speaker is received through the microphone, the restoration section restores the access information to the network equipment from the received signal, and the communication control section accesses the network equipment through the wireless communication section based on the access information that is restored in the restoration section to communicate with the network equipment.

That is, in the access information providing system B1, the access information is transmitted in acoustic waves from the information providing device to the mobile terminal device, such as a mobile phone, a smart phone, a tablet device, etc., using a microphone normally provided for call or audio input in the mobile terminal device.

Therefore, according to the access information providing systems B1, it is possible to provide the access information to the network equipment to the mobile terminal device having no capability to image and decode a two-dimensional code or no near field communication function by radio or infrared ray.

Further, the mobile terminal device is normally provided with a microphone for call or audio input and a signal processing circuit that processes audio signal input from the microphone and converts the audio signal to audio data.

Therefore, the mobile terminal device is able to restore the access information using these components. There is no need to separately provide, in the mobile terminal device, a microphone and a signal processing circuit for acknowledging the access information transmitted in acoustic waves from the information providing device. Increase in cost of the mobile terminal device can be suppressed.

Acoustic waves used to transmit the access information to the mobile terminal device from the information providing device may be in the audible frequency band, or may have a higher frequency band (i.e., ultrasonic waves).

[Access Information Providing System B2]

In the access information providing system B1, the information providing device is built in a receiver that tunes and demodulates broadcast signal of a predetermined broadcast channel from the received signal input from the outside, and the information providing device comprises an access information acquiring section that acquires an address on the network of the network equipment from the broadcast data acquired by tuning and demodulating the broadcast signal, and outputs the address to the transmission section as the access information.

That is, for example, the information providing device may be incorporated into the network equipment connected to a local area network (LAN) in a facility, such as a store, and may be configured to transmit access information to predetermined network equipment in acoustic waves to a mobile terminal device that has moved near the network equipment.

However, the information providing device may be incorporated in a receiver that tunes and demodulates broadcast signal of a predetermined broadcast channel from the received signal input from the outside.

Therefore, in the access information providing system B2, the access information acquiring section acquires the address of the network equipment that provides information related to the broadcast content from the broadcast data obtained by tuning and demodulating the broadcast signal in the receiver, and outputs the address to the transmission section as the access information.

As a result, according to the access information providing system B2, it is possible to automatically deliver access information to the network equipment that provides information related to the broadcast content to the mobile terminal device near the receiver. The user of the mobile terminal device can connect the mobile terminal device to the network equipment very easily.

[Access Information Providing System B3]

In the access information providing system B1 or B2, the information providing device includes a encrypted information generator that generates encrypted information including identification information of its own and key information for authentication; an encrypted information output section that, by outputting the encrypted information generated by the encrypted information generator to the transmission section, causes the transmission section to transmit the access information including the encrypted information in acoustic waves through the speaker, and a key information transmission section that encrypts the key information and transmits the encrypted key information to the network equipment in accordance with a transmission request from the network equipment. In the mobile terminal device, the restoration section restores the encrypted information and the access information from the received signal, the communication control section when accessing the network equipment through the wireless communication section based on the access information restored by the restoration section, transmits to the network equipment the encrypted information restored by the restoration section. The network equipment includes a key information transmission request section that restores the identification information and the key information from the encrypted information when acquiring the encrypted information from the mobile terminal device, and makes a transmission request for the key information to the information providing device via the network based on the restored identification information, and a key information determining section that acquires, as well as decrypts, the key information encrypted and transmitted from the information providing device in accordance with the transmission request by the key information transmission request section, and determines whether or not the decrypted key information is consistent with the key information acquired from the mobile terminal device and restored. When it is determined that the two pieces of key information are consistent with each other by the key information determining section, it is determined that the mobile terminal device and the information providing device are normal, and communication between the mobile terminal device and the information providing device is permitted.

In this way, in the access information providing system B3, the information providing device includes the encrypted information generator, the encrypted information output section, and the key information transmission section.

Here, the encrypted information generator generates the encrypted information including the identification information of the information providing device itself and the key information for authentication.

Then, the encrypted information output section, by outputting to the transmission section the encrypted information generated by the encrypted information generator, causes the transmission section to transmit the access information including the encrypted information in acoustic waves through the speaker.

Further, the key information transmission section encrypts the key information in accordance with the transmission request from the network equipment and transmits the encrypted key information to the network equipment.

Further, in the mobile terminal device, the restoration section restores the encrypted information and the access information from the received signal from the speaker, and the communication control section, based on the access information restored by the restoration section, transmits to the network equipment the encrypted information restored by the restoration section, when accessing the network equipment through the wireless communication section.

On the other hand, in the network equipment, when the encrypted information is received from the mobile terminal device, the key information transmission request section restores the identification information and the key information from the encrypted information, and, based on the restored identification information, makes a request for the key information to the information providing device over the network.

Then, from the information providing device, the encrypted key information is transmitted in accordance with the transmission request by the key information transmission request section. At the network equipment side, the key information determination section acquires and decrypts the key information, and determines whether the decrypted key information is consistent with the key information acquired from the mobile terminal device and restored.

When it is determined in the key information determining section that the key information acquired from the mobile terminal device and restored is consistent with the key information acquired from the information providing device and decrypted, the network equipment determines that the mobile terminal device and the information providing device are normal and permits communication between these devices.

Therefore, in the access information providing system B3, the network equipment can function as an authentication server that authenticates that the information providing device and the mobile terminal device are normal, and can improve the reliability of communication between the devices.

Therefore, according to the access information providing system B3, there is no need to manually enter, on the mobile terminal device, the access information to the network equipment or the key information for authentication of the mobile terminal device, in order to improve the reliability of communication. Therefore, usability of the mobile terminal device can be improved.

[Information Providing Device C1]

In an information providing device that provides a mobile terminal device having a wireless communication section for communication with network equipment on a network over a wireless communication network with access information necessary to access the network equipment, the information providing device includes: a speaker for acoustic wave transmission; and a transmission section that converts the access information to audio signal transmittable from the speaker and outputs the audio signal to the speaker, so thereby causing the speaker to transmit the access information in acoustic waves.

As above, the information providing device C1 is provided with the speaker for acoustic wave transmission and the transmission section. The transmission section converts the access information to audio signal that can be transmitted from the speaker and outputs the audio signal to the speaker, thereby causing the speaker to transmit the access information in acoustic waves.

Therefore, the access information providing system B1 described above can be established if the information providing device C1 is utilized.

[Information Providing Device C2]

In the information providing device C1, the information providing device is built in a receiver that tunes and demodulates a broadcast signal of a predetermined broadcast channel from the received signal input from the outside, and the information providing device includes an access information acquiring section that acquires an address of the network equipment on the network from broadcast data obtained by tuning and demodulating the broadcast signal, and outputs to the transmission section the address as the access information.

The information providing device C2 is built in the receiver that tunes and demodulates the broadcast signal of the predetermined broadcast channel from the received signal input from the outside.

Then, the information providing device C2 is provided with the address information acquiring section that acquires the address of the network equipment on the network from the broadcast data obtained by tuning and demodulating the broadcast signal, and outputs to the transmission section the address as the access information.

Therefore, the access information providing system A2 described above can be established if the information providing device C2 is utilized.

[Information Providing Device C3]

In the information providing device C1 or C2, the information providing device includes: an encrypted information generator that generates encrypted information including the identification information and the key information for authentication of the information providing device; an encrypted information output section that outputs the encrypted information generated by the encrypted information generator to the transmission section, thereby causing the transmission section to transmit the access information including the encrypted information in acoustic waves through the speaker; and a key information transmission section that, in accordance with the transmission request from the network equipment, encrypts the key information and transmits the encrypted key information to the network equipment.

As above, the information providing device C3 is provided with the encrypted information generator that generates encrypted information including the identification information and the key information for authentication of the information providing device itself, the encrypted information output section that outputs the encrypted information generated by the encrypted information generator to the transmission section, thereby causing the transmission section to transmit the access information including the encrypted information in acoustic waves through the speaker, and the key information transmission section that encrypts the key information and transmits the encrypted key information to the network equipment in accordance with the transmission request from the network equipment.

Therefore, if the information providing device C3 is utilized, the access information providing system B3 described above can be established.

[Mobile Terminal Device D1]

A mobile terminal device comprises: a wireless communication section for communication with network equipment on a network over a wireless communication network; a microphone receivable of an acoustic wave transmitted from a speaker of an information providing device; a restoration section that receives the acoustic wave transmitted from the speaker through the microphone and restores from the received signal access information provided by the information providing device; and a communication control section that accesses the network equipment through the wireless communication section based on the access information restored by the restoration section and communicates with the network equipment.

The mobile terminal device D1 is provided with the wireless communication section for communication with the network equipment on the network over the wireless communication network, and the microphone capable of receiving acoustic wave transmitted from the speaker of the information providing device.

Then, in the mobile terminal device D1, the restoration section receives the acoustic wave transmitted from the speaker through the microphone, and restores from the received signal the access information provided by the information providing device, and the communication control section accesses the network equipment through the wireless communication section based on the restored access information, and communicates with the network equipment.

Therefore, if the mobile terminal device D1 is utilized, it is possible to establish the access information providing system B1 or B2 described above.

[Mobile Terminal Device D2]

In the mobile terminal device D1, the restoration section restores, from the received signal, the encrypted information and the access information provided by the information providing device, and the communication control section, when accessing the network equipment through the wireless communication section based on the access information restored by the restoration section, transmits the encrypted information restored by the restoration section to the network equipment.

In the mobile terminal device D2, the restoration section restores, from the received signal of the acoustic wave acquired through the microphone, the encrypted information and the access information provided by the information providing device, the communication control section, when accessing the network equipment through the wireless communication section based on the access information restored by the restoration section, transmits the encrypted information restored by the restoration section to the network equipment.

Therefore, if the mobile terminal device D2 is utilized, the access information providing system (B3) described above can be established.

BRIEF DESCRIPTION OF THE DRAWINGS

FIG. 17 is a conceptual diagram of a broadcast system according to a third configuration example of the second embodiment.

EXPLANATION OF REFERENCE NUMERALS

1 . . . broadcast device, 1A . . . generation unit, 1B . . . transmission unit, 2 . . . receiver, 2A . . . receiving unit, 2B . . . reproduction unit, 2C . . . detection unit, 3 . . . mobile device, 3A . . . sound input unit, 3B . . . control unit, 3C . . . display unit, 3D . . . operation unit, 3E . . . communication unit, 3F . . . sound output unit, 10 . . . transmitter, 12 . . . additional value setup section, 14 . . . numerically controlled oscillator, 16 . . . D/A converter, 18 . . . LPF, 20 . . . amplifier circuit, 22 . . . speaker, 30 . . . receiver, 32 . . . microphone, 34 . . . amplifier circuit, 36 . . . LPF, 38 . . . A/D converter, 40 . . . unnecessary signal remover, 42 . . . BPF, 44 . . . oscillator, 46 . . . multiplier, 48 . . . BPF, 50 . . . amplitude detector, 52 LPF, 56 . . . divider, 60 . . . FM detector, 62 . . . delay section, 64 . . . multiplier, 66 . . . LPF, 68 . . . waveform shaping section, 70 . . . mobile information processing terminal, 72 . . . input section, 74 . . . display section, 76 . . . antenna, 78 . . . wireless communication section, 80 . . . control section (CPU), 82 . . . microphone, 83 . . . amplifier circuit, 84 . . . speaker, 85 . . . A/D converter, 86 . . . oscillator, 87 . . . D/A converter, 88 . . . amplifier circuit, 90 . . . simple transmitter, 92 . . . control section (microcomputer), 94 . . . oscillator, 96 . . . dividing circuit, 98 . . . speaker, 703 . . . router, 704 . . . terminating device, 706 . . . printer, 708 . . . access point, 710 . . . data processor, 712 . . . MPU, 713 . . . ROM, 714 . . . RAM, 715 . . . input section, 716 . . . display section, 717 . . . HDD, 718 . . . wired LAN communication section, 719 . . . oscillator, 720,720a . . . acoustic wave transmitter, 730 . . . mobile terminal, 732 . . . mobile telephone communication section, 734 . . . wireless LAN communication section, 735,735a to 735e . . . microphone, 736 . . . speaker, 737 . . . input section, 738 . . . display section, 739 . . . camera, 740 . . . control section, 741 . . . audio data input section, 742 . . . amplifier circuit, 743 . . . LPF, 744 . . . A/D converter, 746 . . . call data processor, 750,790a to 790e . . . acoustic wave communication receiving section, 766 . . . Internet, 767 . . . settlement terminal, 768 . . . authentication server, 769 . . . mobile telephone network, 770 . . . TV receiver, 772 . . . broadcasting station, 774 . . . web server, 777, 778 . . . dividing circuit, 779 . . . mixing circuit, 780 . . . receiving status determination section.

MODE FOR CARRYING OUT THE INVENTION

Embodiments of the present invention will now be described below with reference to the drawings.

First Embodiment

Figure 1:
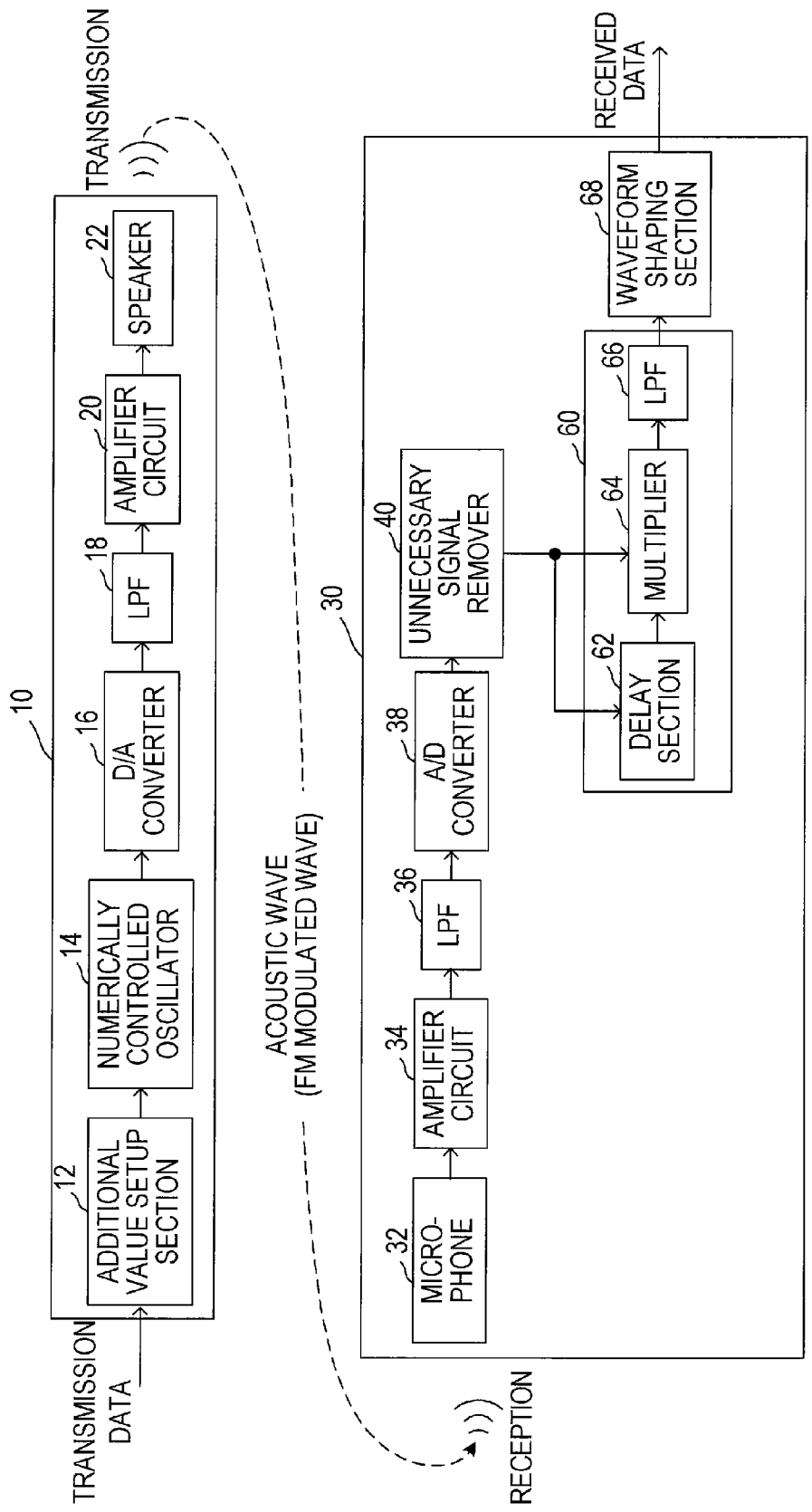
FIG. 1 is a block diagram showing a configuration of a transmitter and a receiver constituting an acoustic wave communication system according to a first embodiment.

As shown in FIG. 1, an acoustic wave communication system of the present embodiment includes a transmitter 10 with a built-in speaker 22, and a receiver 30 with a built-in microphone 32.

The transmitter 10 includes a numerically controlled oscillator 14 and an additional value setup section 12.

The numerically controlled oscillator 14 generates carrier waves (sine waves) in a frequency band capable of acoustic wave communication through the speaker 22 and the microphone 32.

The additional value setup section 12 sets an additional value in the numerically controlled oscillator 14 in accordance with transmission data, to cause thereby frequency modulation (FM) of the output from the numerically controlled oscillator 14.

The additional value setup section 12 and the numerically controlled oscillator 14 can be implemented through software processing by a computer.

That is, the numerically controlled oscillator 14 periodically repeats addition of the additional value set by additional value setup section 12, and reads an amplitude of the sine wave from a sine wave table, using the result of the addition, thereby generating a sine wave having a period (in other words, a frequency) corresponding to the additional value that is set by the additional value setup section 12, as is well known.

In the present embodiment, the additional value of the numerically controlled oscillator 14 is set in accordance with each bit value ("0" or "1") of the transmission data in the additional value setup section 12. Thereby, a transmission signal (frequency modulated signal) whose frequency varies in accordance with the transmission data is generated.

In the present embodiment, the transmission signal is generated by the processing operation of the additional value setup section 12 and the numerically controlled oscillator 14, so that the frequency of the transmission signal is 17.9 kHz when the value of the transmission data is "0", and the frequency of the transmission signal is 18.1 kHz when the value of the transmission data is "1".

Then, the transmission signal (data) generated by the numerically controlled oscillator 14, after being converted into an analog signal by a D/A converter 16, is output to an amplifier circuit 20 through a low-pass filter (hereinafter referred to as LPF) 18.

The amplifier circuit 20 amplifies the analog signal input through the LPF to a predetermined level, and outputs the same as an acoustic wave from the speaker 22.

Note that the LPF 18 removes unnecessary high frequency components from the transmission signal output from the D/A converter 16 (anti-aliasing LPF). In the present embodiment, the cutoff frequency is set to, for example, 20 kHz.

Meanwhile, the receiver 30 receives the acoustic wave output from the speaker 22 of the transmitter 10 through the microphone 32.

Then, the received signal is amplified by an amplifier circuit 34 to a predetermined level and input to an A/D converter 38 after the unnecessary high frequency components are removed in a LPF 36 configured similar to the LPF 18.

The sampling rate of the A/D converter 38 is set to, for example, "44100/second".

Then, the received signal A/D-converted by the A/D converter 38, after the unnecessary signal is removed by an unnecessary signal remover 40, is obtained through FM detection by a FM detector 60.

Then, the signal obtained through FM detection by the FM detector 60 is waveform-shaped into a binary signal by a waveform shaping section 68, and is output as received data.

Here, the unnecessary signal remover 40, FM detector 60 and the waveform shaping section 68 are implemented through software processing by a computer.

Of these, the FM detector 60, as shown in FIG. 1, is configured as a digital signal processing section of the quadrature detection method, which includes a delay section 62, a multiplier 64, and a LPF 66.

Note that the delay section 62 delays the phase of the received signal by π/2 (90°), the multiplier 64 multiplies the received signal delayed by a delay section 62 and the received signal from the unnecessary signal remover 40, and the LPF 66 removes unnecessary high frequency components from the multiplication result of the multiplier 64.

According to the FM detector 60, by performing quadrature detection of the received signal by the digital signal processing by the microcomputer, the frequency of the frequency modulated wave components of the received signal can be converted to baseband. Further, the transmission data can be restored.

Figure 2:
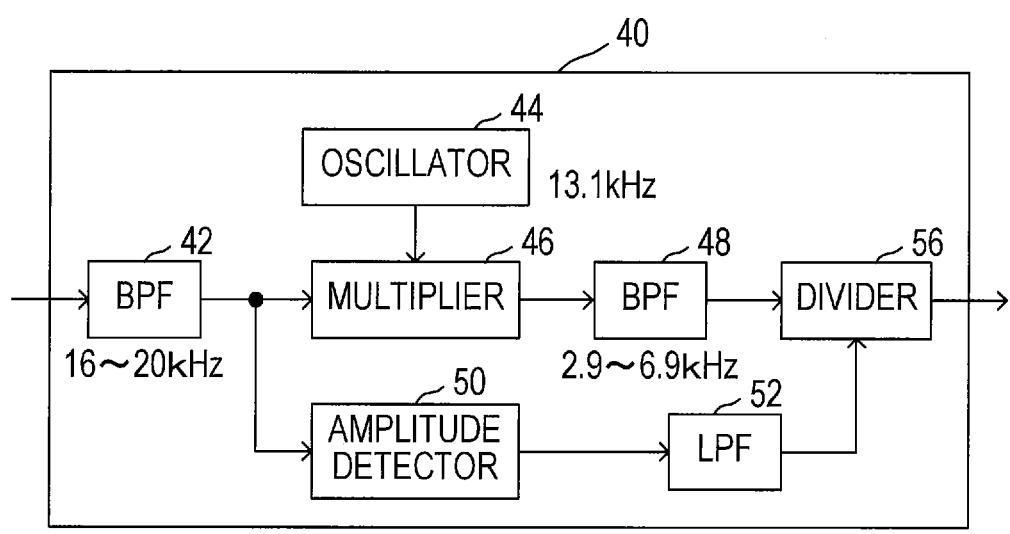
FIG. 2 is a block diagram showing a configuration of an unnecessary signal remover provided in the receiver.

Next, as shown in FIG. 2, the unnecessary signal remover 40 is provided with a bandpass filter (hereinafter referred to as BPF) 42, which is a digital filter, an oscillator 44, multiplier 46, a BPF 48, which is a digital filter, an amplitude detector 50, a LPF 52, which is a digital filter, and a divider 56.

The BPF 42 selectively passes (in other words, extracts) only a signal in a predetermined bandwidth (18 kHz±2 kHz, in the present embodiment) required to restore the transmission data in the FM detector 60, among the received signals input from the A/D converter 38.

The received signal that has passed through the BPF 42 is input to the multiplier 46 and the amplitude detector 50.

The multiplier 46 multiplies the received signal input through the BPF 42 and a local oscillation signal having a constant frequency (in this embodiment, 13.1 kHz) generated by the oscillator 44 to convert thereby the frequency of the received signal (frequency: 16 kHz to 20 kHz) to a prescribed intermediate frequency (2.9 kHz to 6.9 kHz).

The oscillator 44 generates a local oscillation signal having a constant frequency by dividing an operation clock of the microcomputer.

The BPF 48 selectively passes the received signal, of which frequency is converted to the intermediate frequency (2.9 kHz to 6.9 kHz), among the output from the multiplier 46. The passband width is set to 2.9 kHz to 6.9 kHz.

The received signal that has passed through the BPF 48 is input to the divider 56.

On the other hand, the amplitude detector 50 detects the envelope of the received signal input from BPF 42 to extract thereby unnecessary signal components superimposed on the received signal.

That is, in the present embodiment, the oscillation frequency of the numerically controlled oscillator 14 is changed in accordance with the value of the transmission data ("0" or "1") in the transmitter 10 to generate thereby a frequency modulated sine wave transmission signal. Thus, the transmission wave (acoustic wave) output from the speaker 22 of the transmitter 10 is as shown in the middle part of FIG. 3.

The amplitude of the transmission wave is constant. However, during acoustic wave communication, not only the transmission wave from the transmitter 10 but also the reflected wave of the transmission wave reflected on the surrounding objects are input as delay waves to the microphone 32 of the receiver 30.

Thus, the received signal input through the microphone 32 is a signal in which the transmission wave from the transmitter 10 and the delay wave are combined. The amplitude of the signal varies with the delay wave and change of the transmission path.

Therefore, in the present embodiment, in order to extract the varying components as unnecessary signal components based on the amplitude characteristics of the received signal, the envelope of the received signal is detected in the amplitude detector 50.

Further, the detection signal of which envelope is detected by the amplitude detector 50 is input to a LPF 52 that selectively passes unnecessary signal components, and the unnecessary signal components that have passed through the LPF 52 are input to the divider 56.

For example, the cutoff frequency of the LPF 52 is set to 1 kHz to 1.1 kHz. It is set in consideration of the fact that the transmission rate of the data from the transmitter 10 to the receiver 30 is set to be 2.2 kbps. The cutoff frequency of the LPF 52 may be appropriately set according to the communication speed.

Further, in the dividing section 56, by dividing the received signal input through the BPF 48 by the unnecessary signal components input through the LPF 52, the unnecessary signal components are removed from the received signals, and the received signal after the unnecessary signal components have been removed is output to the FM detector 60.

The processing time of the received signal by the multiplier 46 and the BPF 48 and the processing time of the received signal by the amplitude detector 50 and the LPF 52 are set to be the same. This is for synchronizing the received signal input to the divider 56 and the unnecessary signal components.

Moreover, the passband widths of frequency of the BPF 42 and the BPF 48 are the same. By making the taps of the BPF 42 smaller than the BPF 48, however, the selectivity of the BPF 42 is set lower than the selectivity of the BPF 48.

This is for allowing the amplitude detector 50 to take in more delay waves (so-called echo) and changes in the transmission path, and to generate the unnecessary signal components to be removed from the received signal more favorably.

As described above, according to the acoustic wave communication system of the present embodiment, in the transmitter 10, the frequency of the carrier wave in the audio frequency band receivable at the microphone is modulated by the transmission data to generate a transmission signal. As the transmission signal is output to the speaker 22, acoustic wave of which frequency has been modulated is transmitted.

Meanwhile, in the receiver 30 side, the acoustic wave from the transmitter 10 is received by using the microphone 32. Then, the envelope of the received signal is detected to extract unnecessary signal components, and the extracted unnecessary signal components are removed from the received signal.

Then, through FM detection of the received signal after removal of the unnecessary signal components, the transmission data from the transmitter 10 is restored as the received data.

Therefore, according to the acoustic wave communication system of the present embodiment, without having to transmit a pseudo-noise code from the transmitter 10, it is possible to accurately restore the transmission data from the transmitter 10 at the receiver 30 side.

Further, in order to be able to generate unnecessary signal components at the receiver side, there is no need to transmit a pseudo-noise code from the transmitter, or to obtain the multipath delay characteristic value based on the pseudo-noise code at the receiver side. Thus, the acoustic wave communication can be carried out at high speed with high accuracy.

Further, since the unnecessary signal components can be eliminated from the received signal at the receiver 30 side, data communication by acoustic wave communication can be favorably carried out even with a longer distance (communication distance) between the transmitter 10 and the receiver 30.

For example, in an acoustic wave communication system in which unnecessary signal components are not removed from the received signal using a pseudo-noise code or the like at the receiver side, it is necessary to closely position the speaker at the transmitter side and the microphone at the receiver side, like a so-called acoustic coupler, in order to ensure the communication quality.

In contrast, according to the acoustic wave communication system of the present embodiment, it is found that, not only when the transmitter 10 and the receiver 30 are in close contact with each other so that the acoustic wave output from the speaker 22 is directly input to the microphone 32, but also when the transmitter 10 and the receiver 30 are arranged at a distance of about 70 cm, data communication can be carried out without problems.

It is further found that, even if the transmitter 10 and the receiver 30 are arranged at a distance of about 10 cm and rocked at a rate of 50 cm/s, it is possible to continue the data communication.

Here in the present embodiment, the additional value setup section 12 and the numerically controlled oscillator 14 provided in the transmitter 10 correspond to an example of a frequency modulator of the present invention. Similarly, the amplifier circuit 20 and the speaker 22 provided in the transmitter 10 correspond to an example of an acoustic wave generator of the present invention. As the acoustic wave generator, it is also possible to use a buzzer, for example, a piezoelectric buzzer, which can be the source of the acoustic wave.

Further, the unnecessary signal remover 40 provided in the receiver 30 corresponds to an example of an unnecessary signal remover of the present invention. Similarly, the FM detector 60 provided in the receiver 30 corresponds to an example of an FM detector of the present invention.

Further, in the unnecessary signal remover 40, the BPF 42 corresponds to an example of a first filter section of the present invention, the oscillator 44 and the multiplier 46 correspond to an example of a frequency converter of the present invention, the BPF 48 corresponds to an example of a second filter section of the invention, the amplitude detector 50 corresponds to an example of an envelope detector of the present invention, the LPF 52 corresponds to an example of a third filter section of the present invention, and the divider 56 corresponds to an example of a remover of the present invention.

An embodiment of the present invention has been described in the foregoing. However, the present invention is not limited to the above embodiment and may take various modes without departing from the gist of the present invention.

For example, in the above embodiment, it is described that the additional value setting section 12 and the numerically controlled oscillator 14 of the transmitter 10, the unnecessary signal remover 40 of the receiver 30, the FM detector 60, and the waveform shaping section 68 are implemented through software processing by a computer. However, each of these components may be implemented by a digital circuit that performs digital signal processing or an analog circuit that performs analog signal processing.

Figure 4:
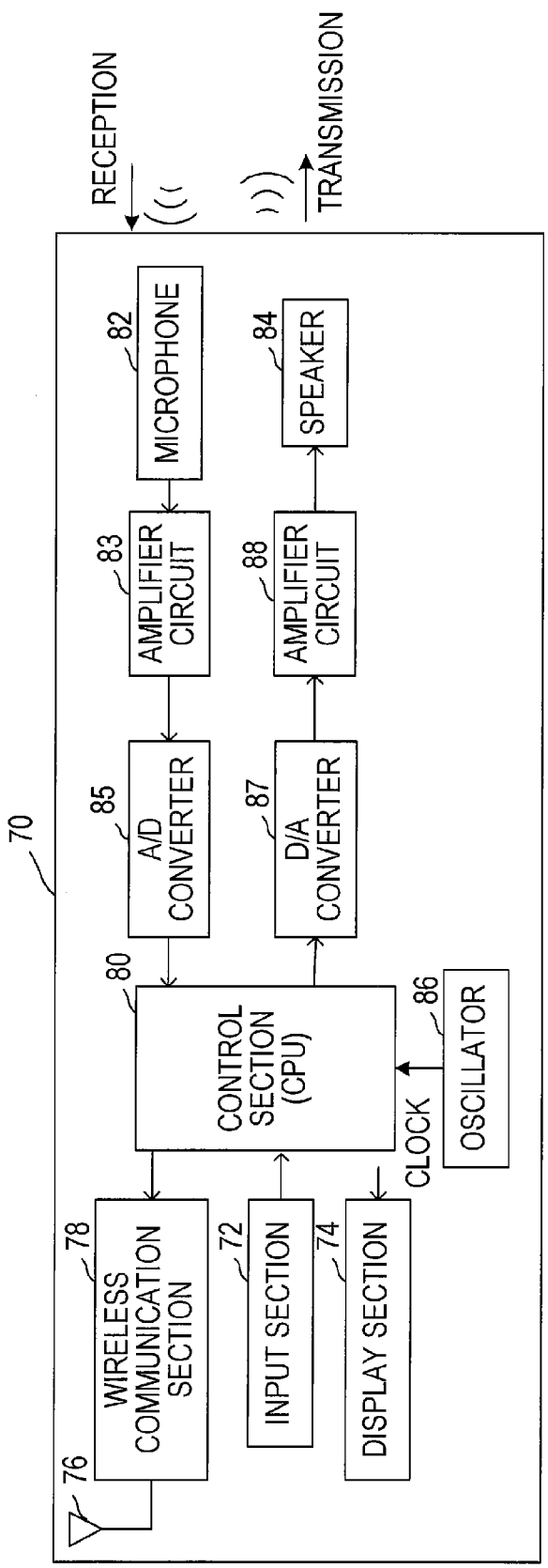
FIG. 4 is a block diagram illustrating a schematic configuration of a mobile information processing terminal that incorporates functions as a transmitter and a receiver for acoustic wave communication.

Further, as in the above embodiment, if each of these components is to be implemented through software processing by a computer, the transmitter or the receiver for acoustic wave communication can be implemented as a function of a computer system including a microphone and a speaker, as shown in FIG. 4.

Further, a mobile information processor, such as a cell phone, a smartphone, or a tablet computer, is typically provided with a microphone and a speaker. Thus, it is possible to incorporate the function of the transmitter and the receiver constituting the acoustic wave communication system of the present invention into the mobile information processor.

That is, as shown in FIG. 4, the mobile information processing terminal 70 is typically provided with an input section 72 including a touch panel and various key switches, a display section 74 including a liquid crystal display panel or the like, a wireless communication section 78 for wireless communication via an antenna 76, and a control section 80 including a computer (CPU).

The mobile information processing terminal 70 is also provided with a microphone 82 and a speaker 84 for the user to input or output voices for a call or the like, and is further provided with an oscillator 86 that generates an operation clock of the control section 80.

The microphone 82 is connected to the control section 80 via an amplifier circuit 83 that amplifies audio signal input from the microphone 82, and an A/D converter 85.

The speaker 84 is connected to the control section 80 via a D/A converter 87 for D/A conversion of an output (audio signal) from the control section 80 and an amplifier circuit 88 that amplifies the audio signal D/A converted by the D/A converter 87.

Therefore, in order to have this type of the mobile information processing terminal 70 function as the above described transmitter 10, it is sufficient to write a program for executing a transmission signal generation process, as the additional value setup section 12 and the numerically controlled oscillator 14 described above, in a storage medium (a rewritable nonvolatile memory, etc.) in the control section 80, and have the control section 80 (more particularly, CPU) execute the program, as required.

Further, in order to have the mobile information processing terminal 70 function as the above described receiver 30, it is sufficient to write a program for executing a received signal process, as the unnecessary signal remover 40, the FM detector 60, and the waveform shaping section 68 described above, in the storage medium in the control section 80, and have the CPU execute the program, as required.

Then, when the functions as the transmitter 10 and the receiver 30 are incorporated into the mobile information processing terminal 70 as described above, it becomes possible to transmit and receive desired data through acoustic wave communication between the mobile information processing terminals 70, thereby improving the usability of the mobile information processing terminal 70.

Further, for example, the transmitter 10 may be installed in a store or the like, near a display shelf of a product, and the URL of the website that provides a description of the product may be periodically transmitted.

In this way, a customer is able to acquire the URL from the transmitter 10, using the mobile information processing terminal 70 having the function as the receiver 30, and to browse the website. It is possible to expand the use of the radio communication system of the present invention.

Figure 5:
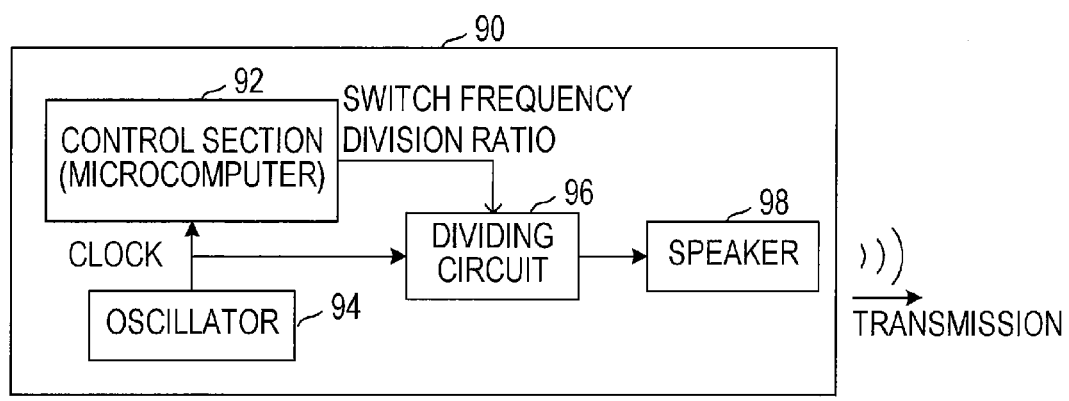
FIG. 5 is a block diagram showing a configuration of a simple transmitter that is configured as a single body of a transmitter.

In this case, the transmitter 10 can be configured by a simple transmitter 90 shown in FIG. 5.

That is, the simple transmitter 90 includes a control section 92 including a one-chip microcomputer, an oscillator 94 that generates an operation clock of the control section 92, a dividing circuit 96 that takes in the operation clock output from the oscillator 94 to the control section 92 and performs frequency division to generate thereby an oscillation signal having a desired frequency, and a speaker 98 that generates acoustic wave in response to the output from the dividing circuit 96.

Then, the control section 92, following the control program stored in an internal memory (ROM), switches the division ratio of the dividing circuit 96 in accordance with the transmission data. Thereby, the frequency-modulated signal of which frequency is switched in accordance with the data value of the transmission data is output from the dividing circuit 96.

As a result, the acoustic wave of which frequency has been modulated in accordance with the transmission data is outputted from the speaker 98.

Since the simple transmitter 90 can be constructed with very few components and can reduce the size and cost, the simple transmitter 90 may be used in transmission of various types of information.

Figure 3:
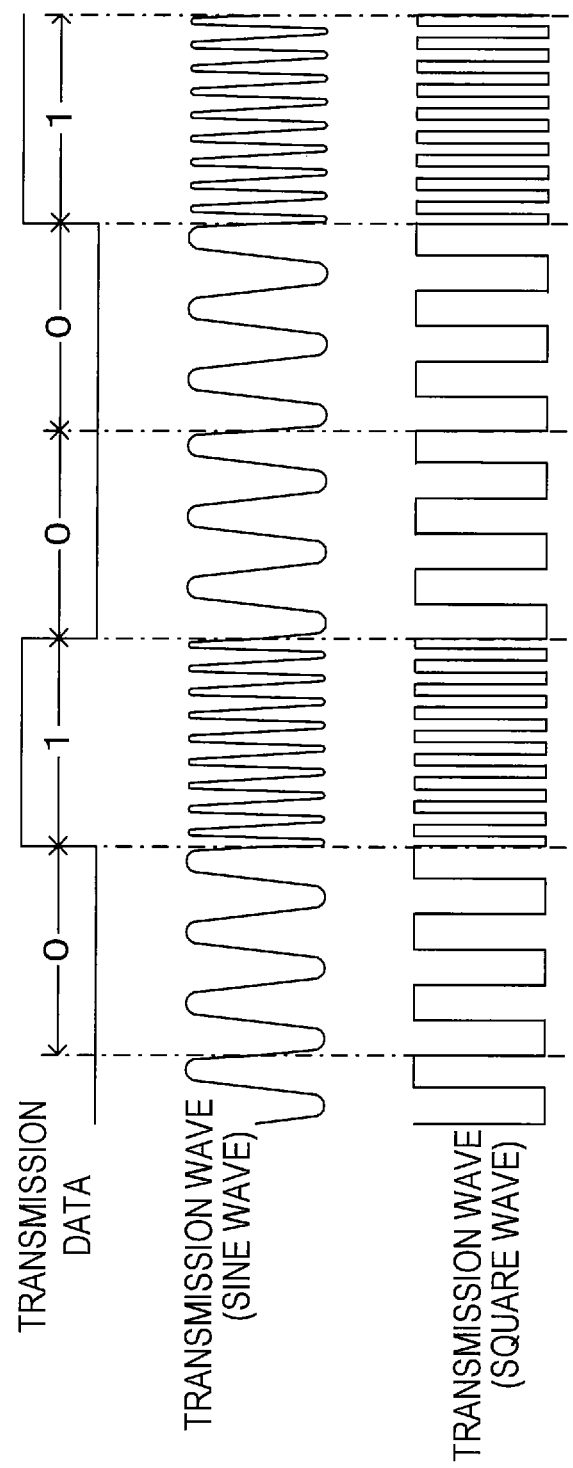
FIG. 3 is an explanatory diagram showing a transmission signal from the transmitter.

Note that, in the simplified transmitter 90, the signal generated by the dividing circuit 96 has a rectangular wave and thus, as shown in the lower part of FIG. 3, the transmission wave from the speaker 98 also has a rectangular wave. However, even if such rectangular acoustic wave is transmitted, the transmission data can be restored normally at the receiver side.

Further, for example, if the transmission function equivalent to that of the above described simple transmitter 90 (i.e., transmission function using a dividing circuit) is incorporated into various sensors with a built-in microcomputer, such as an electronic thermometer or a bar-code reader, and the detected data such as a temperature or a bar code is transmitted in acoustic waves, it is possible to manage various kinds of detected data, using the mobile information processing terminal 70 serving as the receiver 30.

Further, when the functions as the transmitter 10 and the receiver 30 are incorporated into the mobile information processing terminal 70 including a wireless communication section 78 as shown in FIG. 4, it is possible to perform communication settings of a wireless LAN using the wireless communication section 78 in acoustic wave communication. In this case, however, there is a need to incorporate the function of acoustic wave communication also into a wireless LAN router, etc.

Second Embodiment

Next, a mobile device and the peripheral systems suitable to take advantage of acoustic wave communication will be described as a second embodiment.

[1. Overall Configuration]

Figure 6:
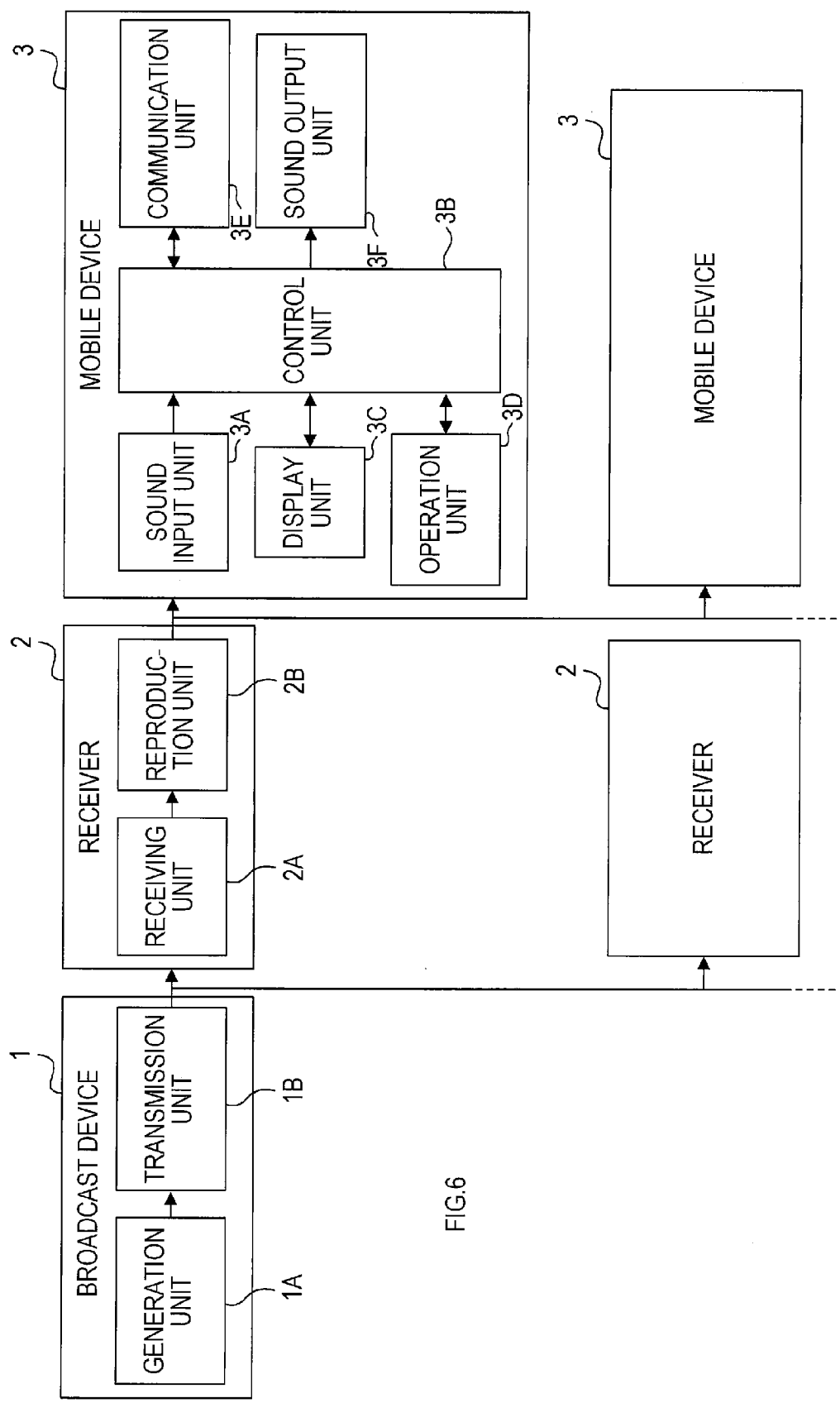
FIG. 6 is a block diagram showing a conceptual configuration of a broadcast system according to a second embodiment.

FIG. 6 is a block diagram showing a conceptual configuration of a broadcast system according to the embodiment. The broadcast system includes a broadcast device 1, a receiver 2, and a mobile device 3.

The broadcast device 1 is a device that generates and transmits (broadcasts) broadcast information. In one example, the broadcast information represents image and sound of a television broadcast. In another example, the broadcast information represents sound of a radio broadcast. For example, the broadcast device 1 is used at a broadcast station such as a television broadcast, a radio broadcast, etc.

In particular, the broadcast device 1 includes a generation unit 1A and a transmission unit 1B. The generation unit 1A generates broadcast information. The transmission unit 1B transmits (broadcasts) the broadcast information generated by the generation unit 1A. The transmitted broadcast information is receivable by the receiver(s) 2 (usually many receivers 2).

The receiver 2 is a device that receives and reproduces broadcast information. The receiver 2 is a television broadcast receiver in one example, and a radio broadcast receiver in another example. The receiver 2 has at least a function of reproducing sound represented by the broadcast information.

Specifically, the receiver 2 includes a receiving unit 2A, and a reproduction unit 2B. The receiving unit 2A receives the broadcast information transmitted (broadcast) from the broadcast device 1 via a broadcasting network, the Internet, or the like. The reproduction unit 2B reproduces sound, etc. represented by the broadcast information received by the receiving unit 2A. The reproduced sound can be input in one or more devices having a function of sound input.

The mobile device 3 is a device the user can carry. In one example, the mobile device 3 is a communication device (such as a mobile phone or a tablet device, for example) capable of communication over a telephone network or the Internet. The mobile device 3 has at least a function of audio input.

Specifically, the mobile device 3 includes a sound input unit 3A, a control unit 3B, a display unit 3C, an operation unit 3D, a communication unit 3E, and a sound output unit 3F.

The sound input unit 3A inputs acoustic wave signal in a specific frequency band included in the sound reproduced by the receiver 2. In one example, the sound input unit 3A inputs acoustic wave signal, using a microphone for sound input.

The control unit 3B includes a memory for storing programs, a processor for executing the programs, etc., and performs processes based on information represented by the acoustic wave signal input by the sound input unit 3A.

The display unit 3C displays digital image (picture in a broad sense, including also characters) on the display screen. The operation unit 3D receives operations by a user. The communication unit 3E performs communication, etc. over a telephone network or the Internet. The sound output unit 3F outputs sound.

[2. Acoustic Wave Signal]

Now, a description on acoustic wave signal will be made.

An acoustic wave signal is a signal carried by an acoustic wave in a frequency band that can be output from a speaker and input from a microphone.

With communication using such a signal (acoustic wave communication), it is possible to transmit and receive data by using a speaker and a microphone.

The acoustic wave communication can utilize the acoustic wave communication system of the first embodiment described in FIGS. 1-5. Although the broadcast system of FIG. 6 may be constructed using at least a portion of the configuration of the acoustic wave communication system described in the first embodiment, it is also possible to use other known configurations as described in Patent Document 1.

[3. Configuration Example]

Now, a specific configuration example will be described.

[3-1. First Configuration Example]

First, a configuration example in which the present invention is applied to teleshopping will be described as the first configuration example. Teleshopping as used herein is a service to sell and buy a product in which a product seller introduces the product to the user as a viewer who views a program using a receiver for television broadcast, and receives intention of purchase from the user.

In teleshopping, the user needs to utilize a means other than a receiver for television broadcast (phone or Internet, for example) to transmit intention of purchase to the product seller.

Therefore, in the case of using a telephone, the user must perform the operation to input a telephone number of the product seller to the phone.

Further, in the case of using the Internet, the user must perform an operation (such as a search operation or an input operation of URL, for example) for browsing web pages of the product seller to an Internet accessible electronic device (such as a PC or a mobile phone, for example).

Such operation is cumbersome for the user, and may cause the user reluctance to purchase the product.

In order to solve such a problem, in the first configuration example, necessary information is transmitted, using the acoustic wave communication technology, from the receiver through which the product seller introduces the product to the user, to the mobile device carried by the user.

Overall configuration of the broadcast system of the first configuration example is shown in FIG. 6.

In the first configuration example, a broadcast device 1 is a device that generates information representing image and sound of television broadcast as broadcast information and transmits (broadcasts) the same at a broadcast station of the television broadcast.

Figure 7:
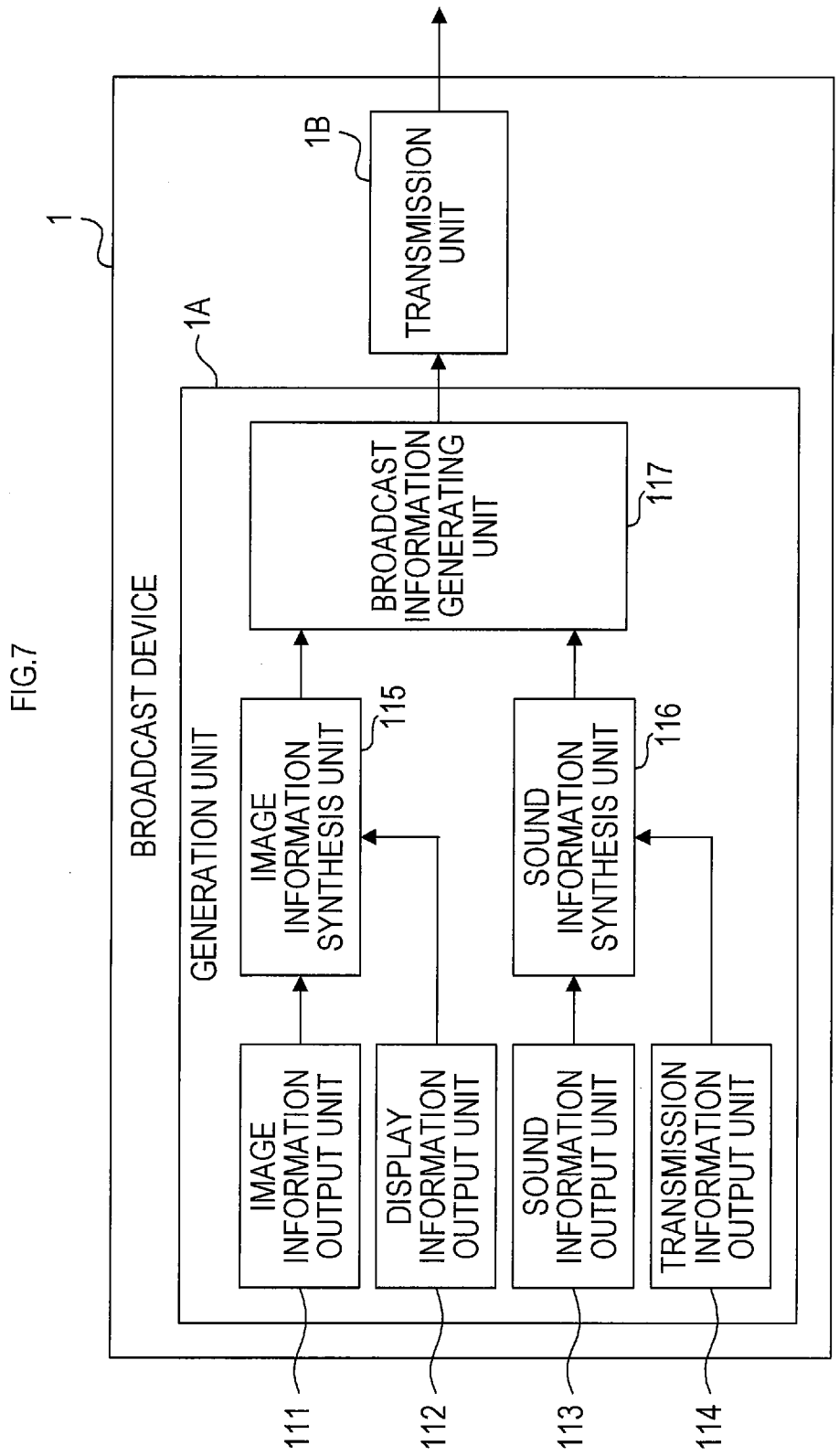
FIG. 7 is a block diagram showing a configuration of a broadcast device according to a first configuration example of the second embodiment.

Specifically, as shown in FIG. 7, a generation unit 1A includes an image information output unit 111, a display information output unit 112, a sound information output unit 113, a transmission information output unit 114, an image information synthesis unit 115, a sound information synthesis unit 116, and a broadcast information generation unit 117.

The image information output unit 111 outputs original image information. The original image information indicates an original image prior to superimposition of an image represented by display information to be described later, for example, an image captured by a camera, an image edited after shooting, and the like.

The display information output unit 112 outputs display information to be superimposed on the original image and displayed. In the case of teleshopping, the display information indicates an image (picture), such as product number (identification information of the product) 410, product name 420, price of the product (price of the product itself and the delivery charge) 430, phone number 440 of the product seller, Internet address of the product seller 450 (URL of the web page or the site name, for example).

The sound information output unit 113 outputs original sound information. The original sound information represents original sound before adding transmission information to be described later, for example, sound recorded by the microphone (voice or music), or sound edited after recording.

The transmission information output unit 114 outputs the transmission information to be reproduced with the original sound. The transmission information represents an acoustic wave signal.

The image information synthesis unit 115 receives the original image information output from the image information output unit 111, and the display information output from the display information output unit 112.

The image information synthesis unit 115 generates image information acquired by superimposing the image represented by the display information on the original image represented by the original image information (i.e., synthesizes the original image information with the display information), and outputs the generated information to the broadcast information generation unit 117.

The sound information synthesis unit 116 receives the original sound information output from the sound information output unit 113, and the transmission information output from the transmission information output unit 114.

The sound information synthesis unit 116 generates sound information acquired by adding the sound represented by the transmission information to the original sound represented by the original sound information (i.e., synthesizes the original sound information with the transmission information), and outputs the generated information to the broadcast information generation unit 117.

The broadcast information generation unit 117 receives the image information output from the image information synthesis unit 115 and the sound information output from the sound information synthesis unit 116, generates broadcast information including the image and sound information, and outputs the generated information to the transmission unit 1B.

Note that, as described above, the transmission unit 1B transmits (broadcasts) the broadcast information generated by the generation unit 1A.

In the first configuration example, the receiver 2 is an apparatus that receives the broadcast information of the television broadcast transmitted (broadcast) by the broadcast device 1 such as via the broadcast network or the Internet, and reproduces the image and sound represented by the broadcast information (television broadcast receiver).

Figure 8:
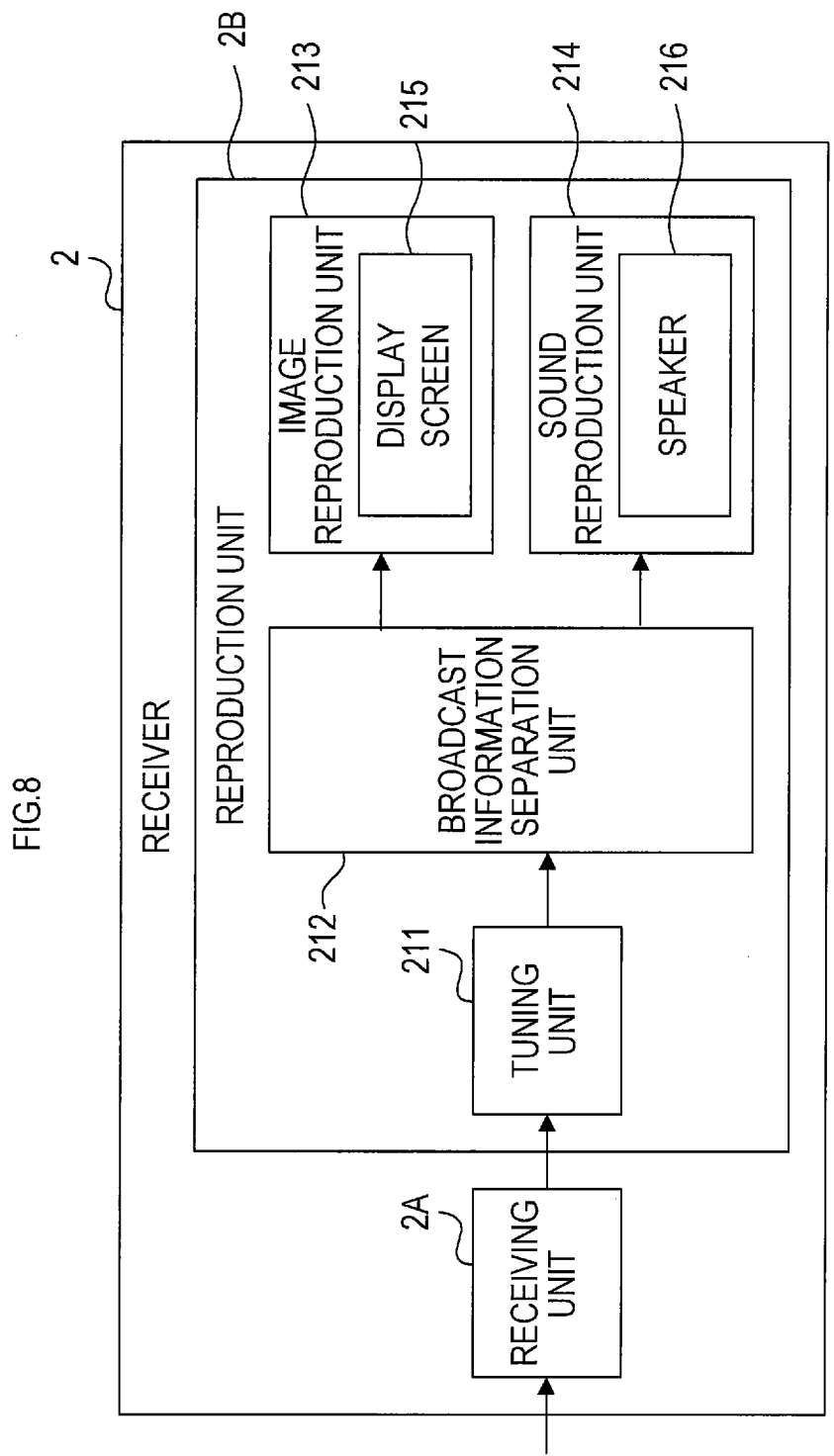
FIG. 8 is a block diagram showing a configuration of a receiver according to the first configuration example of the second embodiment.

Specifically, as shown in FIG. 8, the reproduction unit 2B includes a tuning unit 211, a broadcast information separation unit 212, an image reproduction unit 213, and a sound reproduction unit 214.

As already described above, the receiving unit 2A receives the broadcast information transmitted (broadcast) by the broadcast device 1 such as via the broadcast network or the Internet, and outputs the received information to the reproduction unit 2B. The receiving unit 2A receives the broadcast information of a plurality of channels.

The tuning unit (tuner) 211 selects broadcast information of the currently selected channel out of the broadcast information of a plurality of channels included in the broadcast information output from the receiving unit 2A, and outputs the selected broadcast information to the broadcast information separation unit 212.

The broadcast information separation unit 212 receives the broadcast information output from the tuning unit 211, and separates the image information from the sound information included in the broadcast information, and outputs the image information to the image reproduction unit 213, and the sound information to the sound reproduction unit 214.

The image reproduction unit 213 includes a display screen 215 for displaying images. The image reproduction unit 213 receives the image information output from broadcast information separation unit 212, and displays the image represented by the image information on the display screen 215.

The sound reproduction unit 214 includes a speaker 216 for outputting sound. The sound reproduction unit 214 receives the sound information output from the broadcast information separation unit 212, and outputs the sound represented by the sound information from the speaker 216.

In the first configuration example, the mobile device 3 is a mobile telephone (including a so-called smart phone) that may be carried by the user and enables communication via a telephone network or the Internet.

Figure 9:
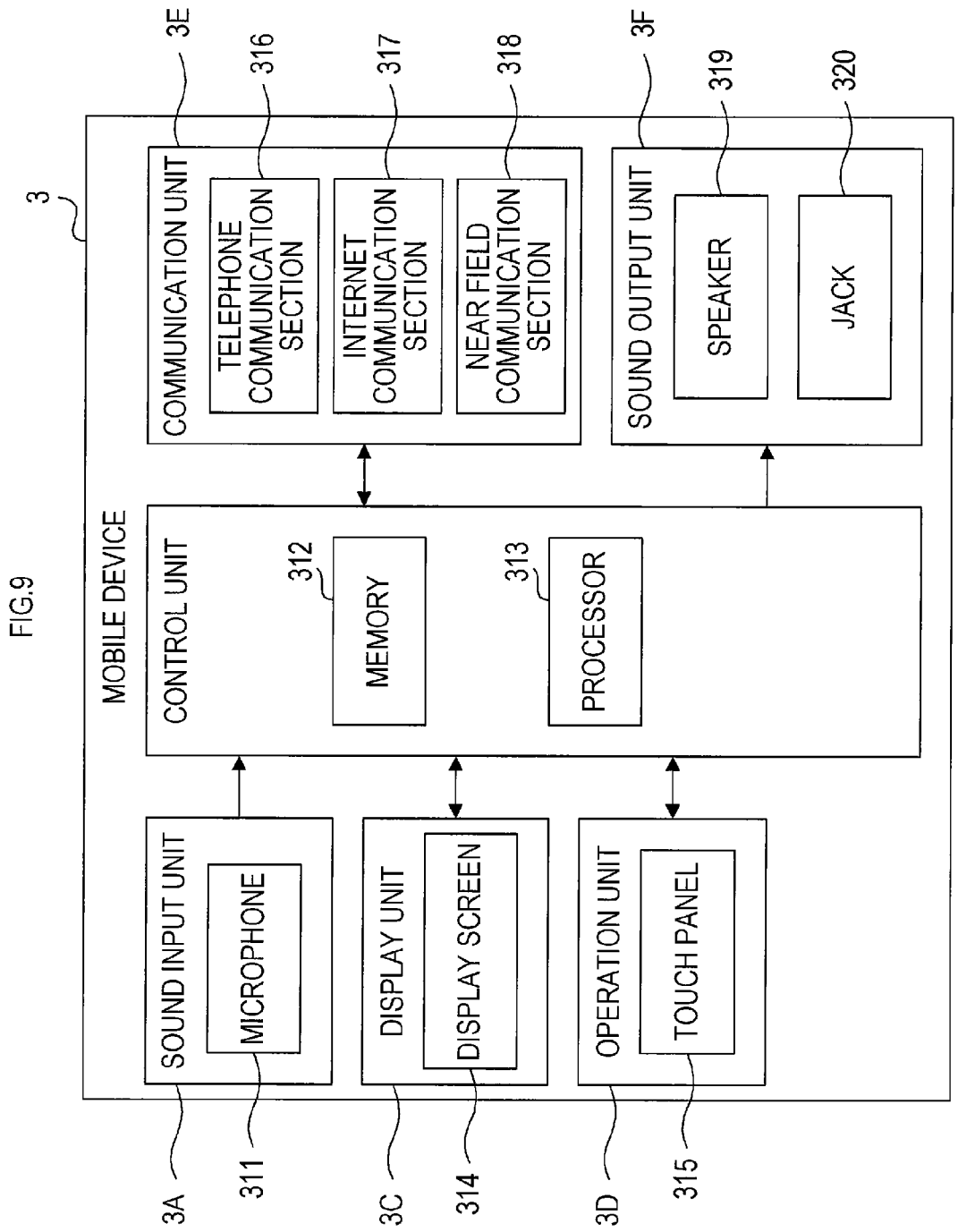
FIG. 9 is a block diagram showing a configuration of a mobile device according to the first configuration example of the second embodiment.

Specifically, as shown in FIG. 9, the sound input unit 3A includes a microphone 311 for receiving sound. The microphone 311 can receive not only sound such as voice and music reproduced by the receiver 2, but also the acoustic wave signal having a specific frequency band included in the sound reproduced by the receiver 2. The sound input unit 3A outputs the received acoustic wave signal to the control unit 3B.

The control unit 3B includes a memory 312 that stores a program, and a processor 313 that executes the program. The control unit 3B performs a process based on information represented by the acoustic wave signal input by the sound input unit 3A.

The display unit 3C includes a display screen 314 that displays various information (for example, characters and pictures) to be viewed by the user. The display unit 3C displays information represented by the acoustic wave signal on the display screen 314 in accordance with a command from the control unit 3B.

The operation unit 3D is provided with a touch panel 315 that accepts an operation by the user. The touch panel 315 is a transparent panel and is provided on top of the display screen 314. The operation unit 3D accepts a user operation on the information represented by the acoustic wave signal displayed on the display screen 314, and outputs to the control unit 3B information indicating the content of the operation.

The communication unit 3E includes a telephone communication section 316 for performing communication via a telephone network, an Internet communication section 317 for performing communication via the Internet, and a near field communication section 318 for performing near field wireless communication.

The communication unit 3E performs processes such as to make a call to a specified phone number, to send information to a given Internet address, and receive information, in accordance with a command from the control unit 3B.

As the near field wireless communication, near field wireless communication in accordance with, for example, the Bluetooth (registered trademark) specification, Wi-Fi (registered trademark) standard or the like may be used.

The sound output unit 3F includes a speaker 319 for outputting sound, and a jack 320 for connecting a headphone or the like, and outputs sound (for example, voice or music) from the speaker 319 or the jack 320, in accordance with a command from the control unit 3B.

Figure 10:
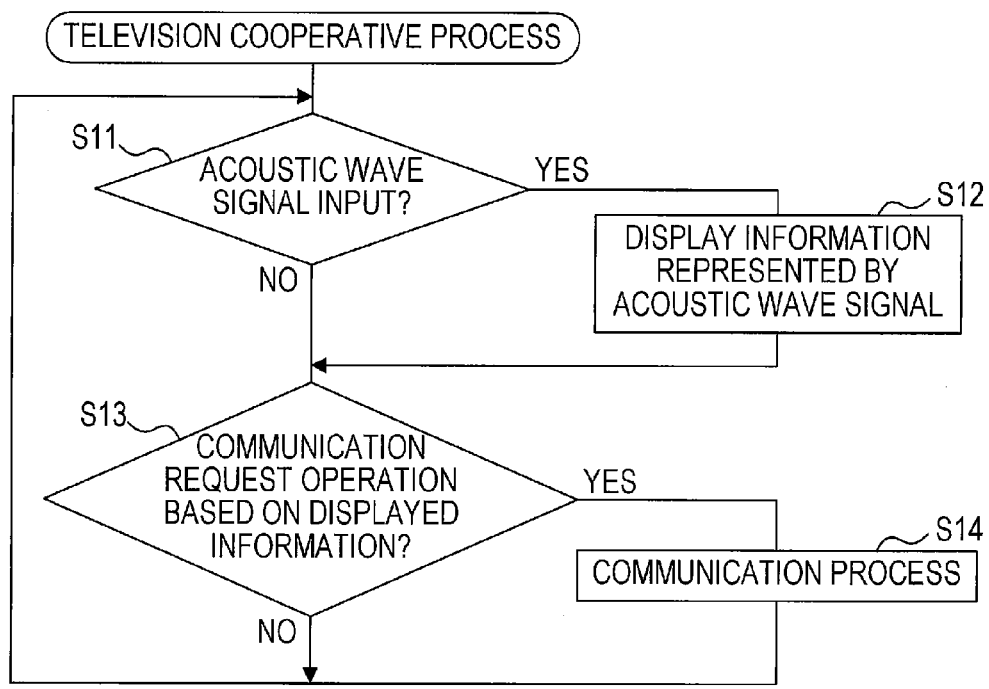
FIG. 10 is a flowchart of a television cooperative process according to the second embodiment.

Next, description will be given, with reference to the flowchart of FIG. 10, of a television cooperative process executed by the processor 313 according to the program stored in the memory 312 in the control unit 3B of the mobile device 3.

The television cooperative process may be executed at all times, for example, in a state where a particular application is running in the mobile device 3.

Further, the television cooperative process may be initiated, for example, when a specific operation is performed, and may be completed when a predetermined termination condition is satisfied thereafter (after a certain time, for example).

Further, for example, the television cooperative process may be executed at all times when the power of the mobile device 3 is on.

In S11, the processor 313 determines whether an acoustic wave signal is input by the sound input unit 3A. If it is determined that the acoustic wave signal is input, the processor 313 shifts the process to S12, displays information represented by the acoustic wave signal on the display unit 3C (display screen 314), and then shifts the process to S13.

On the other hand, if it is determined that the acoustic wave signal is not input in S11, the processor 313 skips S12 and shifts the process to S13.

In S13, the processor 313 determines whether or not the information represented by the acoustic wave signal is displayed on the display screen 314, and a communication request operation based on the information is performed.

If it is determined that the communication request operation is performed, the processor 313 shifts the process to S14, and, after executing the communication requested by the communication unit 3E, shifts the process to S11.

On the other hand, if it is determined that the communication request operation is not yet performed, the processor 313 skips S14 and shifts the process to S11.

Figure 11:
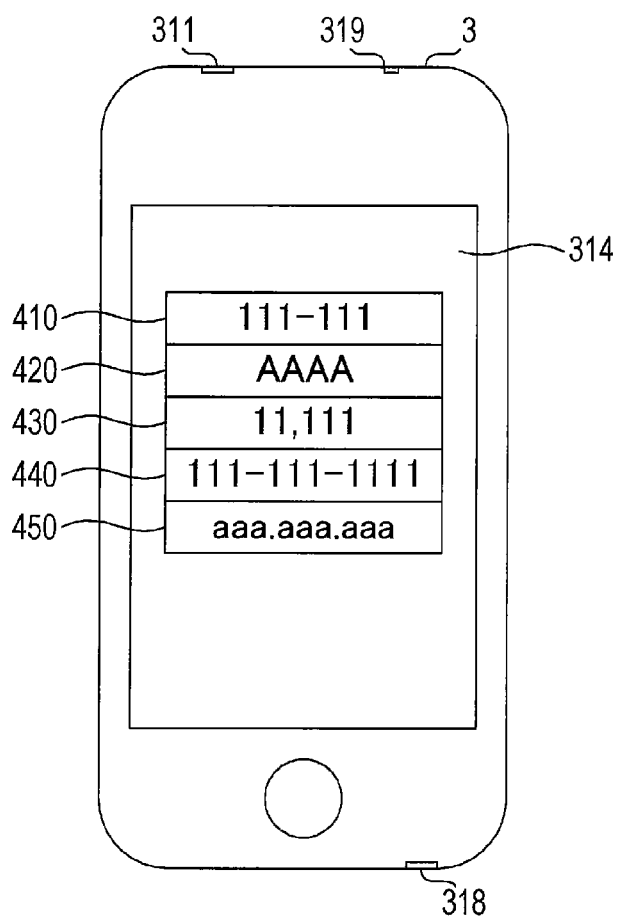
FIG. 11 is a conceptual diagram of the broadcast system according to the first configuration example of the second embodiment.

FIG. 11 is a conceptual diagram of a broadcast system of the first configuration example.

The receiver 2 receives broadcast information of a teleshopping broadcast by a broadcast station of the television broadcast (broadcast device 1), displays on the display screen 215 an image represented by the received broadcast information, and outputs sound represented by the received broadcast information from the speaker 216.

In the image displayed on the display screen 215, as information about the product being introduced, product information such as the product number (identification information of the product) 410, product name 420, product price (such as the price of the product itself and delivery charge) 430, phone number 440 of the product seller, Internet address (such as URL or site name, for example) 450 of the product seller, etc. is superimposed on the original image as display information.

Further, the sound output from the speaker 216 includes the acoustic wave signal representing the product information displayed on the display screen 215.

The mobile device 3 receives the sound output from the speaker 216 through the microphone 311 and displays information (product information displayed on the display screen 215) represented by the acoustic wave signal included in the sound on the display screen 314.

When the operation of selecting the telephone number 440 is performed on the touch panel 315, the mobile device 3 performs a process to make a call to the telephone number.

When the operation of selecting an Internet address 450 is performed on the touch panel 315, the mobile device 3 performs a process to access the Internet address.

As the process to access the Internet address, the mobile device 3 may perform, for example, a process of acquiring web page data.

[3-2. Second Configuration Example]

The following describes a configuration example in which the present invention is applied to radio shopping as a second configuration example.

The radio shopping as used herein is a service to sell and buy a product in which a product seller introduces the product to the user as a listener who listens to a program using a receiver for radio broadcast, and receives intention of purchase by the user.

In radio shopping, the user as a listener, as well as the user as a viewer of teleshopping described above, needs to use a means other than the receiver for the radio broadcast (such as a telephone or the Internet, for example) to inform the product seller of intention to purchase.

Therefore, in the second configuration example, necessary information is transmitted from the receiver for the product seller to introduce the product to user to the mobile device carried by the user by means of acoustic wave communication technology.

Overall configuration of the broadcast system of the second configuration example is shown in FIG. 7. In the second configuration example, the broadcast device 1 is a device that generates information representing sound of the radio broadcast as broadcast information, in a broadcast station of the radio broadcast, and transmits (broadcasts) the generated information. An example of the radio broadcast is, for example, digital broadcast.

Figure 12:
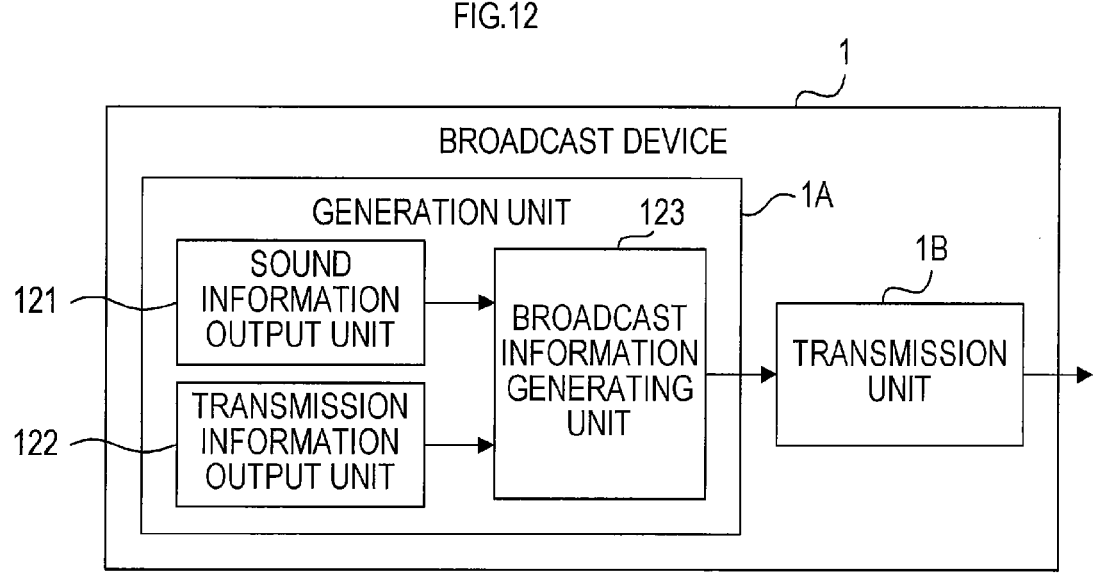
FIG. 12 is a block diagram showing a configuration of a broadcast device according to a second configuration example of the second embodiment.

Specifically, as shown in FIG. 12, the generation unit 1A includes a sound information output unit 121, a transmission information output unit 122, and a broadcast information generating unit 123.

The sound information output unit 121 outputs original sound information. The original sound information represents original sound before the transmission information is added, such as, for example, sound recorded by a microphone (voice or music), sound edited after recording, or the like.

The transmission information output unit 122 outputs transmission information to be reproduced with the original sound. The transmission information represents an acoustic wave signal.

The broadcast information generating unit 123 receives the original sound information output from the sound information output unit 121, and the transmission information output from the transmission information output unit 122.

The broadcast information generating unit 123 adds the sound represented by the transmission information to the original sound represented by the original sound information (i.e., synthesizes the transmission information with the original sound information) to generate sound information, generates broadcast information including the generated sound information, and outputs the generated broadcast information to the transmission unit 1B.

Note that, as described above, the transmission unit 1B transmits (broadcasts) the broadcast information generated by the generation unit 1A.

In the second configuration example, the receiver 2 is a device (radio broadcast receiver) that receives the broadcast information of the radio broadcast transmitted (broadcast) by the broadcast device 1 such as via a broadcast network or the Internet, and reproduces the sound represented by the broadcast information. The receiver 2 is, for example, mounted on an automobile.

Figure 13:
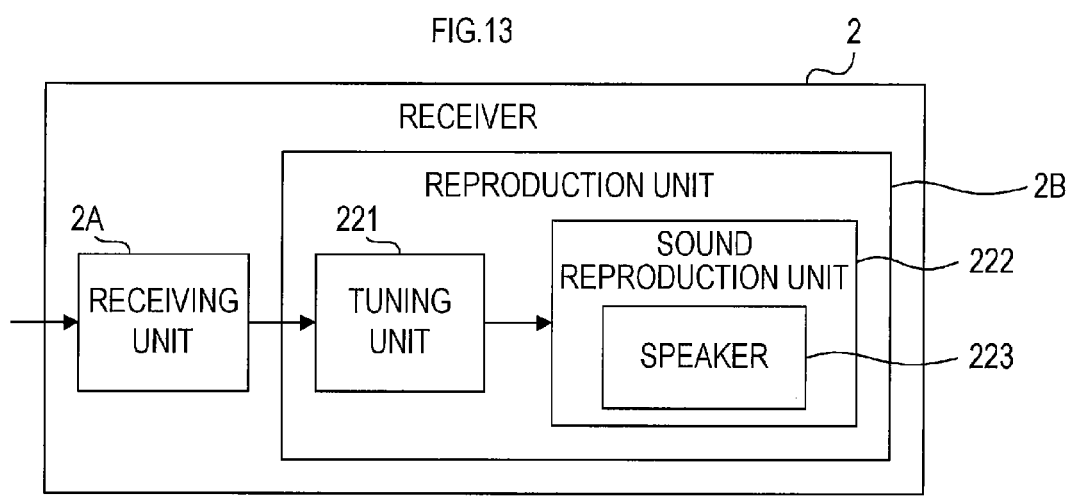
FIG. 13 is a block diagram showing a configuration of a receiver according to the second configuration example of the second embodiment.

Specifically, as shown in FIG. 13, the reproduction unit 2B includes a tuning unit 221, and a sound reproduction unit 222. As already described above, the receiving unit 2A receives the broadcast information transmitted (broadcast) by the broadcast device 1 such as via a broadcast network or the Internet, and outputs the broadcast information to the reproduction unit 2B.

The tuning unit (tuner) 221 selects broadcast information of the currently selected channel out of the broadcast information of a plurality of channels included in the broadcast information output from the receiving unit 2A, and outputs the selected broadcast information to the sound reproduction unit 222.

The sound reproduction unit 222 includes a speaker 223 for outputting sound. The sound reproduction unit 222 receives the broadcast information output from the tuning unit 221, and outputs sound represented by the broadcast information from the speaker 223.

In the second configuration example, the mobile device 3 is a mobile telephone (including a so-called smart phone) that may be carried by the user and enables communication via a telephone network or the Internet. Since the hardware configuration of the mobile device 3 is the same as that of the first configuration example (FIG. 9) described above, the description thereof is not repeated.

Figure 14:
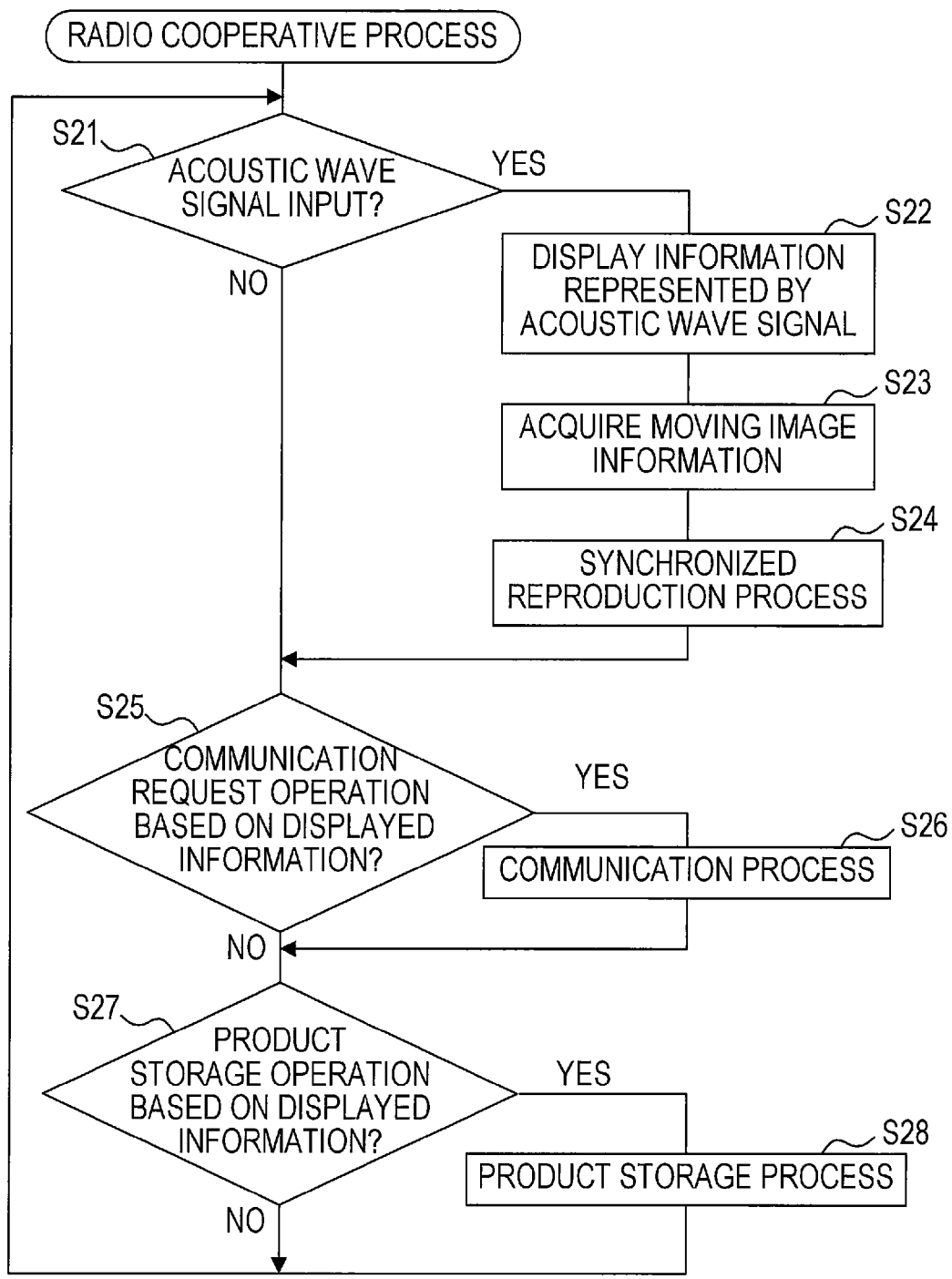
FIG. 14 is a flowchart of a radio cooperative process according to the second embodiment.

Next, description will be given, with reference to the flowchart of FIG. 14, of a radio cooperative process to be executed by the processor 313 according to a program stored in the memory 312 in the control unit 3B of the mobile device 3.

The radio cooperative process may be executed at all times, for example, in a state where a particular application is running in the mobile device 3. Further, the radio cooperative process may be initiated, for example, when a specific operation is performed, and may be completed when a predetermined termination condition is satisfied thereafter (after a certain time, for example). Further, the radio cooperative process may be executed at all times, for example, when the power of the mobile device 3 is on.

In S21, the processor 313 determines whether an acoustic wave signal is input by the sound input unit 3A. If it is determined that an acoustic wave signal is input, the processor 313 shifts the process to S22, and displays information represented by the acoustic wave signal on the display unit 3C (display screen 314).

Further, in S23, the processor 313 causes the communication unit 3E to execute a process for acquiring, from a server on the Internet, moving image data representing a moving image corresponding to the information represented by the acoustic wave signal.

Further, in S24, the processor 313 executes a synchronized reproduction process for reproducing, in synchronization with the radio broadcast, the moving image represented by the acquired moving image data. Thereafter, the processor 313 shifts the process to S25.

Here, the synchronized reproduction process of S24 will be explained. The moving image reproduction process can be implemented, for example, as follows.

(1) in Case that Moving Image Data Itself is Data to be Reproduced in Synchronization with Radio Broadcast If the moving image data itself is data to be reproduced in synchronization with the radio broadcast, there is no need to perform any special process in the mobile device 3. For example, this is the case when the moving image data is reproduced by streaming in accordance with the radio broadcast.

That is, in this case, when reproduction of the moving image data is started in the middle of the radio shopping (in 2 minutes after the start, for example), the moving image represented by the moving image data is also reproduced from the middle (from the time point of 2 minutes after the start, in this example).

(2) in Case that Moving Image Data is Data Independent of Radio Broadcast

If the moving image data is data independent of the radio broadcast, it is necessary to synchronize the data with the radio broadcast in the mobile device 3. In this case, based on the information acquired from the radio broadcast, it is determined which time point in the moving image corresponds to the broadcast content of the present time, and the moving image may be reproduced from the time point.

For example, the receiver 2 may output information that allows the mobile device 3 to identify timing by sound audible to users or the acoustic wave signal, and the mobile device 3 may specify the time point corresponding to the moving image and reproduce the moving image, based on the timing.

Specifically, for example, the receiver 2 may output to the mobile device 3 start information at a timing corresponding to a start point of the moving image, and time from the start information may be measured in the mobile device 3. Thereby, the time in the moving image may be synchronized with the time in the radio broadcast.

On the other hand, if it is determined that acoustic wave signal is not input in S21, the processor 313 skips S22 to S24 and shifts the process to S25.

In S25, the processor 313 determines whether or not the information represented by the acoustic wave signal is displayed on the display screen 314, and a communication request operation based on the information is performed.

If it is determined that the communication request operation is performed, the processor 313 shifts the process to S26, and, after executing the communication requested by the communication unit 3E, shifts the process to S27.

On the other hand, if it is determined that the communication request operation is not yet performed, the processor 313 skips S26 and shifts the process to S27.

In S27, the processor 313 determines whether or not the information represented by the acoustic wave signal is displayed on the display screen 314, and a product storage operation based on the information is performed.

The product storage operation is an operation by the user to store in the mobile device 3 the product that is currently introduced in radio shopping.

If it is determined that the product storage operation is performed, the processor 313 shifts the process to S28, and, after performing the process to store the product, shifts the process to S21.

On the other hand, if it is determined that the communication request operation is not yet performed, the processor 313 skips S28 and shifts the process to S21.

Figure 15:
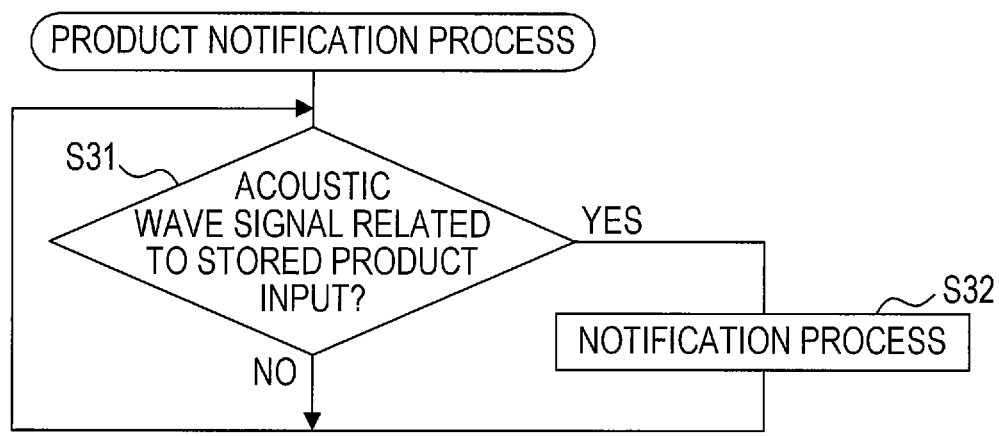
FIG. 15 is a flowchart of a product notification process according to the second embodiment.

Next, a product notification process to be performed by the processor 313 in a state in which the product is stored in S28 as described above will be described with reference to the flowchart of FIG. 15.

The product notification process may be executed at all times, for example, in a state where a particular application is running in the mobile device 3. Further, the product notification process may be initiated, for example, when a specific operation is performed, and may be completed when a predetermined termination condition is satisfied thereafter (after a certain time, for example). Further, the product notification process may be executed at all times, for example, when the power of the mobile device 3 is on.

In S31, it is determined whether or not there is input of acoustic wave signal related to the stored product from the receiver of the television broadcast, and if it is determined that there is input, the processor 313 performs the notification process of S32.

Here, the acoustic wave signal about the stored product is included, for example, in the CM of the product. The notification process is a process for notifying the user to recognize that the product in the CM currently being broadcast by the receiver of the television broadcast is the product introduced in the radio shopping in the past. For example, the information may be displayed on the display screen 314, sound may be output from the speaker 319, or a vibration function may be used for notification.

Figure 16:
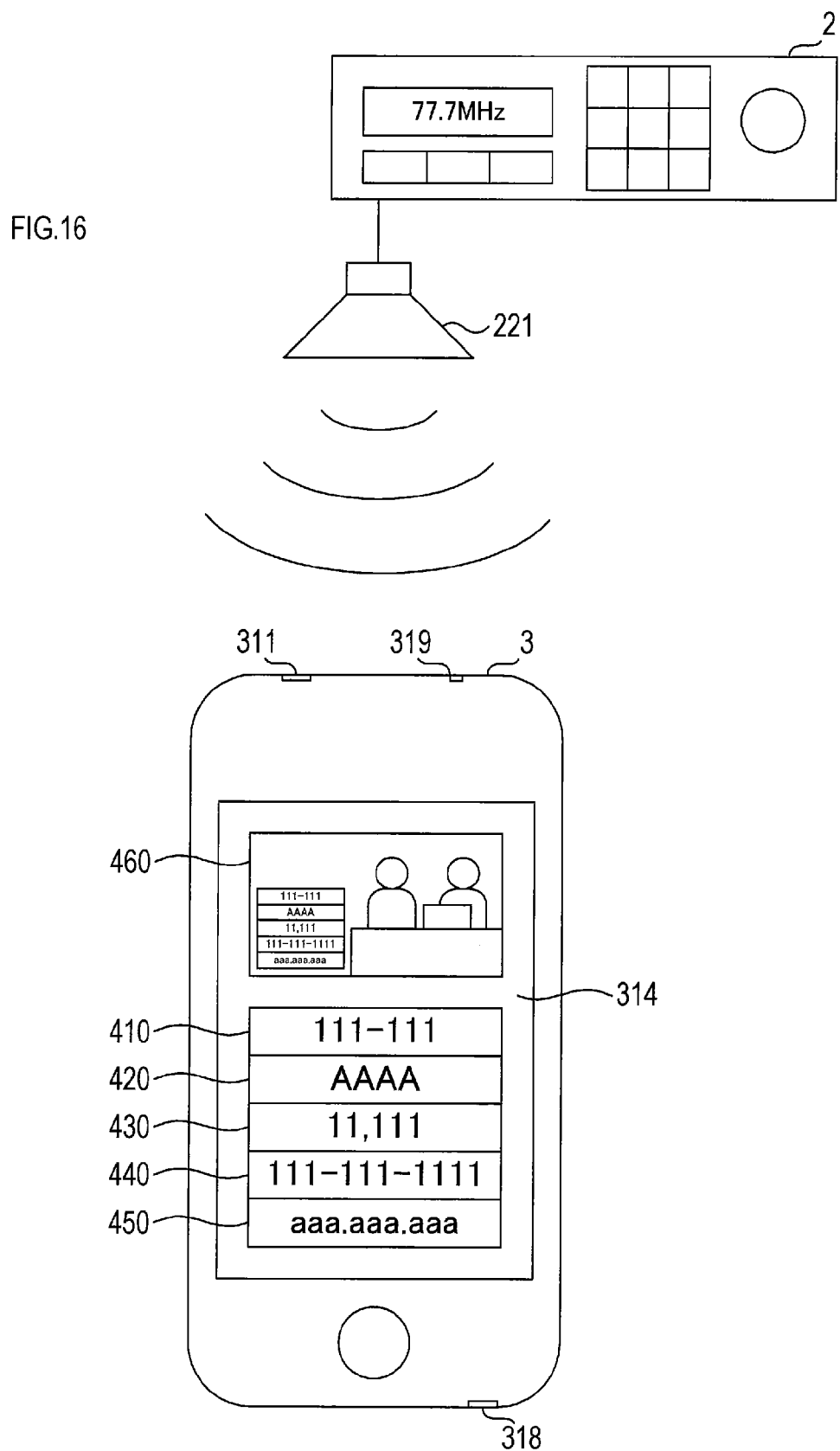
FIG. 16 is a conceptual diagram of a broadcast system according to the second configuration example of the second embodiment.

FIG. 16 is a conceptual diagram of a broadcast system according to the second configuration example. The receiver 2 receives broadcast information of radio shopping broadcast by the broadcast station of the radio broadcast (broadcast device 1), and outputs from the speaker 223 sound represented by the received broadcast information. The sound output from the speaker 223 includes acoustic wave signal representing the product information related to the product introduced in the radio shopping.

The mobile device 3 receives from the microphone 311 the sound output from the speaker 223, and displays information (product information related to the product introduced in the radio shopping) 410 to 450 represented by the acoustic wave signal included in the sound on the display screen 314. The product information 410 to 450 exemplarily shown in FIG. 16 is the same as the product information 410 to 450 of the first configuration example described above (FIG. 11).

In addition, the mobile device 3 acquires, from the server on the Internet, moving image data representing a moving image related to the product (specifically, a moving image to be viewed in conjunction with the radio broadcast), and executes the synchronized reproduction process to reproduce moving image 460 represented by the moving image data in synchronization with the radio broadcast. Therefore, the user can view the moving image (image) 460 in addition to the sound by the radio broadcast.

When operation of selecting the telephone number 440 is performed on the touch panel 315, the mobile device 3 performs a process to make a call to the telephone number. Also, when an operation of selecting the Internet address 450 is performed on the touch panel 315, the mobile device 3 performs a process to access the Internet address.

When an operation of selecting the product number 410 or the product name 420 is performed on the touch panel 315, the mobile device 3 performs a process for storing information of the product. Thereafter, the mobile device 3 receives the acoustic wave signal for the product through the CM or the like of the product broadcast by the receiver of television broadcast, and performs the notification process to notify the user.

[3-3. Third Configuration Example]

The following describes a configuration example in which the present invention is applied to a horse race relay according to the television broadcast, as a third configuration example.

In a horse racing relay, the user as an audience needs to purchase a betting ticket, using means other than the receiver of television broadcast (for example, at the window, by telephone voting, by Internet voting, etc.).

Therefore, in the third configuration example, necessary information is transmitted from the receiver for viewing the horse race relay to the mobile device carried by the user, by means of acoustic wave communication technology.

Since the hardware configuration of a broadcast system of the third configuration example is the same as that of the first configuration example described above (FIGS. 7 to 9), description thereof is not repeated. Further, since the basic flow of the process executed by the mobile device 3 is similar to that of the television cooperative process described above (FIG. 10), description thereof is not repeated.

FIG. 17 is a conceptual diagram of the broadcast system of the third configuration example. The receiver 2 receives broadcast information of a horse race relay broadcast by a broadcasting station of the television broadcast (broadcast device 1), displays image represented by the received broadcast information on the display screen 215, and outputs sound represented by the received broadcast information from the speaker 216.

In the image to be displayed on the display screen 215, as the information on the race being relayed, race information such as race identification information (in this case, racetrack name and race number) 510, number of the racehorse being displayed (horse number) 520, racehorse name 530, horse weight and increase or decrease in horse weight as compared to that of the previous race 540, jockey name 550, loaded weight 560, etc., are superimposed on the original image as the display information.

Further, the sound output from the speaker 216 includes acoustic wave signal representing the race information displayed on the display screen 215 and betting information related to the racehorse being displayed.

The mobile device 3 receives from the microphone 311 the sound output from the speaker 216, and displays information represented by the acoustic wave signal included in the sound (race information 510 to S60 displayed on the display screen 215, and betting information 570 to S80 related to the racehorses being displayed) on the display screen 314.

Then, when the operation of selecting the identification information of the race 510 is performed on the touch panel 315, the mobile device 3 acquires, from the server on the Internet, information about the race (such as the race card and odds, for example).

When operation of selecting the horse number 520 is performed on the touch panel 315, the mobile device 3 acquires, from the server on the Internet, betting information associated with the horse number.

When operation of selecting the racehorse name 530 is performed on the touch panel 315, the mobile device 3 acquires, from the server on the Internet, information on the racehorse (such as pedigree and past performance, for example).

When operation of selecting the information 540 on the horse weight is performed on the touch panel 315, the mobile device 3 acquires, from a server on the Internet, information on the horse weight (such as horse weight of the past, horse weight of other racehorses, for example).

When operation of selecting the jockey name 550 is performed on the touch panel 315, the mobile device 3 acquires, from the server on the Internet, information about the jockey (such as past performance, for example).

When operation of selecting the loaded weight 560 is performed on the touch panel 315, the mobile device 3 acquires, from the server on the Internet, information on the loaded weight (such as loaded weight of the past, loaded weight of other racehorses, for example).

When operation of selecting the betting information 570 to S80 is performed on the touch panel 315, the mobile device 3 performs a process of purchasing a betting ticket representing the touched betting information via the Internet.

Here, an example for purchasing a betting ticket has been described, but the present invention is not limited thereto, and allows various purchasing.

For example, horses or combinations of horses which the commentator or the like suggests may be selected with a single touch. Also, although an example of a horse racing has been given here, the present invention may be applied to other events (for example, sports such as bicycle race, motorboat race, soccer, etc.) that allow the user to vote.

[3-4. Fourth Configuration Example]

Next, as a fourth configuration example, a configuration example will be described in a case of applying the present invention to the receiver 2 of the television broadcast having a function of displaying a plurality of (two in the example below) different programs at the same time.

In the receiver 2 as such, it is possible to view images of desired programs by simultaneously displaying the images of the two different programs.

However, when simultaneously outputting sounds of the two different programs, it becomes difficult to hear the content.

Therefore, in the fourth configuration example, the sound of at least one program is transmitted using an acoustic wave signal.

Hardware configuration of the broadcast system in the fourth configuration example is basically the same as that in the first configuration example described above (FIGS. 7 to 9). However, since the configuration of the receiver 2 is slightly different, explanation in this regard will be given.

In the fourth configuration example, the receiver 2 is a device (television broadcast receiver) that receives, via a broadcast network, the Internet or the like, broadcast information of television broadcast transmitted (broadcast) by the broadcast device 1, and reproduces image and sound represented by the broadcast information.

In particular, the receiver 2 of the fourth configuration example has a function of simultaneously displaying images of two different programs.

Figure 18:
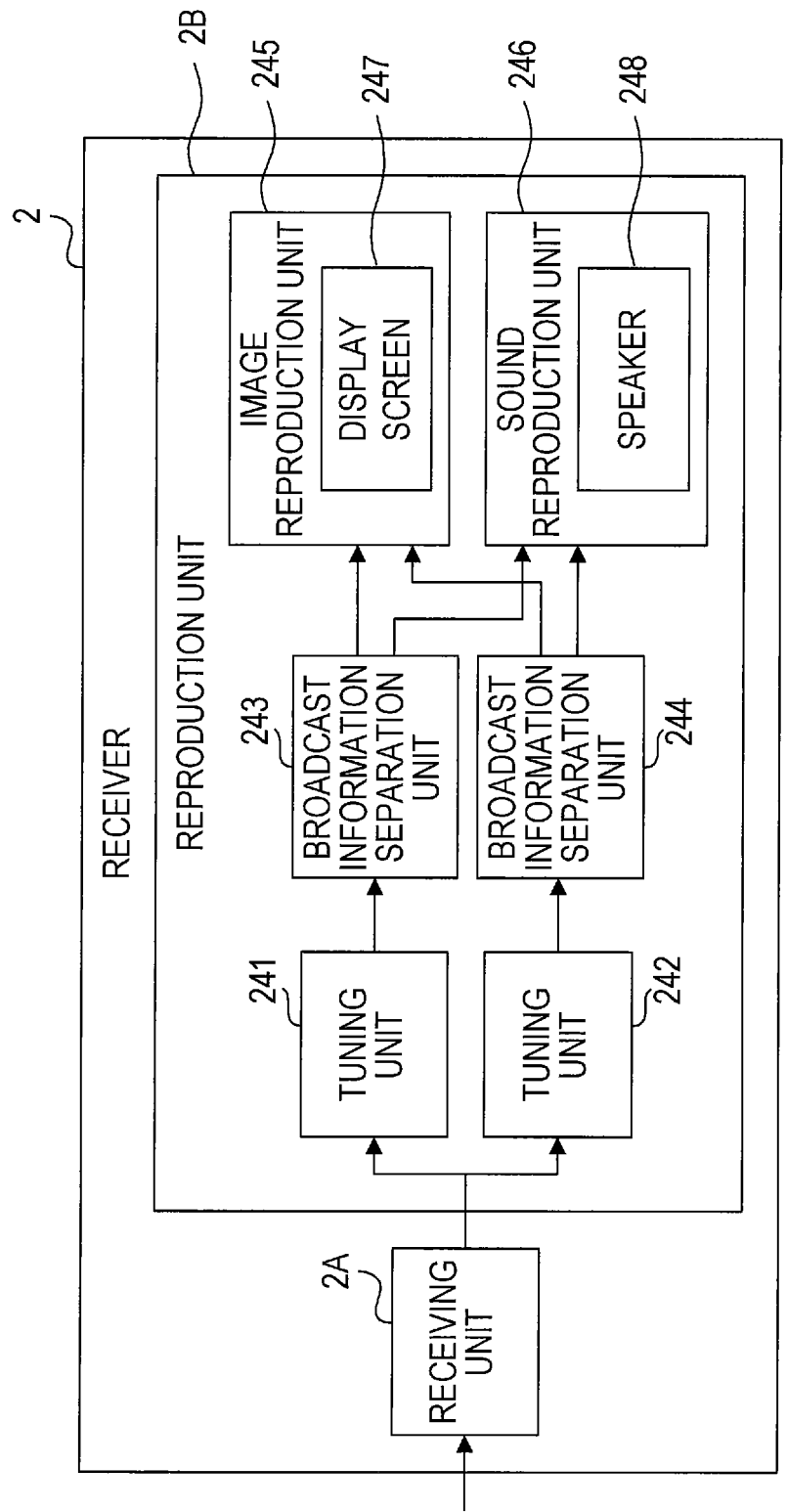
FIG. 18 is a block diagram showing a configuration of a receiver according to a fourth configuration example of the second embodiment.

Specifically, as shown in FIG. 18, the reproduction unit 2B includes a first tuning unit 241, a second tuning unit 242, a first broadcast information separation unit 243, a second broadcast information separation unit 244, an image reproduction unit 245, and a sound reproduction unit 246. As already described above, the receiving unit 2A receives the broadcast information transmitted (broadcast) by the broadcast device 1 such as via a broadcast network or the Internet, and outputs the broadcast information to the reproduction unit 2B.

The first tuning unit 241 and the second tuning unit 242 are the same as the tuning unit 211 of the first configuration example.

The first tuning unit 241 outputs the selected broadcast information to the first broadcast information separation unit 243. The second tuning unit 242 outputs the selected broadcast information to the second broadcast information separation unit 244.

The first broadcast information separation unit 243 and the second broadcast information separation unit 244 are the same as the broadcast information separation unit 212 of the first configuration example, and each output image information to the image reproduction unit 245 and sound information to the sound reproduction unit 246.

The image reproduction unit 245 includes a display screen 247 for displaying images. The image reproduction unit 245 receives the image information output from the first broadcast information separation unit 243 and the second broadcast information separation unit 244 and displays images represented by the image information on the display screen 247.

Specifically, in a state of a single-screen display, the image represented by the image information from the first broadcast information separation unit 243 is displayed on the display screen 247. In other words, the image represented by the image information from the second broadcast information separation unit 244 is not displayed.

On the other hand, in a state of a dual-screen display, the image represented by the image information from the first broadcast information separation unit 243 and the image represented by the image information from the second broadcast information separation unit 244 are displayed on the display screen 247 at the same time. For example, two images may be placed side by side, or one of the images may be displayed inside the other.

The sound reproduction unit 246 includes a speaker 248 for outputting sound.

The sound reproduction unit 246 receives the sound information output from the first broadcast information separation unit 243 and the second broadcast information separation unit 244, and outputs sound represented by the sound information from the speaker 248.

Specifically, in a state of a single-image display, sound represented by the sound information from the first broadcast information separation unit 243 is output from the speaker 248. In other words, sound represented by the sound information from the second broadcast information separation unit 244 is not output.

On the other hand, in a state of a dual-screen display, the sound reproduction unit 246 outputs the sound (excluding the acoustic wave signal) set to be output from the speaker 248 and acoustic wave signal included in the sound of the other from the speaker 248.

That is, in the fourth configuration example, the acoustic wave signal is information representing original sound of the program. The sound reproduction unit 246, out of the sound of a program A (original sound A1+acoustic wave signal A2) and the sound of a program B (original sound B1+acoustic wave signal B2), outputs the original sound A1 of the program A and the acoustic wave signal B2 of the program B, or outputs the original sound B1 of the program B and the acoustic wave signal A2 of the program A.

Figure 19:
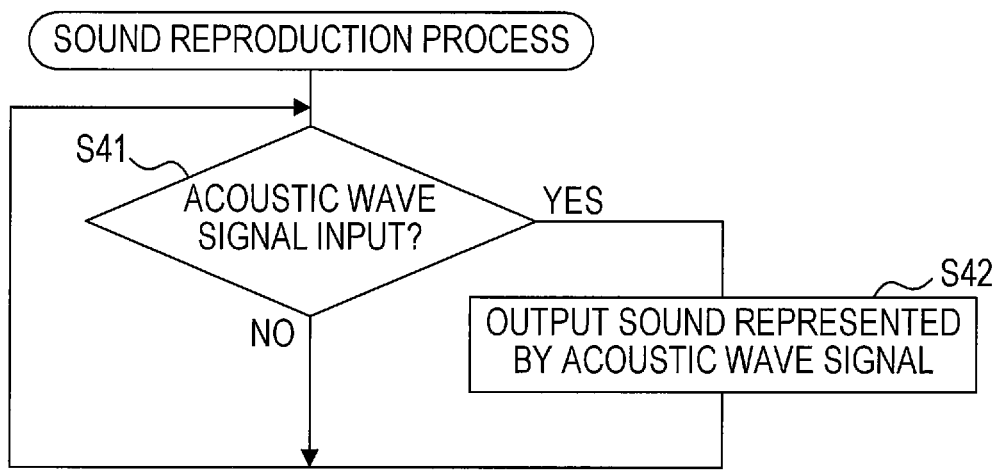
FIG. 19 is a flowchart of a sound reproduction process according to the second embodiment.

Next, a sound reproduction process executed by the processor 313 in the control unit 3B of the mobile device 3, according to the program stored in the memory 312 will be described with reference to the flowchart of FIG. 19.

The sound reproduction process may be executed at all times, for example, in a state where a particular application is running in the mobile device 3. Further, the sound reproduction process may be initiated, for example, when a specific operation is performed, and may be completed when a predetermined termination condition is satisfied thereafter (after a certain time, for example). Further, the sound reproduction process may be executed at all times, for example, when the power of the mobile device 3 is on.

In S41, the processor 313 determines whether an acoustic wave signal is input by the sound input unit 3A. If it is determined that an acoustic wave signal is input, the processor 313 shifts the process to S42, and outputs sound represented by the acoustic wave signal from the speaker 319.

However, when a headphone or the like is connected to the jack 320, the sound is not output from the speaker 319 but output from the jack 320.

Therefore, the sound of one program is output from the speaker 248 of the receiver 2, and the sound of the other program is output from the speaker 319 or the jack 320 (headphone) of the mobile device 3.

In this example, only the acoustic wave signal of one program is output. However, an acoustic wave signal representing sound of a plurality of (two, in this example) programs displayed on the display screen 247 may be output from the speaker 248, and selection of the program may be performed on the mobile device 3 side.

Figure 20:
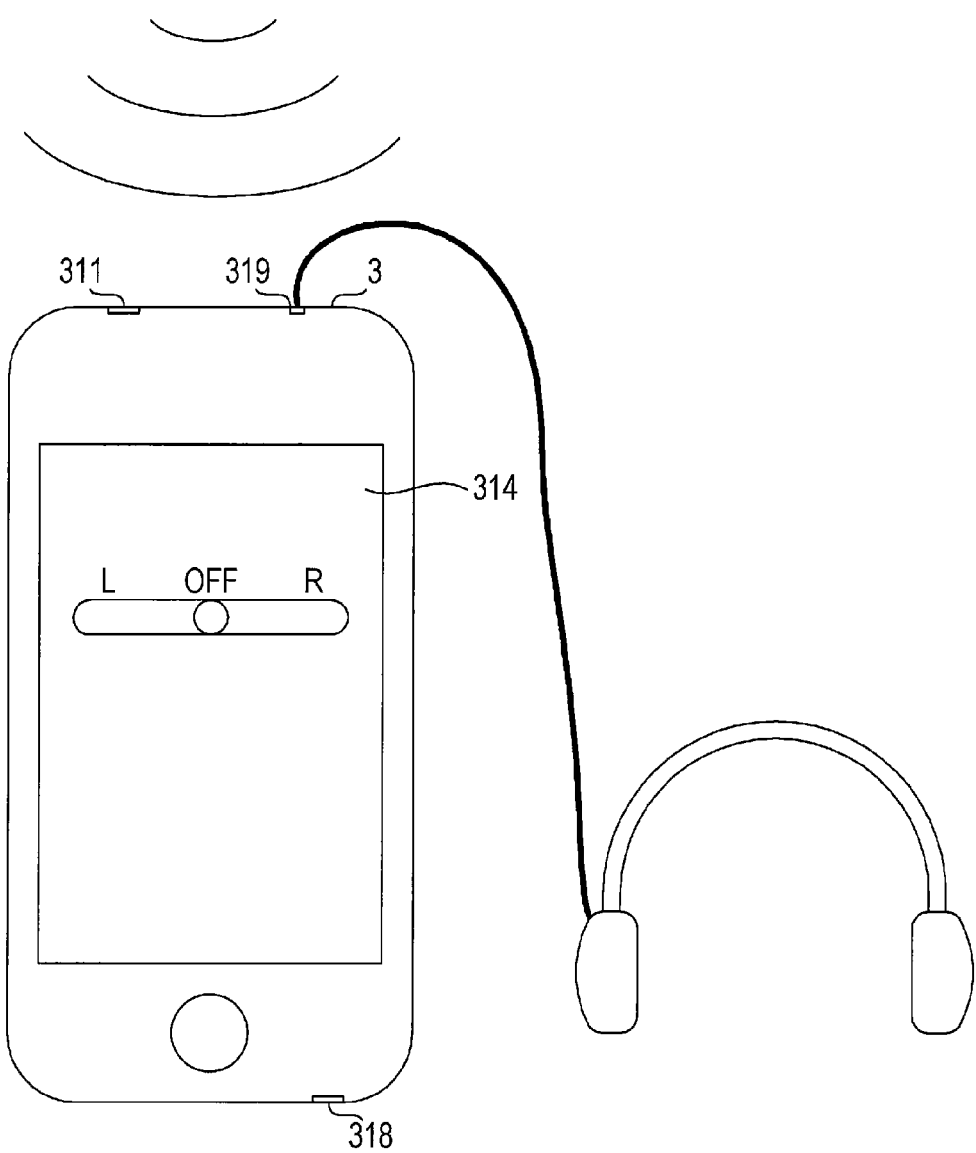
FIG. 20 is a conceptual diagram of a broadcast system according to the fourth configuration example of the second embodiment.

Specifically, as shown in FIG. 20, a selection screen may be displayed in the mobile device 3, and the user may select one program, the sound of which the user desires to hear. Further, this configuration is not only applied to selection of sound of a plurality of programs, but may be also applied, for example, to selection between a main audio channel and a supplementary audio channel.

[3-5. Fifth Configuration Example]

The following describes a configuration example in which the present invention is applied to the receiver 2 of the television broadcast having a function of detecting information about the user, as the fifth configuration example.

Figure 21:
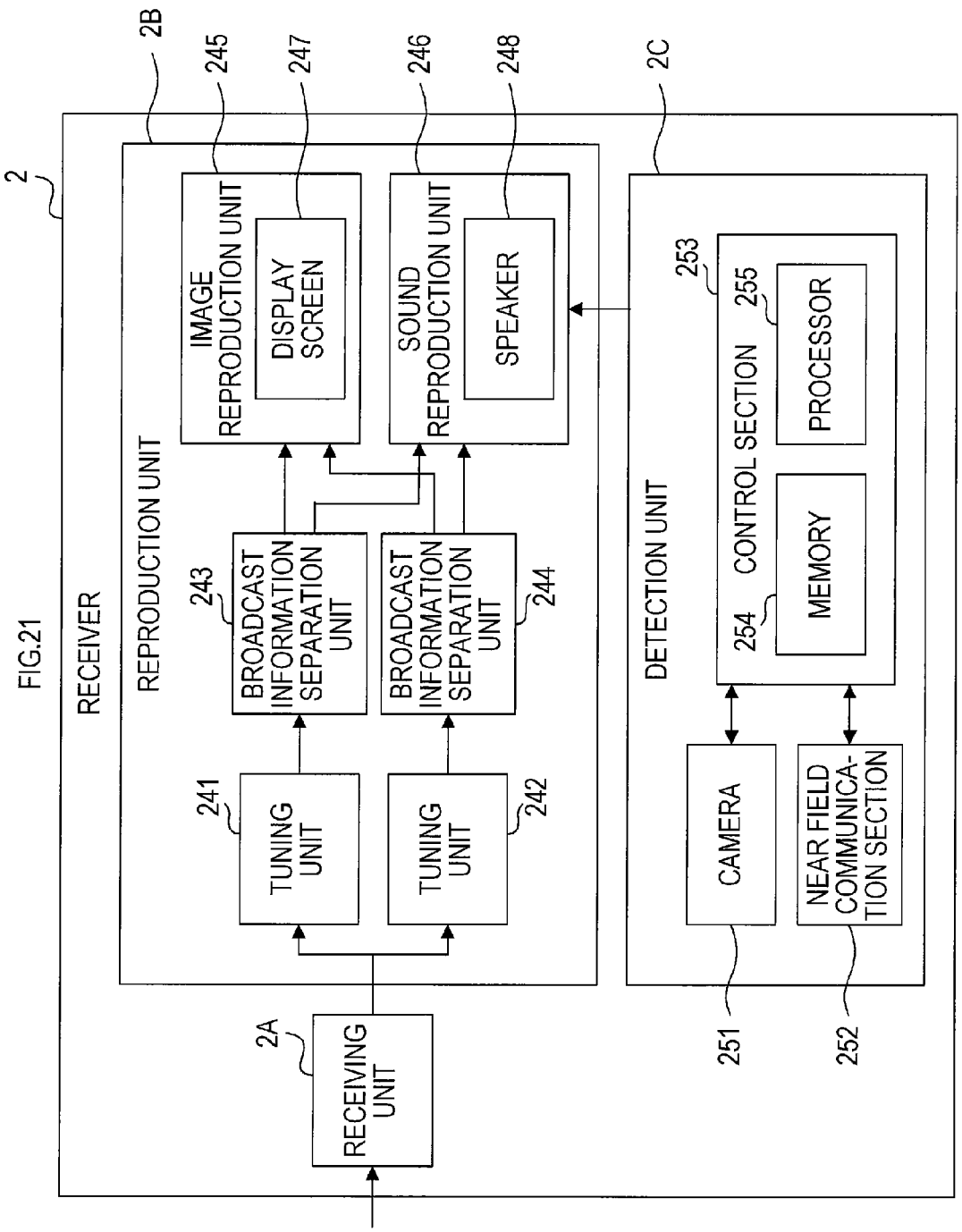
FIG. 21 is a block diagram showing a configuration of a receiver according to a fifth configuration example of the second embodiment.

Hardware configuration of the broadcast system of the fifth configuration example is basically the same as that of the fourth configuration example described above (FIG. 18, FIG. 8). Since the configuration of the receiver 2 is slightly different, explanation in this regard will be given. As shown in FIG. 21, the receiver 2 of the fifth configuration example includes a detection unit 2C, in addition to the configuration described above (FIG. 18).

Specifically, the detection unit 2C includes a camera 251, a near field communication section 252, and a control section 253.

The camera 251 is for taking a photo of the user as a viewer to acquire information such as the numbers, location, gender, age, etc., and is provided at the front of the receiver 2 (side where the display screen 247 is provided, for example, above the display screen 247).

The near field communication section 252 performs near field wireless communication with the mobile device 3 carried by the user, and acquires information of the user from the mobile device 3. As the near field wireless communication, near field wireless communication in accordance with, for example, the Bluetooth (registered trademark) standard or Wi-Fi (registered trademark) standard may be used.

The control section 253 includes a memory 254 that stores a program, and a processor 255 that executes the program. The control section 253 executes a process such as for changing the acoustic wave signal output from the sound reproduction unit 246 according to the information of the user acquired by the camera 251 and the near field communication section 252.

Figure 22:
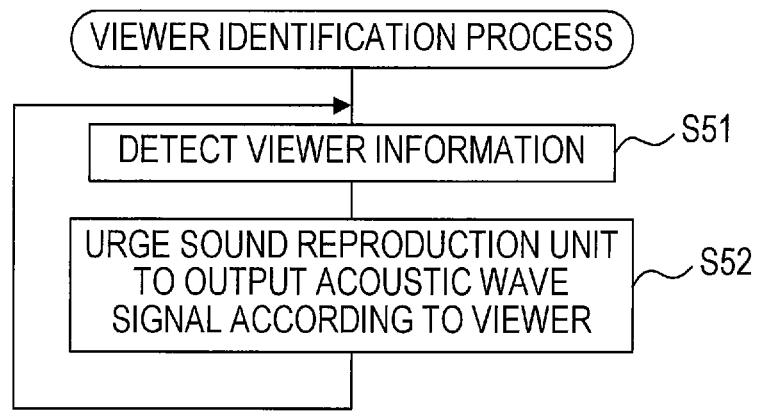
FIG. 22 is a flowchart of a viewer identification process according to the second embodiment.

Next, a viewer identification process executed by processor 255 in the control section 253 of the detection unit 2C of the receiver 2, according to the program stored in the memory 254 will be described with reference to the flowchart of FIG. 22. The viewer identification process may be executed at all times, for example, when the power of the receiver 2 is on.

In S51, by means of the camera 251 and the near field communication section 252, the processor 255 detects information about the user as a viewer. For example, information such as numbers, location, gender, age and the like of the user is detected by the camera 251. In addition, by means of the near field communication section 252, information that allows to identify the user, and information of residence, birth date, benefits the user has, etc. are acquired from the mobile device 3.

Subsequently, in S52, the processor 255 selects acoustic wave signal corresponding to the information of the user, out of a plurality of types of acoustic wave signals included in the broadcast information to urge the sound reproduction unit 246 to reproduce the selected acoustic wave signal. That is, in the fifth configuration example, a plurality of types of acoustic wave signals are transmitted from the broadcast device 1, assuming to be selected in the receiver 2.

Thus, for example, acoustic wave signal can be selected and provided as follows.

Figure 23:
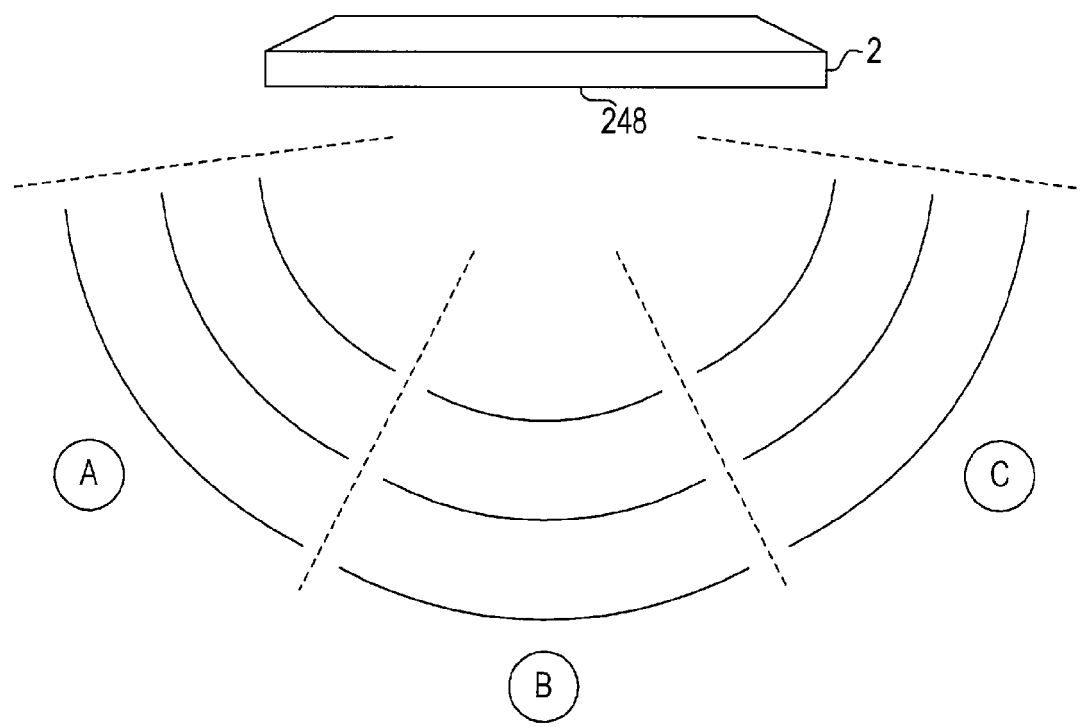
FIG. 23 is a conceptual diagram of the broadcast system using a directional speaker according to the second embodiment.

Provide different information to a plurality of users, depending on locations of the users. In this case, the speaker 248, which is directional, is used. For example, as shown in FIG. 23, the output direction of the sound by the speaker 248 is divided into a plurality of directions. In this example, different sounds can be output to a user A located to the left with respect to the receiver 2, a user B located in front with respect to the receiver 2, and to a user C located to the right with respect to the receiver 2.

Provide special information (coupons, for example) to a particular user, such as a user who has birthday, is entitled to a privilege, etc.

Provide information corresponding to user's age, sex, size, and residence (for example, information corresponding to the age and gender, information about clothes corresponding, age, sex, and size, information corresponding to the residence, etc.)

Provide image of different visibility (3D image, for example) according to the position of the user.

By selecting and providing acoustic wave signal in this manner, it is possible to provide information appropriate to the user.

Here, an example of television broadcast has been described. However, radio broadcast may be configured in a similar manner.

[4. Effects]

The mobile device 3 includes the sound input unit 3A that can receive an acoustic wave signal included in the sound to be reproduced by the receiver 2 that receives and reproduces the broadcast information, and the control unit 3B that executes a process related to the content reproduced by the receiver 2 (reproduction-related process) based on the information represented by the acoustic wave signal received by the sound input unit 3A.

Therefore, by receiving the acoustic wave signal included in the sound to be reproduced by the receiver 2, the mobile device 3 can perform the process related to the content reproduced by the receiver 2 (the content being broadcast).

The mobile device 3 includes the operation unit 3D that receives the operation by the user. The control unit 3B executes a process that is related to the reproduced content and based on the operation received by the operation unit 3D, as the reproduction-related process.

Therefore, the mobile device 3 may execute a process that is related to the reproduced content and based on the operation by the user.

For example, in a state in which information (information such as teleshopping or radio shopping, for example) for introducing a product in the receiver 2 and seeking a purchaser of the product is being broadcast, and when communication to a specific contact address is made to purchase the product, the mobile device 3 may make the communication with extremely simple operation (for example, one-touch operation, simple utterance operation by voice, etc.)

Also, for example, in a state in which information that allows the user to vote (information such as on horse racing relay, for example) is being broadcast in the receiver 2, for example, the mobile device 3 allows confirmation of related information (such as racing program entry and odds, for example) or voting (such as purchase of a betting ticket, for example) by very simple operation.

Also, for example, in a state where a CM is being broadcast in the receiver 2, the mobile device 3 allows to examine (search) information about the CM by very simple operation.

The mobile device 3 includes a unit (presentation unit) that presents information to the user. The control unit 3B urges the presentation unit to present information related to the reproduced content as the reproduction-related process.

Therefore, the user of the mobile device 3 can grasp information related to the reproduced content from the mobile device 3.

The mobile device 3 includes the display unit 3C that displays a picture visible to the user, as the presentation unit.

Therefore, the user of the mobile device 3 can grasp information related to the reproduced content by viewing the picture displayed by the mobile device 3.

For example, in a state in which information that introduces the product and seeks a purchaser is being broadcast in the receiver 2, the mobile device 3 may display information of the product and a contact address (such as a telephone number or the Internet address, for example).

Also, for example, in a state in which information that allows the user to vote is being broadcast in the receiver 2, the mobile device 3 can display related information (such as racing program entry and odds, for example).

In addition, for example, in a state in which a CM is being broadcast in the receiver 2, the mobile device 3 can display information to find out (search) information about the CM (such as search page or web site of the product, for example).

Further, for example, the mobile device 3 can display subtitles or lyrics on the program being broadcast in the receiver 2.

Further, for example, the mobile device 3 may display not only still images but also moving images. Therefore, the mobile device 3 can check with moving images related to broadcast content even if the receiver 2 cannot reproduce moving images, like a radio broadcast receiver.

Further, for example, the mobile device 3 can display emergency information or a CM to be notified by the receiver 2.

If information to be displayed on the receiver 2 is displayed in the mobile device 3, the original image may not be impaired by irrelevant information.

For example, if a CM is not to be displayed in the receiver 2, it is possible to increase the value of program, for example, of movies or sports.

The mobile device 3 includes the sound output unit 3F to output sound audible to the user, as the presentation unit.

Therefore, the user of the mobile device 3 can grasp information related to the reproduced content by listening to the sound output by the mobile device 3.

For example in a state in which two programs are displayed at the same time in the receiver 2, the mobile device 3 can reproduce the sound of the program that is not output from the receiver 2.

Also, for example, in a state in which a program with the main audio channel and the supplemental audio channel is being displayed in the receiver 2, the mobile device 3 can reproduce the sound that is not output from the receiver 2.

Further, for example, the mobile device 3 can notify emergency information or the like to be notified in the receiver 2 by sound.

The mobile device 3 includes the communication unit 3E. The control unit 3B urges the communication unit 3E to execute a communication process related to the reproduced content, as the reproduction-related process.

Therefore, the mobile device 3 can acquire information that is not acquired by acoustic wave signal only, and notify the information to an external device (including a server).

For example, in a state in which information that introduces a product and seeks a purchaser is being broadcast in the receiver 2, the mobile device 3 can acquire information about the product (such as specification or picture, for example) from an external device, or perform a communication process for purchasing the product.

Also, for example, in a state, for example, information that allows the user to vote is being broadcast in the receiver 2, the mobile device 3 can acquire related information (such as racing program entry and odds, for example) and transmit information for voting (such as information on betting tickets to be purchased).

Also, for example, in a state in which a CM is being broadcast in the receiver 2, the mobile device 3 may acquire information about the CM and transmit information that reports that the CM is being viewed.

Further, for example, the mobile device 3 can acquire information about a person and a product appearing in a program or CM broadcast in the receiver 2.

The mobile device 3 stores information acquired from the acoustic wave signal (such as identification information of the product, for example). Then, if an acoustic wave signal representing the information associated with the stored information is received from the receiver 2, the mobile device 3 performs a process of notifying the user.

Therefore, it is possible to remind the user of information that may be overlooked if the user is not aware.

For example, the mobile device 3 can notify the user when the product that has been introduced on radio shopping is broadcast by a television broadcast receiver thereafter.

Further, for example, the mobile device 3 is able to instruct a recording device to retrieve, from the recorded data of the television broadcast, the product that has been introduced in the program that introduces the product and seeks a purchaser.

In a system that requires no communication function, the mobile device 3 may be a device other than a communication device.

For example, if the system displays or outputs information (such as information for a CM, for example) represented by an acoustic wave signal transmitted from the receiver 2 simply as picture or by sound, a device other than a communication device (such as remote controller that allow a remote control of the receiver 2, for example) may be the mobile device 3.

The broadcast device 1 transmits broadcast information representing sound that includes an acoustic wave signal.

Therefore, the broadcast device 1 can provide information that is utilized by the mobile device 3, in addition to information that can be grasped by the user by the five senses (aurally or visually) from the receiver 2.

The broadcast device 1 transmits information that introduces a product and seeks a purchaser (information of such as teleshopping and radio shopping, for example), as broadcast information, and transmits a signal representing information to simplify the procedure to purchase the product using the mobile device 3, as acoustic wave signal.

Therefore, the user of the mobile device 3 is able to purchase the product with the simplified procedures.

The broadcast device 1 transmits a signal representing communication destination information for communication to purchase the product, as acoustic wave signal.

Therefore, the user of the mobile device 3 may perform communication without making a note of the communication destination information for the communication to purchase the product.

The broadcast device 1 transmits information that invites voting (information such as horse racing relay, for example), as broadcast information, and transmits a signal representing information to simplify the procedure to vote using the mobile device 3, as acoustic wave signal.

Therefore, the user of the mobile device 3 can perform voting with the simplified procedure.

The broadcast device 1 transmits a signal representing options that have been narrowed down according to the broadcast content among available voting options, as an acoustic wave signal.

Therefore, the user of the mobile device 3 may perform voting based on the options that have been narrowed down according to the broadcast content. Therefore, it is possible, as compared with the case of performing a vote based on all options regardless of the broadcast content, to reduce complexity in operation. Moreover, intuitive operation is possible.

The broadcast device 1 transmits a signal representing identification information of the product, as acoustic wave signal.

Therefore, the user of the mobile device 3 may identify the product without making a note or the like of the broadcast content. Therefore, when the user acquires information of the product or purchases the product from other sources, it may be easy for the user to identify the product.

The broadcast device 1 transmits a signal representing the sound of the broadcast, as an acoustic wave signal. According to this configuration, for example, a plurality of users can separately listen to different kinds of sounds (such as sounds of different programs, main audio channel and supplementary audio channel of the same program, for example) from the common receiver 2.

The broadcast device 1 may transmit a signal representing information to simplify the procedure to search information about the product being broadcast using the mobile device 3, as an acoustic wave signal. For example, the broadcast device 1 may transmit a URL of a product in a CM during the CM to the mobile device 3, so that it is possible to access the website of the product by a simple operation (such as one touch operation, for example).

The broadcast device 1 may transmit a signal representing emergency information, as an acoustic wave signal. The emergency information includes, for example, information such as disaster information (such as earthquake early warning and various alarms, for example) and breaking news.

Such information is provided by being superimposed on original image or by interrupting the original broadcast, which may reduce the value of the original broadcast. In contrast, if such information is transmitted in the acoustic wave signal, the original image is not impaired (or is difficult to be impaired).

The broadcast device 1 may transmit a signal representing supplementary information (additional information) on broadcast content, as an acoustic wave signal. The supplementary information includes, for example, subtitles of such as movie and opera, song lyrics, detailed information of persons (such as performance of athletes, for example), detailed information of articles (such as size and maker of clothes, for example).

By transmitting such information as an acoustic wave signal, it may be hard for the original broadcast to become complicated.

The broadcast device 1 may transmit a signal representing information that should be noted regarding the broadcast content, as an acoustic wave signal. Such information is, for example, information such as store, article, or e-mail address introduced in the program. By transmitting such information as an acoustic wave signal, it is hardly necessary to note the information in a rush.

The broadcast device 1 may transmit a signal representing information to be provided to the user, as an acoustic wave signal. Such information is, for example, information such as an application form available by printing. In this way, it is possible to receive and print information such as an application form, for example.

The receiver 2 includes the detection unit 2C that detects information about the user, and the sound reproduction unit 246 that selects an acoustic wave signal to be output out of a plurality of types of acoustic wave signals included in the broadcast information based on the information about the user detected by the detection unit 2C and outputs the selected acoustic wave signal. Therefore, it is possible to output an acoustic wave signal according to the user as a listener or viewer.

The receiver 2 includes a camera for taking a picture of the user, as the detection unit 2C. Thus, for example, it is possible to grasp information of numbers, listening (viewing) position, gender, age and the like of the user and output an acoustic wave signal corresponding to the information grasped as such.

The receiver 2 includes a communication section for communicating with the mobile device 3 carried by the user, as the detection unit 2C. Thus, for example, it is possible to grasp information that allows identification of the user, information of residence, information of birth date, information of benefits that the user has, etc., and to output an acoustic wave signal corresponding to the information grasped as such.

The detection unit 2C detects the position of the user, as the information about the user, and the sound reproduction unit 246 selects a different acoustic wave signal depending on the position of the user, and outputs the selected acoustic wave signal. For example, the sound reproduction unit 246 outputs the acoustic wave signal representing a different voice, depending on position.

In addition, for example, the sound reproduction unit 246 outputs the acoustic wave signal representing a different 3D image, depending on position. In this way, it is possible to provide different information to the users who listen to (view) the broadcast of the same receiver 2. As compared with the case of providing common information, the information to be provided can be made suitable to individual users.

The detection unit 2C may include a plurality of cameras 251 (for example, two cameras spaced apart in a horizontal direction) and may detect the position of the user more accurately. In this way, it is possible, as compared with the case of detecting the position of the user with one camera 251, to detect the position (existing direction and distance) of the user more accurately.

The detection unit 2C, may use means other than the camera (ultrasonic waves or a laser, for example) to detect the position of the user. In this way, the user's position can be detected relatively accurately, using an existing position detecting device.

The detection unit 2C detects presence or absence of a particular user, as the information about the user, and the sound reproduction unit 246 outputs an acoustic wave signal representing specific information for the particular user. Therefore, it is possible, as compared with the case of providing uniform information to a plurality of users, to provide various services (for example, birthday benefits, exclusive-for-members benefits, etc.)

Further, according to the acoustic wave communication system, it is possible to correctly restore the transmission data from the transmitter 8 at the receiver 9 side, without transmitting a pseudo-noise code from the transmitter 8.

Further, in order to be able to generate unnecessary signal components at the receiver side, there is no need to transmit a pseudo-noise code from the transmitter, or obtain a multipath delay characteristic value based on the pseudo-noise code at the receiver side. Thus, it is possible to perform acoustic wave communication with high accuracy at high speed.

Further, it is possible to eliminate the unnecessary signal components from the received signal at the receiver 9 side. Thus, even if a distance (communication distance) between the transmitter 8 and the receiver 9 is longer, favorable data communication by acoustic wave communication can be carried out.

[5. Another Configuration Example]

The foregoing has described the various configuration examples of the second embodiment. It is obvious that the second embodiment may take further various forms.

In the above configuration examples, the configuration has been illustrated in which an acoustic wave signal is included and output in the sound to be reproduced by the receiver 2 that receives and reproduces broadcast information. However, the present invention is not limited thereto.

For example, an acoustic wave signal may be included and output in a notification sound to be output from the device. In other words, many of the electrically operated apparatus (such as, for example, electrical appliances operated with a commercial power supply like a refrigerator, rice cooker, microwave oven, air conditioner, etc., and electronic devices that operate with a battery like a desk clock, etc.) are provided with notification devices such as a piezoelectric buzzer.

This type of apparatus (electrical equipment) outputs notification sounds to notify the user of operating conditions and the occurrence of errors. By the output of the notification sound including acoustic wave signal, it is possible to notify the mobile device 3 of operating conditions and the occurrence of errors.

Figure 24:
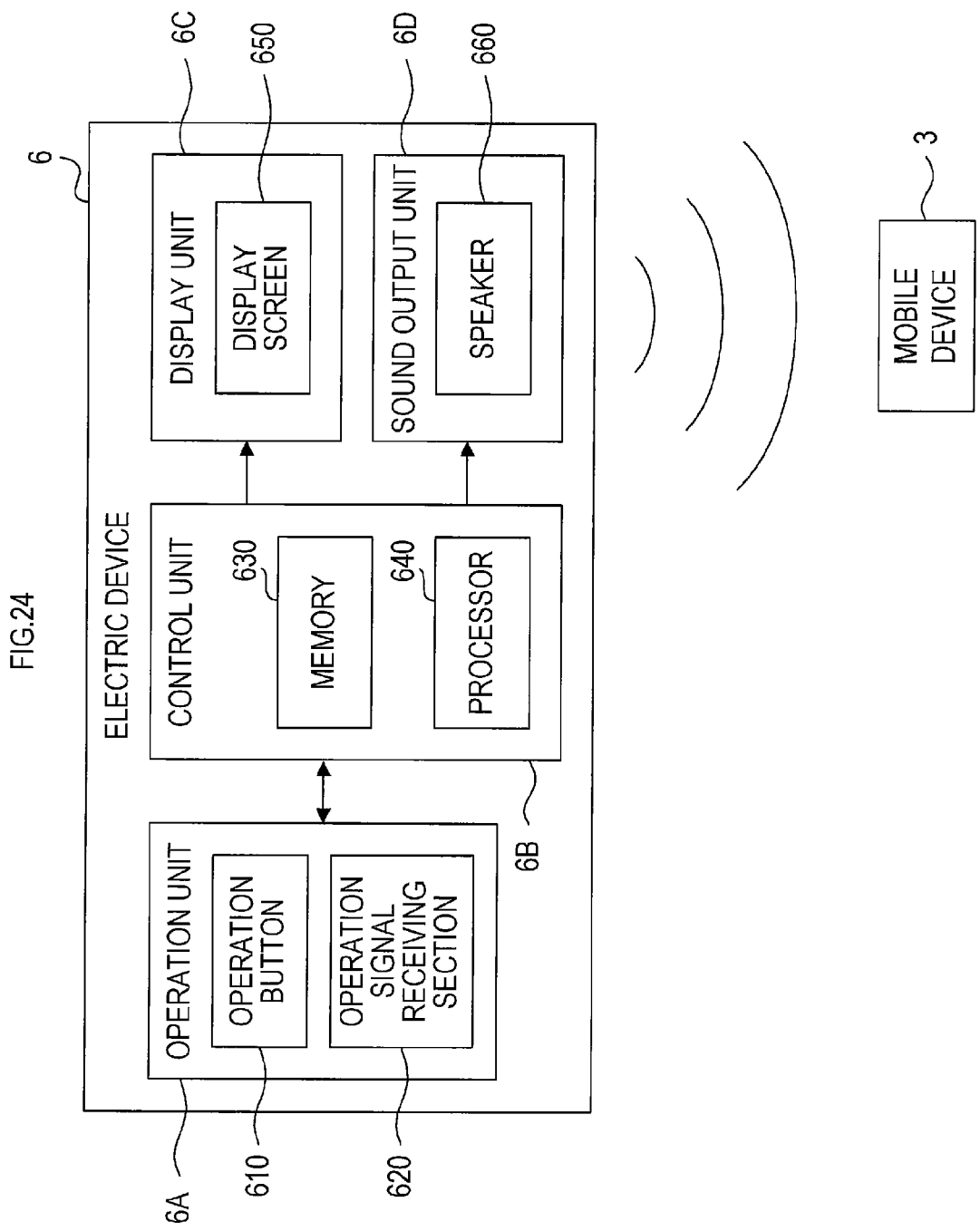
FIG. 24 is a block diagram showing a configuration of a notification system according to the second embodiment.

FIG. 24 is a block diagram showing a configuration of a notification system as an example having such apparatus (electrical equipment). The notification system includes an electric device 6 and the mobile device 3. The electric device 6 includes an operation unit 6A, a control unit 6B, a display unit 6C, and a sound output unit 6D.

The operation unit 6A includes an operation button 610 for receiving operations by the user, and an operation signal receiving section 620 that receives operation signals from a remote controller for use in remote operation by the user.

The control unit 6B includes a memory 630 that stores a program, and a processor 640 that executes the program. The display unit 6C includes a display screen 650 that displays various information (characters and pictures, for example) to be viewed by the user.

The display screen 650 may also be simple (show only characters, show only predetermined images, or only blink or light a lamp, for example). Further, the electric apparatus 6 may not include the display unit 6C. The sound output unit 6D includes a speaker 660 for outputting sound (notification sound or voice message, for example). As the sound output unit 6D, a piezoelectric buzzer may be used.

The mobile unit 3 is a cellular phone that can be carried by the user and through which communication via a telephone network or the Internet is possible, as in the above embodiments. Since the hardware configuration of the mobile device 3 is the same as that of the first configuration example (FIG. 9) described above, explanation thereof is not repeated.

The control unit 6B, when detecting that an error has occurred in the electric device 6, causes the display unit 6C to display an error code corresponding to the error that has occurred, and the sound output unit 6D to output notification sound (buzzer sound, for example) indicating the error. The notification sound output from the sound output unit 6D includes an acoustic wave signal.

The acoustic wave signal represents information indicating detailed information (causes and measures to be taken) about the error that has occurred, and information indicating a contact address to a repair shop (support department of the manufacturer, for example). By bringing the mobile device 3 close to the electric apparatus 6 in such state, the user can receive the acoustic wave signal.

Upon receiving the acoustic wave signal, the mobile device 3 displays information represented by the acoustic wave signal on the display screen 314, and, in response to selection operation by the user, accesses the website showing related information or makes a call to a repairer.

Further, the mobile device 3 may signal the occurrence of an error, in the step of receiving the acoustic wave signal, such as by automatically sending email to a repairer.

Third Embodiment

Next, an access information providing system will be described as a third embodiment, which is suitable to provide access information to network equipment to the mobile terminal device using acoustic wave communication.

[First Configuration Example]

Figure 25:
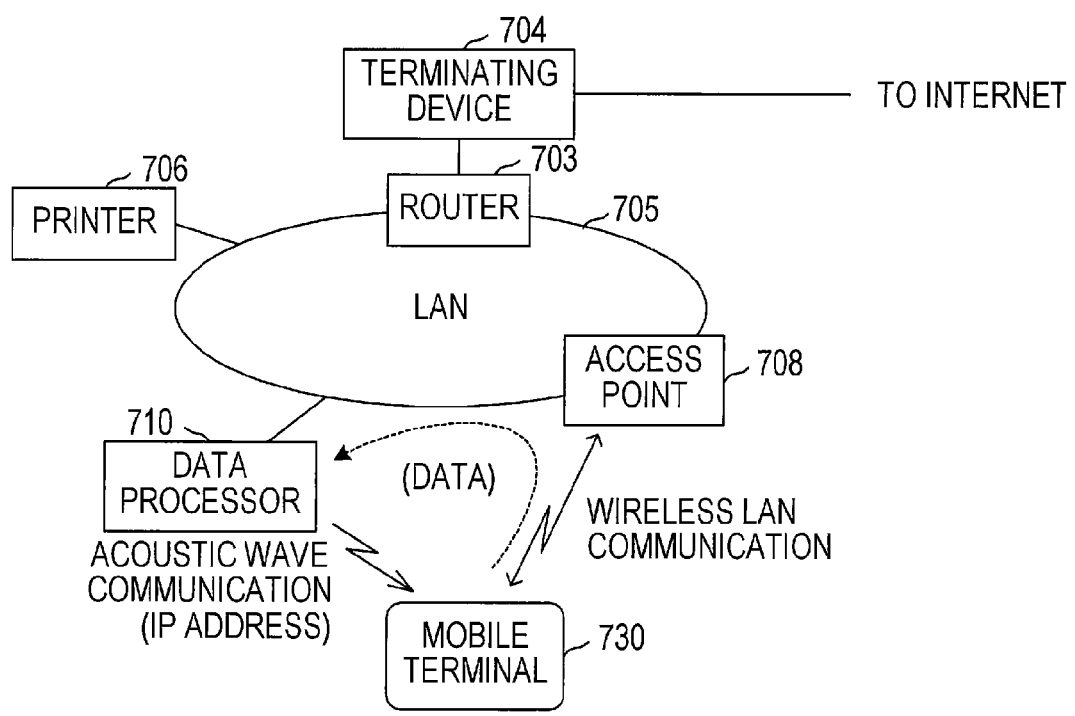
FIG. 25 is a block diagram showing a configuration of a whole communication system according to a first configuration example of a third embodiment.

As shown in FIG. 25, a communication system of the present embodiment mainly includes a local area network (LAN) 705 connected to the Internet via a router 703 and a terminating device 704.

Various types of network equipment, including a printer 706, an access point 708 for a wireless LAN, and a data processor 710, are connected to the LAN 705.

The data processor 710 processes data transmitted from the network equipment connected to the LAN 705 and a mobile terminal device (hereinafter, referred to as mobile terminal) 730 connected via the access point 708, stores the data in a predetermined storage medium (hard disk, silicon disk, memory card, etc.), or prints the data using the printer 706.

Figure 26:
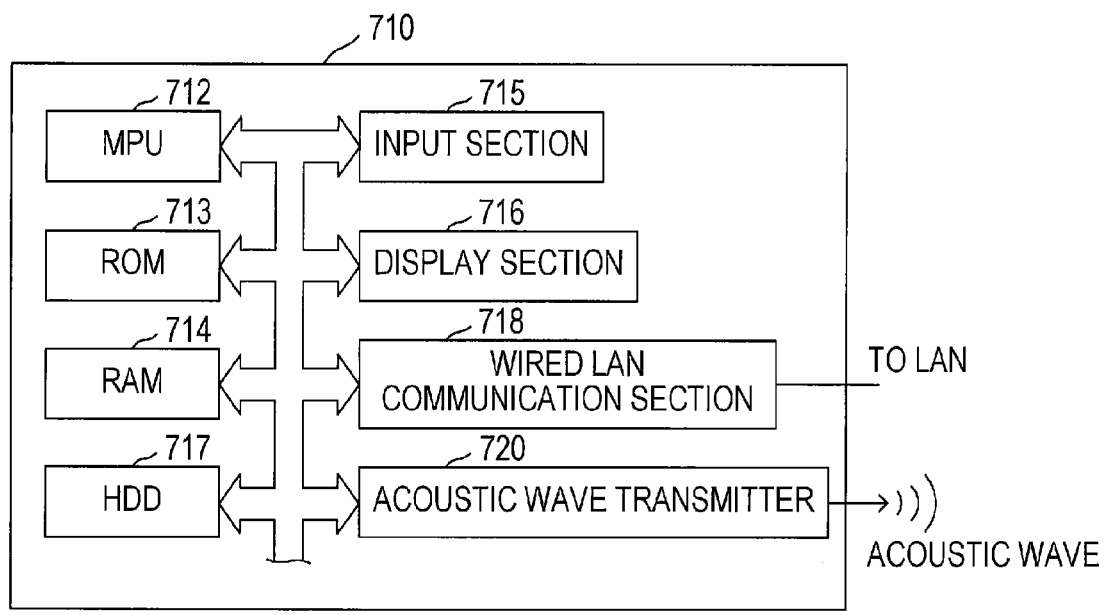
FIG. 26 is a block diagram showing a configuration of a data processor according to the first configuration example of the third embodiment.

As shown in FIG. 26, the data processor 710 is configured as a computer mainly including a MPU 712, a ROM 713, and a RAM 714.

The data processor 710 is provided with an input section 715 including a keyboard, mouse, or the like, a display section 716 including a LCD, etc., a storage medium (in the figure, HDD (hard disk)) 717 for storing various data, a wired LAN communication section 718 for communicating with other network equipment via the LAN 705, and an acoustic wave transmitter 720, etc.

Further, the acoustic wave transmitter 720 uses acoustic waves (or ultrasound) receivable by a microphone for call or audio input provided in the mobile terminal 730 to transmit predetermined data in acoustic waves. The acoustic wave transmitter 720 is configured similarly to the transmitter 10 of the first embodiment shown in FIG. 1.

Figure 27:
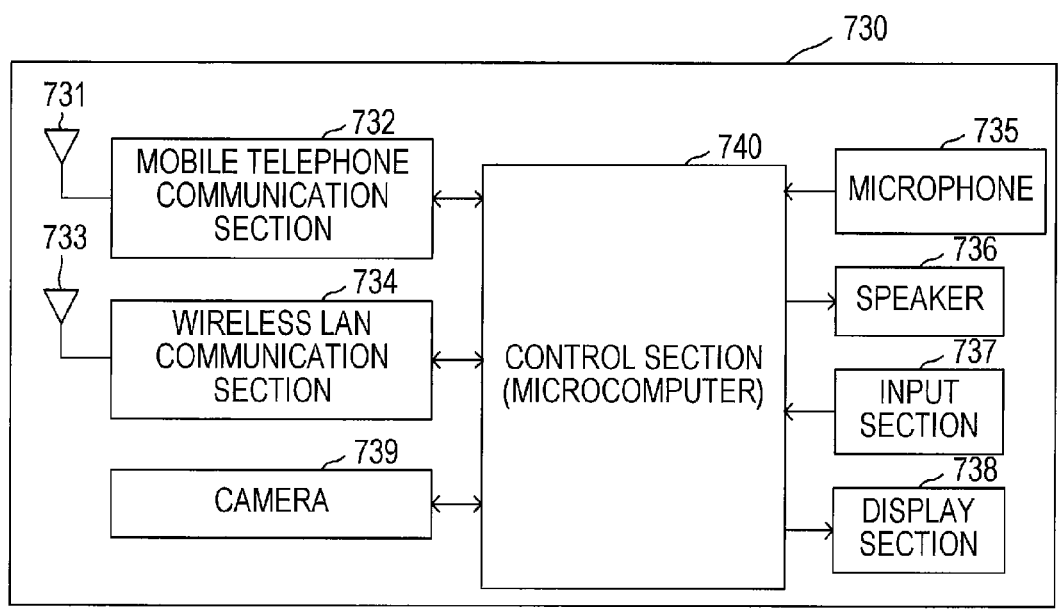
FIG. 27 is a block diagram showing a configuration of a mobile terminal according to the first configuration example of the third embodiment.

Next, the mobile terminal 730 is a telephone terminal (mobile phone or smart phone), for example, capable of calling and data communication via a mobile phone line (not shown). The mobile terminal 730 is configured as shown in FIG. 27.

That is, the mobile terminal 730 includes an antenna 731 and a mobile telephone line communication section 732 for communication via a mobile phone line, an antenna 733 and a wireless LAN communication section 734 for communication via a wireless LAN, and a microphone 735 and a speaker 736 for use in calls.

The mobile telephone line communication section 732, the wireless LAN communication section 734, the microphone 735, and the speaker 736 are connected to the control section 740, which includes a microcomputer.

Further, the mobile terminal 730 is provided with an input section 737 including various touch keys, a display section 738 including a LCD, etc., and a camera 739 for imaging. Each of these components is connected to the control section 740.

The control section 740, in accordance with a command from a user input through the input section 737, switches operation mode of the mobile terminal 730 from a normal waiting mode to a call mode, or a communication mode that utilizes each of the above communication sections 732, 734, and, for each of these operation modes, performs various control processes for waiting, for calling, and for communication.

Figure 28:
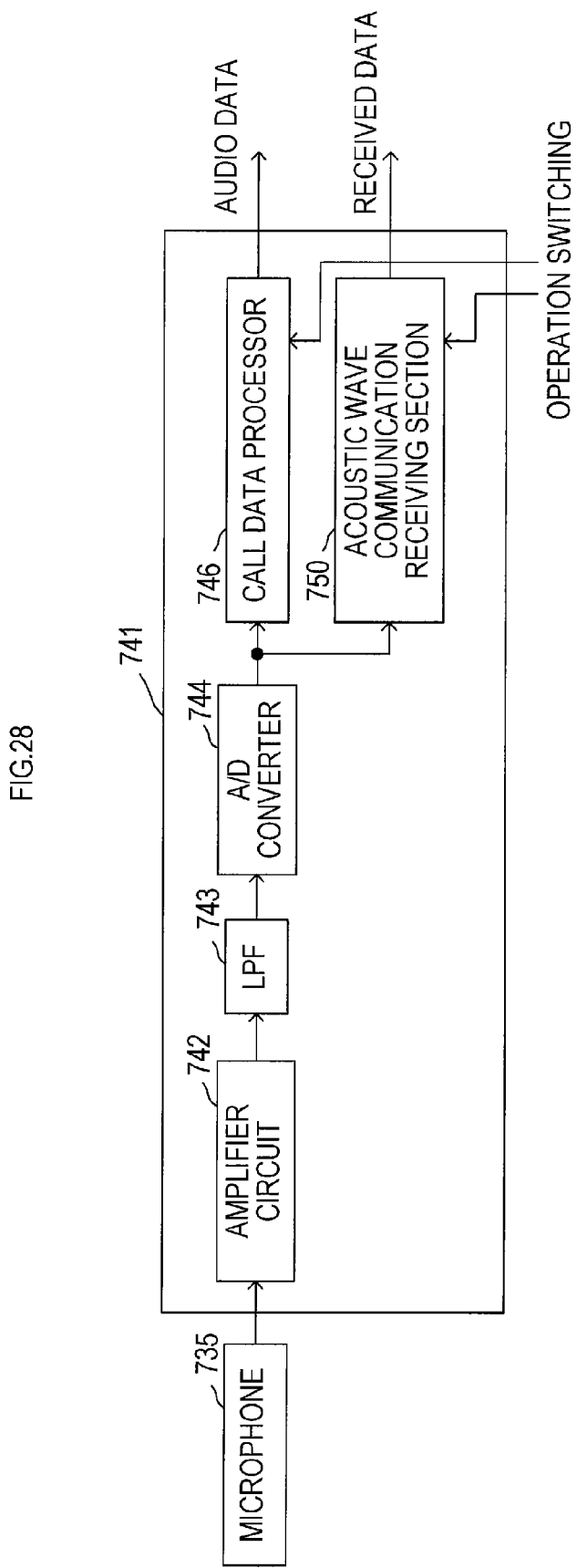
FIG. 28 is a block diagram showing a configuration of an audio data input section provided in a control unit of the mobile terminal device.

In the present configuration example, in order to be able to use the microphone 735 not only for audio input during a call but also for receiving acoustic (or ultrasonic) waves for communication transmitted from the data processor 710 or the like described above, the control section 740 is provided with an audio data input section 741 shown in FIG. 28.

The audio data input section 741, depending on the operation mode of the mobile terminal 730, converts audio signal from the microphone 735 to audio data for calls or to received data for the acoustic wave communication, so as to be taken into the control section 740.

Therefore, the audio data input section 741 is provided with an amplifier circuit 742 that amplifies the audio signal from the microphone 735, a LPF 743 that removes unnecessary harmonic components from the audio signal amplified at the amplifier circuit 742, and an A/D converter 744 that converts the audio signal that has passed through the LPF 743 to audio data.

Further, the audio data input section 741 is also provided with a call data processor 746 that converts the audio data input from the A/D converter 744 to audio data for calls (more particularly, for transmitting voices), and an acoustic wave communication receiving section 750 that restores the received data for acoustic wave communication from the audio data input from the A/D converter 744.

Note that the call data processor 746 operates when the operation mode of the mobile terminal 730 is in a call mode, and the acoustic wave communication receiving section 750 operates when receiving an instruction to receive acoustic wave from the user via the input section 737.

The acoustic wave communication receiving section 750 includes, similar to the receiver 30 of the first embodiment shown in FIG. 1, an unnecessary signal remover, a FM detector, and a waveform shaping section.

Therefore, in the acoustic wave communication receiving section 750, unnecessary signal components included in the received signal (audio data) will be removed in the unnecessary signal remover, and the transmission data from the acoustic wave transmitter 720 will be restored in the FM detector.

Thus, in the communication system of this configuration example, the data processor 710 connected to the LAN 705 is configured to be able to transmit arbitrary data through acoustic wave transmission from the speaker 728, and the mobile terminal 730 is provided with the acoustic wave communication receiving section 750 that can receive acoustic wave transmitted from the data processor 710 and demodulate data.

Therefore, according to the communication system of the present configuration example, desired data is transmitted in an acoustic wave to the mobile terminal 730 from the data processor 710. The mobile terminal 730 receives the acoustic wave and can acquire the data transmitted in acoustic waves from the data processor.

In the present configuration example, the MPU 712 in the data processor 710 executes a program stored in the ROM 713 or the HDD 717 to start a TCP/IP server, and transmits the IP address of the TCP/IP server in acoustic waves.

Accordingly, it becomes possible for the mobile terminal 730 that has acquired the IP address to log into the TCP/IP server, by means of the wireless LAN.

Hereinafter, a data acquisition process and a data output process, respectively performed by the MPU 712 of the data processor 710 and the control section 740 of the mobile terminal 730 for the purpose above, will be described with reference to a flowchart shown in FIG. 29.

Figure 29:
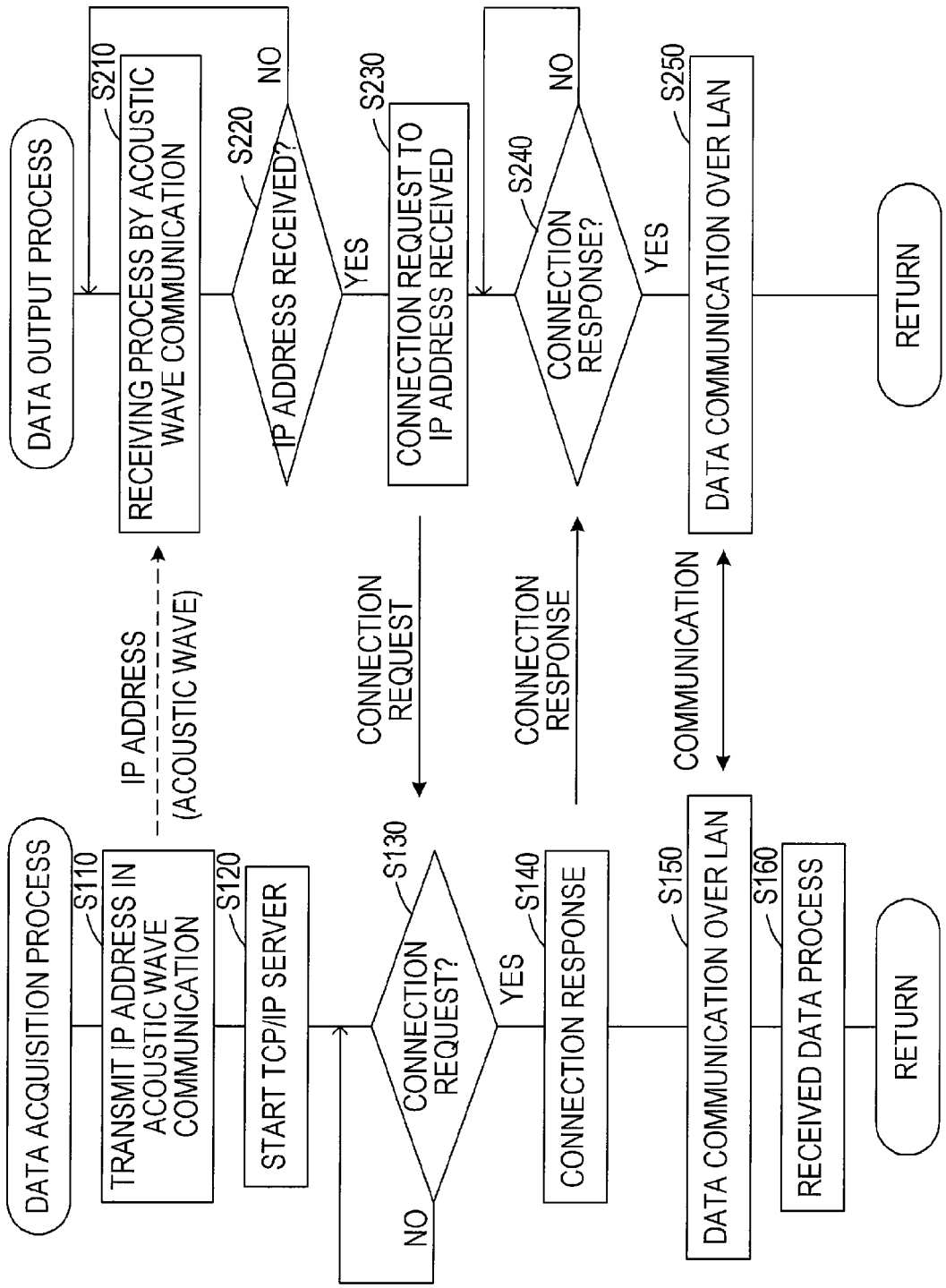
FIG. 29 is a flowchart showing a control process executed in the data processor and in the mobile terminal.

The data acquisition process shown in FIG. 29 is executed by the MPU 712 when the manager of the data processor 710 or the user of the mobile terminal 730 provides, via the input section 737, an input command of data, in the data processor 710.

When the data acquisition process is started, data representing the IP address of the TCP/IP server is first output to the acoustic wave transmitter 720, in S110 (S represents a step). Thereby, the IP address is transmitted in acoustic waves from the acoustic wave transmitter 720.

Next, in S120, the TCP/IP server is started with the IP address transmitted in acoustic waves in S110. In subsequent S130, it is determined whether a connection request to the TCP/IP server is sent over the LAN 705. In this way, a connection request is awaited to be transmitted.

Next, when it is determined in S130 that a connection request that is transmitted to the IP address over the LAN 705 is received, the process moves to S140, and a response signal (connection response) is sent to the mobile terminal 730, which has transmitted the connection request over the LAN 705.

Then, in subsequent S150, data communication is performed with the mobile terminal 730 over the LAN 705. When the data communication is completed, the received data acquired from the mobile terminal 730 by the data communication is processed in subsequent S160, and the data acquisition process ends.

In addition, in S160, if the received data is to be stored, the received data is stored in the HDD 717 or in an external storage medium. If the received data is to be printed out, the received data is transferred to the printer 706 so that a picture corresponding to the received data is printed.

Meanwhile, the data output process shown in FIG. 29 is executed in the control section 740 (specifically, CPU of a microcomputer constituting the control section 740) when a receiving command of acoustic wave is input through the input section 737 in the mobile terminal 730 and the acoustic wave communication receiving section 750 is in operation.

When the data output process is started, a receiving process to take in the received data from the acoustic wave communication receiving section 750 of the audio data input section 741 is first executed in S210.

In subsequent S220, it is determined whether the IP address that is transmitted in acoustic waves from the data processor 710 is received (restored in other words) in the receiving process of S210. If the IP address is not received, the process moves to S210 again, and receipt of the IP address is awaited.

When it is determined that the IP address is received in S220, the process proceeds to S230. A connection request is transmitted to the TCP/IP server with the IP address received by the acoustic wave communication by the wireless LAN communication with the access point 708.

Then, after the transmission of the connection request, it is determined in S240 whether there is a connection response from the TCP/IP server and a connection response from the TCP/IP server is awaited. When it is determined that there is a connection response in S240, the process proceeds to S250.

In S250, data communication is performed with the TCP/IP server, and data for storage or printing specified by the user is transmitted to the TCP/IP server. When data communication with the TCP/IP server is complete, the data output process is ended.

As described above, according to the communication system of the present configuration example, the data processor 710 connected to the LAN 705 starts the TCP/IP server for receiving data for storage or printing from the mobile terminal 730, and notifies the mobile terminal 730 of the IP address of the TCP/IP server by acoustic wave communication.

Therefore, in the communication system of the present configuration example, the data processor 710 acts as the information providing device described above, and the data processor 710 and the mobile terminal 730 comprises the access information providing system described above.

According to the communication system of the present configuration example, when the mobile terminal 730 acquires the IP address notified by the data processor 710, it is possible to use a microphone usually provided in a mobile terminal device. There is no need to use two-dimensional codes as well as near field communication by radio or infrared ray.

Therefore, according to the communication system of the present configuration example, it is possible to provide access information to the network equipment (in this configuration example, IP address of the TCP/IP server) to a mobile terminal device having no read function of the two-dimensional codes and these near field communication capabilities.

Further, since the mobile terminal device is normally provided with a microphone for calls or audio input, and a signal processing circuit that processes audio signal input from the microphone to be converted to audio data, the mobile terminal 730 can use these components to restore the IP address that is transmitted in acoustic waves.

That is, to identify the access information (IP address in this configuration example) transmitted in acoustic waves from the data processor 710 as the information providing device, the mobile terminal 730 may be provided with the acoustic wave communication receiving section 750 that receives the acoustic wave by the microphone 735 and restores the received data from the audio data A/D converted by the A/D converter 744.

Since the acoustic wave communication receiving section 750 can be easily implemented by software processing by a digital processing circuit or a microcomputer, increase in cost of the mobile terminal 730 can be suppressed.

Further, in this configuration example, the data transmission from the mobile terminal 730 to the data processor 710 is performed by data communication using a wireless LAN, instead of acoustic wave communication. Thus, large volumes of data, for example, image data or the like captured by the camera 739, can be transmitted in a short time and, moreover, without deteriorating the quality.

In the present configuration example, the acoustic wave transmitter provided in the data processor 710 as the information providing device corresponds to an example of the transmission section described above, the acoustic wave communication receiving section 750 provided in the mobile terminal 730 corresponds to an example of the restoration section described above, and the control section 740 (microcomputer constituting the control section 740, in particular) corresponds to an example of the communication control section described above.

[Second Configuration Example]

Figure 30:
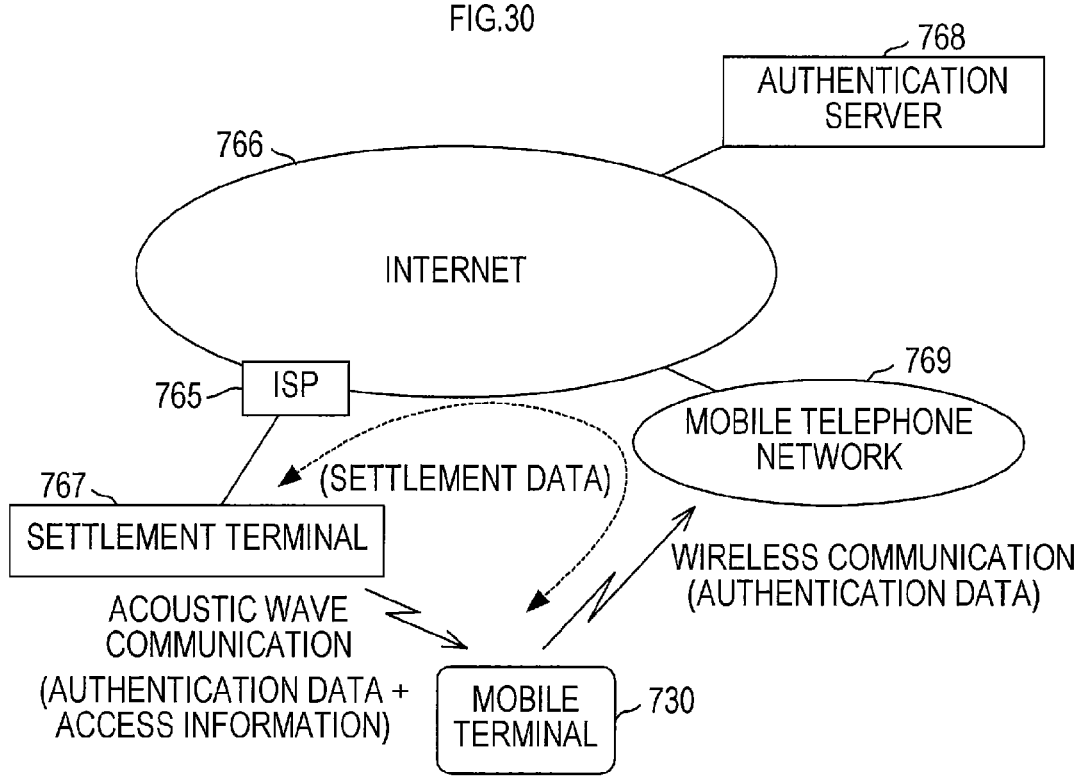
FIG. 30 is a block diagram showing a configuration of a whole communication system according to a second configuration example of the third embodiment.

As shown in FIG. 30, a communication system of the present configuration example includes an authentication server 768 connected to the Internet 766, and a settlement terminal 767 that is installed in stores or establishments where business is conducted and that is connected to the Internet 766 via an Internet Service Provider (ISP) 765.

In the present configuration example, the settlement terminal 767 transmits authentication data to be authenticated by the authentication server 768 to the mobile terminal 730 in acoustic waves, and the mobile terminal 730 transmits the authentication data acquired from the settlement terminal 767 to the authentication server 768 via the mobile telephone network 769 and the Internet 766. Thereby, the authentication server 768 authenticates the mobile terminal 730 and the settlement terminal 767, and executes a predetermined settlement process with the settlement terminal 767.

Therefore, similar to the data processor 710 of the first configuration example, the settlement terminal 767 is constituted by a computer that can transmit arbitrary data in acoustic wave communication (transmission). The mobile terminal 730 is also configured in the same manner as in the first configuration example.

Figure 31:
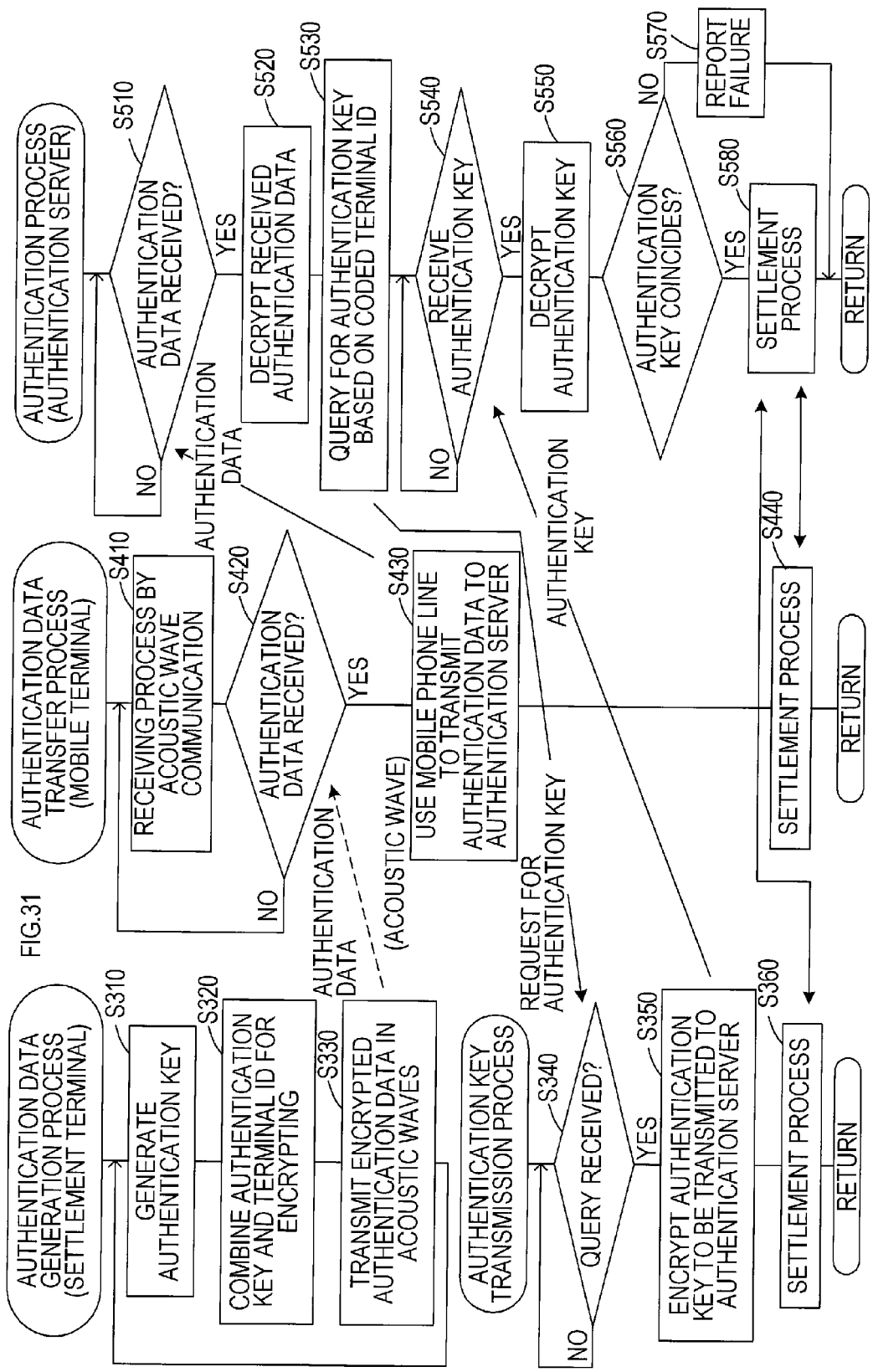
FIG. 31 is a flowchart showing a control process executed by a settlement terminal, a mobile terminal, and an authentication server according to the second configuration example of the third embodiment.

To carry out the settlement process between the, mobile terminal 730 and the settlement terminal 767 via the Internet 766, each computer constituting each of the settlement terminal 767, the mobile terminal 730, and the authentication server 768 performs process steps shown in FIG. 31.

First, the computer constituting the settlement terminal 767 performs an authentication data generation process and an authentication key transmission process shown in FIG. 31.

The authentication data generation process is a process that is repeatedly performed in the settlement terminal 767.

In the authentication data generation process, an authentication key necessary for the authentication server 768 to authenticate the settlement is generated in S310.

Then, in subsequent S320, the generated authentication key, and a terminal ID that is identification information of the settlement terminal 767 itself, are combined and encrypted. In S330, the encrypted data is transmitted in acoustic waves from the acoustic wave transmitter (having the same configuration as the transmitter 10 of FIG. 1) included in the settlement terminal 767, as the authentication data.

Note that during the acoustic wave transmission, access information (global IP address, etc.) necessary for the mobile terminal 730 to access the authentication server 768 on the Internet 766 is also transmitted, in addition to authentication data.

Further, in S330, after transmission of the authentication data and the access information is carried out for a certain period, elapse of a predetermined waiting time is awaited. When the predetermined waiting time has elapsed, the process proceeds to S310 again. In this way, the transmission of the authentication data and the access information is carried out on a regular basis.

The authentication key transmission process is a process that is repeatedly performed in the settlement terminal 767, as in the authentication data generation process.

In the authentication key transmission process, it is determined in S340 whether a query for the authentication key is received from the authentication server 768, and a query for the authentication key is awaited. When there is the authentication key query from the authentication server 768, the process moves to S350.

In S350, the authentication key generated at S310 is read and encrypted. The encrypted authentication key is transmitted to the authentication server 768 via the Internet 766.

Then, the process moves to S360. In accordance with a command from the authentication server 768, data for settlement is transmitted to and received from the mobile terminal 730, which is authenticated by the authentication server 768, via the Internet 766. Thereby, the predetermined settlement process is carried out. When the settlement process is completed, the process proceeds to S340.

When failure of the authentication is reported from the authentication server 768 in S360, the process moves to S340.

On the other hand, the computer constituting the mobile terminal 730 (microcomputer constituting the control section 740 described above) performs an authentication data transfer process shown in FIG. 31 when a settlement command is input from the input section 737.

In the authentication data transfer process, a receiving process to take in received data from the acoustic wave communication receiving section 750 is first executed in S410. In S420, it is determined whether the authentication data and the access information transmitted in acoustic waves from the settlement terminal 767 in the receiving process of S410 are received (restored, in other words).

When it is determined that the authentication data and the access information are received at S420, the process proceeds to S430. The authentication data is transmitted to the authentication server 768 on the Internet 766 via the mobile telephone network 769. The transmission of the authentication data is performed using the access information acquired from the settlement terminal 767.

When the authentication data is transmitted to the authentication server 768 as described above, the process proceeds to S440. In accordance with a command from the authentication server 768, data for settlement is transmitted to and received from the settlement terminal 767 via the Internet 766. Thereby, a predetermined settlement process is performed. When the settlement process is completed, the process proceeds to S410.

When failure of the authentication is reported from the authentication server 768 in S440, the process moves to S410.

Next, the computer constituting the authentication server 768 repeatedly executes an authentication process shown in FIG. 31.

In the authentication process, it is first determined in S510 whether or not the authentication data transmitted from the mobile terminal 730 is received via the Internet 766, and receipt of the authentication data is awaited. When the authentication data is received, the process proceeds to S520. The received authentication data is decrypted to restore the authentication key and the terminal ID of the settlement terminal 767.

Then, in subsequent S530, on the basis of the terminal ID restored in S520, access information to the settlement terminal 767 that has generated the authentication data is searched from the database of the authentication server 768 itself. Based on the access information, a query for the authentication key is transmitted to the settlement terminal 767.

Then, the settlement terminal 767 encrypts the authentication key by the process of S350 described above, and transmits the encrypted key to the authentication server 768. In subsequent S540, it is determined whether or not the authentication key transmitted from the settlement terminal 767 is received, and receipt of the authentication key is awaited.

When the authentication key is received, the authorization key is decrypted in S550. In S560, it is determined whether the decrypted authentication key coincides with the authentication key from the mobile terminal 730 decrypted in S520.

If it is determined in S560 that the authentication keys coincide, it is determined that both the settlement terminal 767 that has transmitted the authentication key and the mobile terminal 730 are normal. The process proceeds to S580, and an authentication result indicating success of the authentication is transmitted to the settlement terminal 767 and the mobile terminal 730. Thereby, a predetermined settlement process is executed to the settlement terminal 767 and the mobile terminal 730. The process proceeds to S510 again.

Further, when it is determined in S560 that the authentication keys do not coincide, it is determined that the settlement terminal 767 and the mobile terminal 730 are unable to be authenticated, and an authentication result indicating failure of the authentication is transmitted to the settlement terminal 767 and the mobile terminal 730. Thereby, execution of a settlement process is interrupted. The process proceeds to S510 again.

As described above, in the communication system of the present configuration example, the settlement terminal 767 transmits in acoustic wave communication the authentication data necessary to authenticate the authentication server 768 and the access information needed to gain access to the authentication server 768.

Then, the user who wants to settle payment of the product using the settlement terminal 767 places the user's own mobile terminal 730 near the settlement terminal 767 to receive the authentication data and the access information and enter a settlement command through the input section 737. Thereby, authentication by the authentication server 768, and the settlement process by the settlement terminal 767 and the mobile terminal 730 are made automatically.

Therefore, according to the communication system of the present configuration example, without having to store the access information in the authentication server 768 and the settlement terminal 767, it is possible to make the mobile terminal 730 carry out a normal settlement process with the settlement terminal 767. The settlement process upon making payment of the product or the like can be carried out safely and easily, using the mobile terminal 730.

In the present configuration example, when the settlement process is carried out between the settlement terminal 767 and the mobile terminal 730, receipt information describing the product and the price may be transmitted in acoustic wave communication from the settlement terminal 767 to the mobile terminal 730, and, by displaying the receipt information at the mobile terminal 730 side, the user of the mobile terminal 730 may check the settlement information and store the information in memory or the like.

At this time, by sending in acoustic wave communication the settlement information necessary to authenticate the authentication server 768, such as information on a credit card, from the mobile terminal 730 to the settlement terminal 767, the administrator of the settlement terminal 767 may be allowed to review the settlement information and store the information in the memory.

Here, in this configuration example, the settlement terminal 767 corresponds to an example of the information providing device described above, the authentication server 768 corresponds to an example of the network equipment described above, and the authentication key corresponds to an example of the key information described above.

In the processes executed by the settlement terminal 767, the authentication data generation process serves as the encrypted information generator and the encrypted information output section described above, and the authentication key transmission process serves as the key information transmission section described above.

Further, in the authentication process performed by the authentication server 768, the processes of S510 to S530 functions as the key information transmission request section described above, and the processes of S540 to S560 functions as the key information determination section described above.

[Third Configuration Example]

Figure 32:
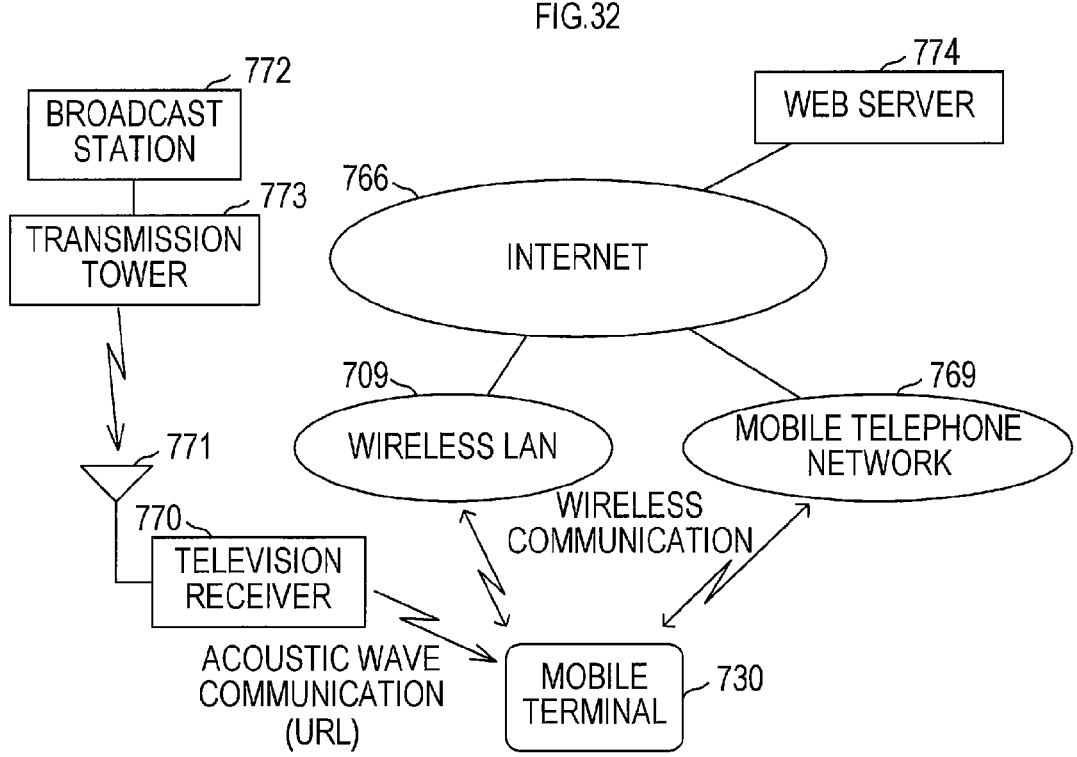
FIG. 32 is a block diagram showing a configuration of a whole communication system according to a third configuration example of the third embodiment.

As shown in FIG. 32, a communication system of the present configuration example includes a television receiver 770 having a receiving antenna 771 for receiving radio waves transmitted from a transmission tower 773 of a broadcasting station 772, and a mobile terminal 730 that can be connected to the Internet 766 via a wireless LAN 709 or a mobile telephone network 769.

In the present configuration example, the television receiver 770 notifies the mobile terminal 730 of a URL of a Web server 774 on the Internet 766 related to the television broadcast being received, as access information, in acoustic wave communication similar to that of the above configuration examples.

That is, in this configuration example, while the user of the mobile terminal 730 is viewing the television broadcast by the television receiver 770, it is possible to easily acquire desired information corresponding to the broadcast content from the Web server 774 on the Internet 766 via the mobile terminal 730.

Therefore, the television receiver 770 is constituted by providing a general display device with a built-in TV tuner with a signal processor for acoustic wave transmission that acquires the URL information included in the broadcast data selected and demodulated in a TV tuner and generates audio data for transmitting in acoustic waves the URL information.

Figure 33:
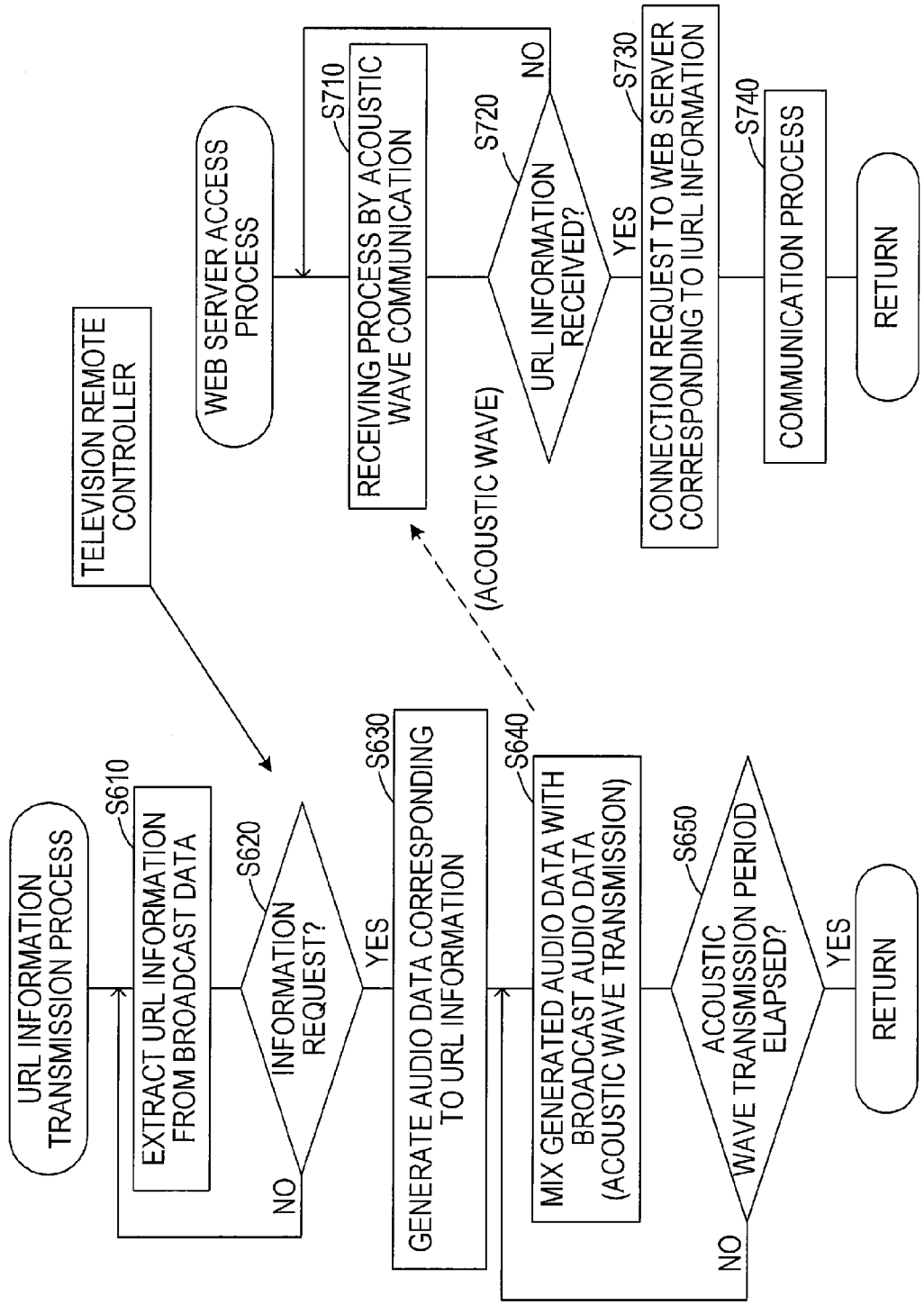
FIG. 33 is a flowchart showing a control process executed by a television receiver and a mobile terminal according to the third configuration example of the third embodiment.

The signal processor for acoustic wave transmission provided in the television receiver 770 is implemented by making a microcomputer provided in the television receiver 770 execute a URL information transmission process shown in FIG. 33.

In the URL information transmission process, first in S610, the URL information included in the broadcast signal of the currently selected channel is extracted from among the broadcast data received and demodulated by the TV tuner. In subsequent S620, it is determined whether information corresponding to the currently receiving broadcast content is requested by the viewer manipulating a television remote controller.

If the viewer does not request the information, the process proceeds to S610. If the viewer requests the information, the process proceeds to S630, and generates audio data corresponding to the extracted URL information in S610.

The audio data is set to be in an ultrasonic band higher than the audible frequency band so that the frequency band of the audio data does not overlap with the audio data of the television broadcast.

Then, in subsequent S640, the audio data generated in S630 is mixed with the audio data of the television broadcast. The mixed audio data is transmitted in acoustic waves from the speaker provided in the television receiver 770.

The acoustic wave transmission in S640 is repeatedly executed until it is determined in subsequent S650 that a predetermined acoustic wave transmission period has elapsed. After the acoustic wave transmission period elapses, the process proceeds to S610 again.

Meanwhile, the mobile terminal 730 is configured in the same manner as in the first configuration example. In order to be able to demodulate the transmission data in ultrasonic waves corresponding to the transmission frequency of the URL information transmitted from the television receiver 770, the frequency band of acoustic waves to be received and demodulated is set in the acoustic wave communication receiving section 750.

In the mobile terminal 730, the microcomputer constituting the control section 740 executes a Web server access process shown in FIG. 33. Thereby, based on the URL information that is transmitted in acoustic waves from the television receiver 770, the microcomputer connects automatically to the Web server 774 on the Internet 766 that corresponds to the URL information.

In other words, in the Web server access process, a receiving process to take in the URL information from the acoustic wave communication receiving section 750 is first executed in S710. In S720, it is determined whether or not the URL information is received in the receiving process of S710.

When it is determined that the URL information is received in S720, the process moves to S730. A connection request to the Web server 774 on the Internet 766 corresponding to the URL information is transmitted via the wireless LAN 709 or the cellular telephone network 769. Thereby, the microcomputer accesses the Web server 774 and, in S740, performs a communication process with the Web server 774.

The communication process in S740 is executed in accordance with a command input via the input section 737 from the user of the mobile terminal 730.

As described above, in the communication system of the present configuration example, the television receiver 770 transmits in acoustic waves the URL information included in the television broadcast signal, and the mobile terminal 730 that has acquired the URL information automatically accesses the Web server 774 on the Internet 766, in accordance with the URL information.

Therefore, when a viewer of the television broadcast desires to learn more information corresponding to the broadcast content being viewed, the viewer may set the mobile terminal 730 to the operation mode capable of receiving acoustic wave, and set the television receiver 770 to transmit in acoustic waves the URL information. Thereby, it is possible to easily acquire the desired information, using the mobile terminal 730.

For this purpose, it is necessary that URL information is included in the broadcast signal from the broadcasting station 772. At the broadcast station 772 side, it is possible to facilitate access to a particular Web server corresponding to the URL information by including given URL information in broadcast signal.

Therefore, in the broadcast station 772, by including the URL information in the broadcast signal, it is possible to improve not only the service for the viewer but also the service for a sponsor who is a provider of the broadcast.

In the present configuration example, the access information providing system has been described that includes the television receiver 770 that receives television broadcast signal transmitted via the transmission tower 773 from the broadcast station 772 and the mobile terminal 730.

However, the receiver that performs acoustic wave transmission of the URL information may be a receiver that receives radio broadcast or satellite broadcast, or may be a receiver that receives broadcast transmitted via a cable such as a CATV.

In the present configuration example, the URL information transmission process executed by the television receiver 770 functions as the access information acquiring section described above.

[Modification 1]

In the third embodiment, in the above configuration examples, the acoustic wave transmitter 720 has been described to use the numerically controlled oscillator 722 to generate acoustic wave signal of which frequency changes in accordance with the transmission data. However, like an acoustic wave transmitter 720*a* shown in FIG. 34, it is also possible to generate acoustic wave signal using a dividing circuit 777.

Figure 34:
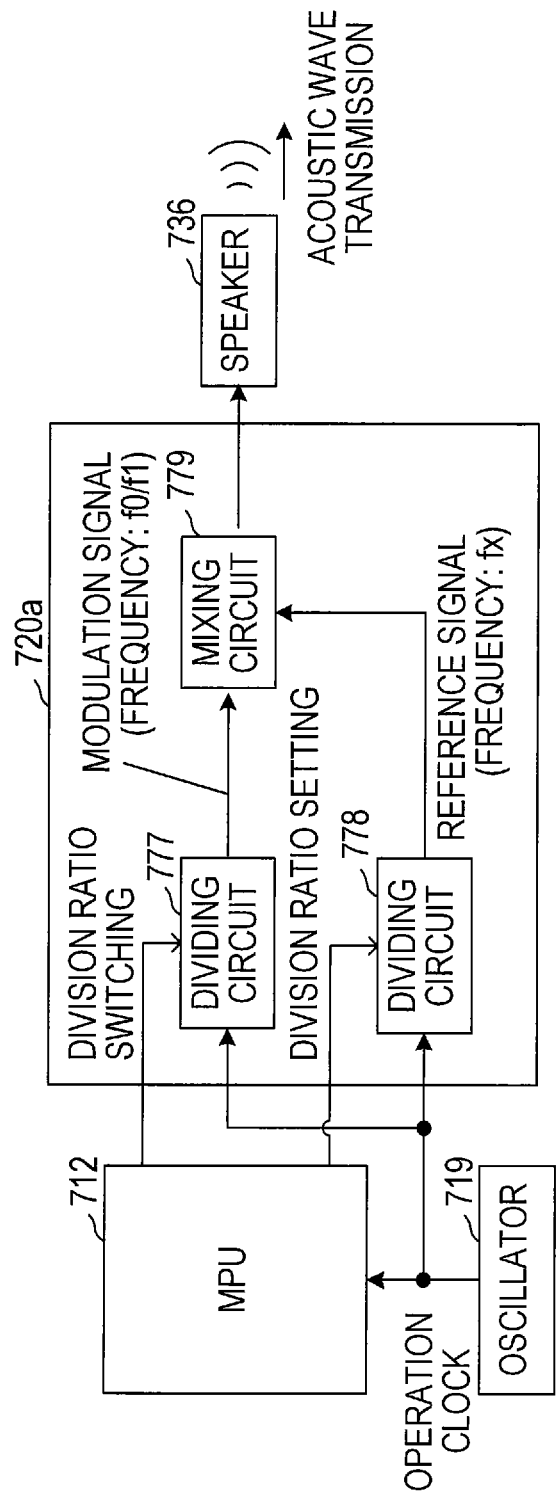
FIG. 34 is a block diagram showing a variation of an acoustic wave transmitter.

That is, similar to that shown in FIG. 5, in a computer system where the acoustic wave transmitter 720*a* is provided, the acoustic wave transmitter 720*a* shown in FIG. 34 is configured to take in the operation clock from the oscillator 719 that generates the operation clock of the MPU 712, divide the operation clock by the dividing circuit 777, and switch a division ratio of the dividing circuit 777 in two steps according to the value (0 or 1) of the transmission data output from the MPU 712.

Therefore, the frequency of the output signal from the dividing circuit 777 changes in two-steps to f0 or f1 corresponding to the transmission data, so that it is possible to generate acoustic wave signal similar to that in the above configuration example.

Further, in the acoustic wave transmitter 720*a* shown in FIG. 34, a reference signal having a frequency fx different from the frequencies f0 and f1 of the modulation signal is generated by a dividing circuit 778. The reference signal f1 and the modulation signal are mixed in a mixing circuit 779 and the mixed signal is output to the speaker 736.

Therefore, depending on whether or not a level difference between the modulation signal and the reference signal is within an acceptable range at the mobile terminal 730 side that receives the acoustic wave signal from the speaker 736, it can be determined whether the modulation signal is affected by the reflected wave and ambient noise (in other words, whether or not there is abnormality in the modulation signal).

That is, in case that modulation signal of which frequency is set to f1 or f0 and reference signal of which frequency is set to fx are generated by dividing the operation clock from the oscillator 719 in the dividing circuits 777, 778, the level difference between the modulated signal and the reference signal is substantially constant.

Accordingly, at the mobile terminal 730 side that receives acoustic waves including the modulated signal and the reference signal, reception levels of the respective signals are compared. If the level difference is substantially constant, it can be determined that the received signal is normal. Otherwise it can be determined that there is abnormality in the received signal.

[Modification 2]

Figure 35:
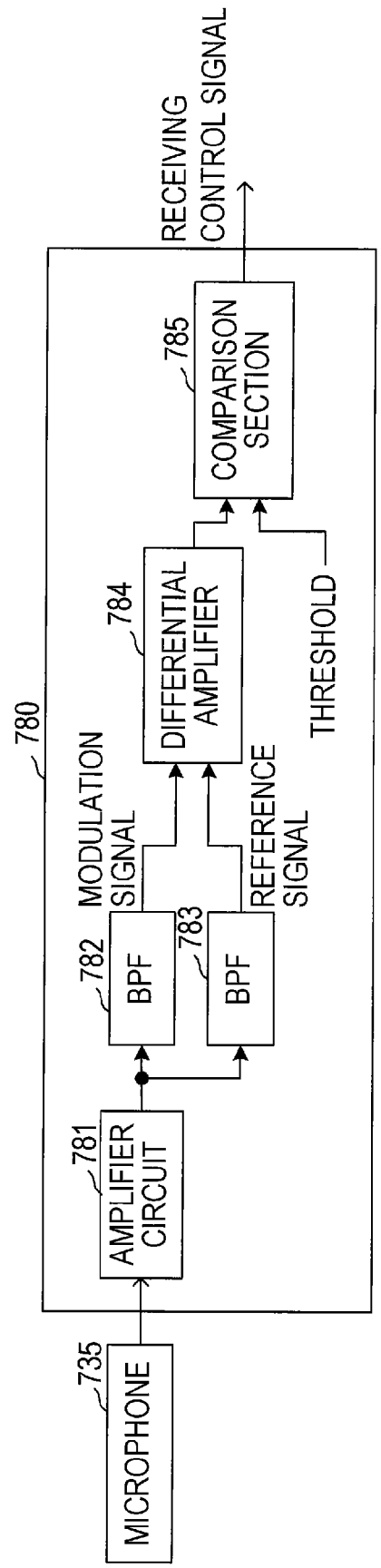
FIG. 35 is a block diagram showing a configuration example of a reception state determiner used to determine a communication state based on a received signal of acoustic wave from the acoustic wave transmitter of FIG. 34.

On the other hand, if the acoustic wave transmitter 720*a* shown in FIG. 34 is provided on the device side that transmits in acoustic waves the access information, the mobile terminal 730 may be provided with a reception state determiner 780 shown in FIG. 35 and determine whether or not the received signal in acoustic waves is normal. When there is abnormality in the received signal, operation of restoring the access information in the acoustic wave communication receiving section 750 may be prohibited.

In the reception state determiner 780 shown in FIG. 35, first, the received signal in acoustic waves input from the microphone 735 is amplified by an amplifier circuit 781, and the amplified received signal is input to a BPF 782 that selectively passes modulated signal having a frequency of f0, f1, and to a BPF 783 that selectively passes reference signal having a frequency of fx, thereby to extract the modulated signal and the reference signal.

Next, the extracted modulation signal and reference signal are input to a differential amplifier 784 to generate signal corresponding to the level difference of these signals in the differential amplifier 784. The generated level difference signal is compared with a threshold value in a comparison section 785 thereby to determine whether or not the level difference between the modulated signal and the reference signal is within an acceptable range.

Then, the comparison section 785 outputs a receiving control signal that permits the operation of the acoustic wave communication receiving section 750 if the level difference between the modulation signal and the reference signal is within the acceptable range, and that prohibits the operation of the acoustic wave communication receiving section 750 if the level difference between the modulation signal and the reference signal is not within the acceptable range.

Therefore, by providing the reception state determiner 780 shown in FIG. 35 in the mobile terminal 730, it is possible to improve restoration accuracy upon restoring the access information on the mobile terminal 730 side.

[Modification 3]

In the above configuration example, the frequency modulation scheme (FSK) is adopted in which binary data is transmitted using two acoustic waves different in frequencies upon transmission of the access information. If the ultrasonic frequency band is employed for the frequency of the acoustic wave used for transmission, it is possible to widen the frequency band available for transmission, and increase the number of waves.

In this case, for example, if the frequency of the acoustic wave is changed in a different pattern per each value of the transmission data, it is possible to improve reception accuracy at the mobile terminal 730 side.

[Modification 4]

A mobile phone or a smart phone is usually provided with one microphone 735 available for receiving acoustic wave. However, with the one microphone 735, it is conceivable that acoustic wave from the speaker 728 for acoustic wave transmission cannot be received successfully by the microphone 735 depending on the direction of the mobile terminal 730 (and the microphone 735).

Figure 36:
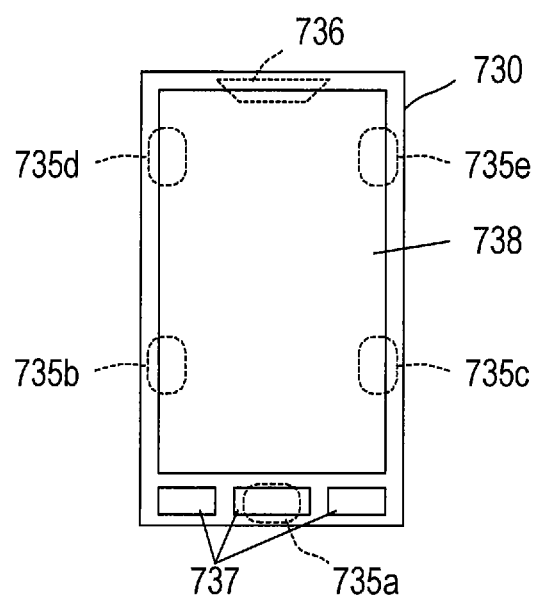
FIG. 36 is an explanatory view showing an arrangement example of microphones to the mobile terminal.

Therefore, the mobile terminal 730, as shown in FIG. 36, may be configured such that a plurality of microphones (five (735a to 735e) in the figure) are arranged dispersedly in order to be able to receive each of the acoustic waves entering from different directions.

Figure 37:
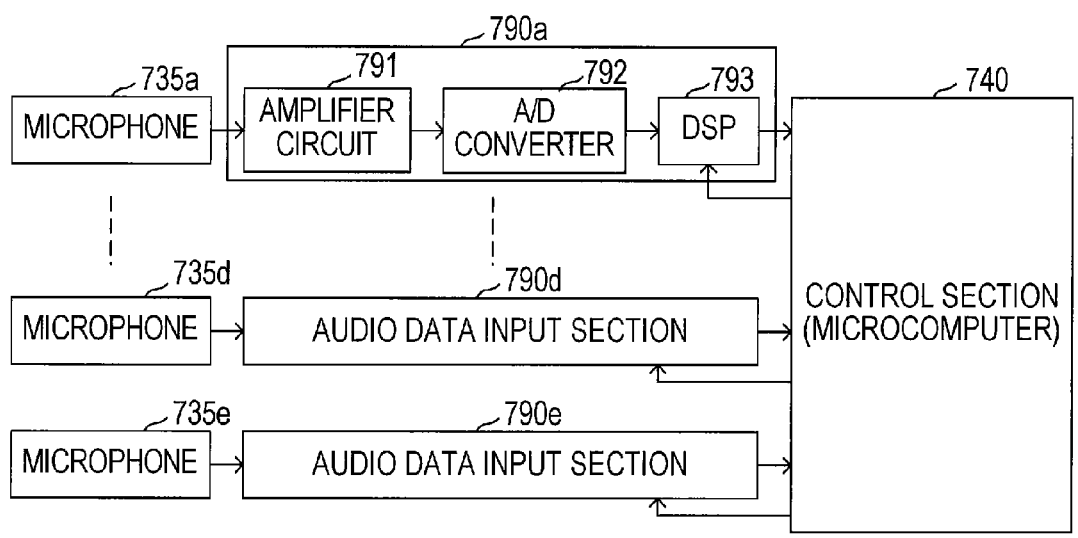
FIG. 37 is a diagram of a configuration of an input system of audio signal from each microphone in the mobile terminal shown in FIG. 36.

In this case, from the microphone 735 disposed in a direction different from that of the speaker 728 for the acoustic wave transmission, unnecessary acoustic wave signal is input. Thus, as shown in FIG. 37, acoustic wave communication receiving sections 790a to 790e may be respectively provided for the microphone 735a to 735e. Also, in the control section 740, the most error-free received data may be selected by CRC check, etc. from among the received data acquired from each of the acoustic wave communication receiving sections 790a to 790e.

Each of the acoustic wave communication receiving sections 790a to 790e shown in FIG. 37 includes an amplifier circuit 791, an A/D converter 792, and a DSP (Digital Signal Processor) 793 that processes audio data to restore received data.

The first to third embodiments have been described as embodiments of the present invention in the above. However, the above-described embodiments are merely examples of the embodiments to which the present invention has been applied.

The present invention may be implemented in various forms, such as a system, an apparatus, a method, a program, and a recording medium recording a program (optical disk such as DVD or CD-ROM, magnetic disk, semiconductor memory, etc.). The components of the above embodiments may be implemented by hardware, software, or a combination thereof. The components illustrated are merely conceptual, and the specific embodiments are not limited to the above configurations. For example, the functions of a single component may be distributed to a plurality of components, or the functions of a plurality of components may be integrated into a single component. At least a part of the configuration of the above embodiments may be replaced with a known configuration having a similar function.

The invention claimed is:

1. An acoustic wave communication system comprising:
a transmitter having a frequency modulator that modulates the frequency of a signal in a frequency band receivable by a microphone based on transmission data thereby to generate a transmission signal, and an acoustic wave generator that generates an acoustic wave in response to the transmission signal generated by the frequency modulator; and
a receiver having a microphone that receives the acoustic wave output from the acoustic wave generator of the transmitter, an unnecessary signal remover that signal-processes the received signal from the microphone to remove unnecessary signal components, and an FM detector that restores the transmission data by FM detection of the received signal from which unnecessary signal components have been removed by the unnecessary signal remover;
wherein the unnecessary signal remover, provided in the receiver, comprises:
  a first filter section that extracts a signal component corresponding to the transmission signal generated by the frequency modulator, from the received signal input from the microphone;
  a frequency converter that converts the frequency of the received signal that has passed through the first filter section to a predetermined intermediate frequency band;
  a second filter section that extracts a signal component corresponding to the transmission signal generated by the frequency modulator, from the signal of the frequency that has been converted by the frequency converter;
  an envelope detector that detects fluctuation in an amplitude of the received signal by detecting an envelope of the received signal that has passed through the first filter section;
  a third filter section that extracts fluctuation components in the amplitude of the received signal as unnecessary signal components having a lower frequency than that of the received signal that has passed through the second filter section, from the signal of the envelope that has been detected by the envelope detector; and
  a remover that removes the unnecessary signal components that have passed through the third filter section from the received signal that has passed through the second filter section.

2. A receiver comprising:
a microphone that receives a transmission signal, the transmission signal being generated in a transmitter by frequency-modulation of a signal in a frequency band receivable by the microphone based on transmission data and transmitted from the transmitter;
an unnecessary signal remover that removes unnecessary signal components by processing the received signal from the microphone; and
an FM detector that restores the transmission data by FM detection of the received signal from which unnecessary signal components have been removed by the unnecessary signal remover;
wherein the unnecessary signal remover comprises:
  a first filter section that extracts a signal component corresponding to the transmission signal generated in the transmitter, from the received signal input from the microphone;
  a frequency converter that converts the frequency of the received signal that has passed through the first filter section to a predetermined intermediate frequency band;
  a second filter section that extracts a signal component corresponding to the transmission signal generated in the transmitter, from the signal of the frequency that has been converted by the frequency converter;

an envelope detector that detects fluctuation in an amplitude of the received signal by detecting an envelope of the received signal that has passed through the first filter section;

a third filter section that extracts fluctuation components in the amplitude of the received signal as unnecessary signal components having a lower frequency than that of the received signal that has passed through the second filter section, from the signal of the envelope that has been detected by the envelope detector; and a remover that removes the unnecessary signal components that have passed through the third filter section from the received signal that has passed through the second filter section.

3. A receiver according to claim 2, wherein:

the first filter section and the second filter section are configured as a band-pass filter having a predetermined pass frequency band, and the first filter section has lower selectivity than the second filter section.

* * * * *